US012300182B2

(12) United States Patent
In et al.

(10) Patent No.: US 12,300,182 B2
(45) Date of Patent: May 13, 2025

(54) SCAN DRIVER

(71) Applicant: SAMSUNG DISPLAY CO., LTD., Yongin-si (KR)

(72) Inventors: Haijung In, Yongin-si (KR); Wonkyu Kwak, Yongin-si (KR); Kimyeong Eom, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/425,064

(22) Filed: Jan. 29, 2024

(65) Prior Publication Data

US 2024/0194148 A1 Jun. 13, 2024

Related U.S. Application Data

(63) Continuation of application No. 18/137,348, filed on Apr. 20, 2023, now Pat. No. 11,922,886.

(30) Foreign Application Priority Data

May 2, 2022 (KR) ........................ 10-2022-0054437

(51) Int. Cl.
*G09G 3/3266* (2016.01)

(52) U.S. Cl.
CPC .................................. *G09G 3/3266* (2013.01)

(58) Field of Classification Search
CPC ....... G09G 3/3266; G09G 3/20; G09G 3/2096
USPC .......................................................... 345/204
See application file for complete search history.

(56) References Cited

U.S. PATENT DOCUMENTS

| | | | |
|---|---|---|---|
| 9,330,593 B2 | 5/2016 | Jang | |
| 9,437,168 B2 | 10/2016 | Her | |
| 10,170,029 B2 | 1/2019 | You et al. | |
| 10,176,778 B2 | 1/2019 | Kim | |
| 10,453,386 B2 | 10/2019 | Jang | |
| 10,741,123 B2 | 8/2020 | Moon et al. | |
| 11,222,596 B2 | 1/2022 | Kim | |
| 11,238,811 B2 | 2/2022 | Chung et al. | |
| 2014/0078029 A1 | 3/2014 | Jang | |
| 2017/0345366 A1 | 11/2017 | Jang | |
| 2021/0065601 A1 | 3/2021 | Zheng et al. | |
| 2021/0090484 A1* | 3/2021 | Shang | G09G 3/3266 |
| 2021/0166601 A1 | 6/2021 | Shang et al. | |
| 2022/0020332 A1 | 1/2022 | Yang et al. | |
| 2022/0036824 A1 | 2/2022 | Lee et al. | |

FOREIGN PATENT DOCUMENTS

| | | |
|---|---|---|
| KR | 1020170030714 A | 3/2017 |
| KR | 1020170081801 A | 7/2017 |
| KR | 1020180072041 A | 6/2018 |

(Continued)

*Primary Examiner* — Calvin C Ma
(74) *Attorney, Agent, or Firm* — CANTOR COLBURN LLP

(57) ABSTRACT

According to an embodiment, a scan driver includes a plurality of stages. An output controller of each of the stages includes a pull-down transistor, and the pull-down transistor includes a first gate and a second gate, where the first gate is electrically connected to a third control node or a node electrically connected to the third control node, and the second gate is connected to a third voltage input terminal to which a third voltage of a second voltage level is applied.

18 Claims, 52 Drawing Sheets

(56) References Cited

FOREIGN PATENT DOCUMENTS

| | | | |
|---|---|---|---|
| KR | 1020190073111 | A | 6/2019 |
| KR | 1020200061448 | A | 6/2020 |
| KR | 1020200075955 | A | 6/2020 |
| KR | 102174323 | B1 | 11/2020 |
| KR | 1020210024343 | A | 3/2021 |
| KR | 1020210028774 | A | 3/2021 |
| KR | 102277118 | B1 | 7/2021 |

* cited by examiner

SCAN DRIVER

This application is a continuation of U.S. patent application Ser. No. 18/137,348, filed on Apr. 20, 2023, which claims priority to Korean Patent Application No. 10-2022-0054437, filed on May 2, 2022, and all the benefits accruing therefrom under 35 U.S.C. § 119, the content of which in its entirety is herein incorporated by reference.

BACKGROUND

1. Field

One or more embodiments relate to a scan driver and a display apparatus including the scan driver.

2. Description of the Related Art

A display apparatus includes a pixel unit, a scan driver, a data driver, and a controller, the pixel unit including a plurality of pixels. The scan driver includes stages connected to scan lines, and the stages supply a scan signal via a scan line connected thereto, in response to signals from the controller.

SUMMARY

One or more embodiments include a scan driver capable of stably outputting scan signals, and a display apparatus including the scan driver. The technical aspects to be achieved by the disclosure are not limited to the technical aspects mentioned above, and other technical aspects not mentioned will be clearly understood by those of ordinary skill in the art from the description of the disclosure.

Additional aspects will be set forth in part in the description that follows and, in part, will be apparent from the description, or may be learned by practice of the embodiments of the disclosure.

According to one or more embodiments, a scan driver includes: a plurality of stages. Each of the plurality of stages includes: a first node controller connected to an input terminal, a first clock terminal, and a first control node, where a start signal is applied to the input terminal, and a first clock signal is applied to the first clock terminal, a second node controller connected to the first clock terminal, a first voltage input terminal, a second voltage input terminal, and a second control node, where a first voltage of a first voltage level is applied to the first voltage input terminal, and a second voltage of a second voltage level is applied to the second voltage input terminal, a third node controller, which is connected between the first voltage input terminal and a second clock terminal and controls a voltage level of a third control node according to a voltage level of the second control node, and a first output controller including a first pull-up transistor and a first output controller, where the first pull-up transistor is connected between the first voltage input terminal and a first output terminal and outputs a first gate control signal of the first voltage level to the first output terminal, and the first pull-down transistor is connected between the second voltage input terminal and the first output terminal and outputs a first gate control signal of the second voltage level to the first output terminal. The first pull-down transistor may include a first gate and a second gate, and a gate of the first pull-up transistor and the first gate of the first pull-down transistor may be connected to the third control node or a node electrically connected to the third control node.

The second gate of the first pull-down transistor may be connected to a third voltage input terminal to which a third voltage of the second voltage level is applied, and the third voltage may be less than the second voltage.

The third voltage may vary over time.

The third node controller may include: a first control transistor, which is connected between the first voltage input terminal and the third control node, and of which a gate is connected to the second control node, and a second control transistor, which is connected between the second clock terminal and the third control node, and of which a gate is connected to the first control node. A second gate control signal corresponding to the voltage level of the third control node may be output from a second output terminal connected to the third control node, and a timing at which the second gate control signal is output at the second voltage level may be the same as a timing at which the first gate control signal is output at the first voltage level.

The scan driver may further include a second output controller including a second pull-up transistor, which is connected between the first voltage input terminal and a second output terminal, of which a gate is connected to the second control node, and which outputs a second gate control signal of the first voltage level to the second output terminal, and a second pull-down transistor, which is connected between the second clock terminal and the second output terminal, of which a gate is connected to the first control node, and which outputs a second gate control signal of the second voltage level to the second output terminal, where a timing at which the second gate control signal is output at the second voltage level is the same as a timing at which the first gate control signal is output at the first voltage level.

A carry signal corresponding to the voltage level of the third control node may be output from a carry output terminal connected to the third control node, and a timing at which the carry signal is output at the second voltage level may be the same as a timing at which the first gate control signal is output at the first voltage level.

The second gate control signal output from the second output terminal may include a carry signal.

The scan driver may further include a fourth node controller connected between the third node controller and the first output controller, where the fourth node controller includes a third control transistor, which is connected between the first voltage input terminal and a fourth control node, and of which a gate is connected to the third control node, a fourth control transistor, which is connected to the second voltage input terminal and the fourth control node, and of which a first gate is connected to the third control node and a second gate is connected to the third voltage input terminal, a fifth control transistor, which is connected between the first voltage input terminal and a fifth control node, and of which a gate is connected to the fourth control node, and a sixth control transistor, which is connected between the second voltage input terminal and the fifth control node, and of which a first gate is connected to the fourth control node and a second gate is connected to a fourth voltage input terminal to which a fourth voltage of the second voltage level is applied, where the gate of the first pull-up transistor and the first gate of the first pull-down transistor are connected to the fifth control node, and the fourth voltage is less than the second voltage.

A second gate control signal corresponding to a voltage level of the third control node or the fifth control node may be output from a second output terminal connected to the third control node or the fifth control node, and a timing at which the second gate control signal is output at the second voltage level may be the same as a timing at which the first gate control signal is output at the first voltage level.

According to one or more embodiments, a scan driver includes: a plurality of stages. Each of the plurality of stages includes: a first node controller connected to an input terminal, a first clock terminal, and a first control node, where a start signal is applied to the input terminal, and a first clock signal is applied to the first clock terminal, a second node controller connected to the first clock terminal, a second clock terminal, a first voltage input terminal, a second voltage input terminal, and a second control node, where a second clock signal is applied to the second clock terminal, a first voltage of a first voltage level is applied to the first voltage input terminal, and a second voltage of a second voltage level is applied to the second voltage input terminal, a first output controller including a first pull-up transistor, which is connected between the first voltage input terminal and a first output terminal, of which a gate is connected to the second control node, and which outputs a first gate control signal of the first voltage level to the first output terminal, and a first pull-down transistor, which is connected between the second clock terminal and the first output terminal, of which a gate is connected to the first control node, and which outputs a first gate control signal of the second voltage level to the first output terminal, a third node controller, which is connected between the first voltage input terminal and a third clock terminal to which a third clock signal is applied, and controls a voltage level of a third control node according to voltage levels of the first control node and the second control node, and a second output controller including a second pull-up transistor, which is connected between the first voltage input terminal and a second output terminal and outputs a second gate control signal of the first voltage level to the second output terminal, and a second pull-down transistor, which is connected between the second voltage input terminal and the second output terminal and outputs a second gate control signal of the second voltage level to the second output terminal. The second pull-down transistor may include a first gate and a second gate, and a gate of the second pull-up transistor and the first gate of the second pull-down transistor may be connected to the third control node.

The second gate of the second pull-down transistor may be connected to a third voltage input terminal to which a third voltage of the second voltage level is applied, and the third voltage may be less than the second voltage.

The third voltage may vary over time.

The second gate control signal output from each of the stages may be applied to a pixel of a pixel row corresponding to the each stage and a pixel of a pixel row corresponding to a next stage.

The first gate control signal output from the first output terminal may include a carry signal.

A carry signal corresponding to the voltage level of the third control node may be output from a carry output terminal connected to the third control node, and a timing at which the carry signal is output at the second voltage level may be the same as a timing at which the first gate control signal is output at the second voltage level.

The third node controller may include a first control transistor, which is connected between the first voltage input terminal and the third control node, and of which a gate is connected to the second control node, and a second control transistor, which is connected between the third clock terminal and the third control node, and of which a gate is connected to the first control node.

The scan driver may further include a fourth node controller, which is connected between the first voltage input terminal and a fourth clock terminal to which a fourth clock signal is applied, and controls a voltage level of a fourth control node according to the voltage levels of the first control node and the second control node, and a third output controller including a third pull-up transistor, which is connected between the first voltage input terminal and a third output terminal and outputs a third gate control signal of the first voltage level to the third output terminal, and a third pull-down transistor, which is connected between the second voltage input terminal and the third output terminal and outputs a third gate control signal of the second level to the third output terminal, the third pull-down transistor may include a first gate and a second gate, a gate of the third pull-up transistor and the first gate of the third pull-down transistor may be connected to the fourth control node, and the second gate of the third pull-down transistor may be connected to the third voltage input terminal.

The fourth node controller may include a third control transistor, which is connected between the first voltage input terminal and the fourth control node, and of which a gate is connected to the second control node, and a fourth control transistor, which is connected between the fourth clock terminal and the fourth control node, and of which a gate is connected to the first control node. The second clock signal may be applied by shifting a phase of the first clock signal, and the fourth clock signal may be applied in the same phase as the second clock signal.

The second clock signal may be applied by shifting a phase of the first clock signal, and the third clock signal may be applied in the same phase as the second clock signal.

When a displayed image includes a moving image, the plurality of stages may sequentially output on-voltage levels of the first gate control signal and the second gate control signal, when the displayed image includes a still image, the plurality of stages may sequentially output the on-voltage level of the first gate control signal and continuously output an off-voltage level of the second gate control signal, and the displayed image may include a frame image or a partial image of the frame image.

According to one or more embodiments, a scan driver includes a plurality of stages. Each of the plurality of stages includes: a first node controller connected to an input terminal, a first clock terminal, and a first control node, where a start signal is applied to the input terminal, and a first clock signal is applied to the first clock terminal, a second node controller connected to the first clock terminal, a second clock terminal, a first voltage input terminal, a second voltage input terminal, and a second control node, where a second clock signal is applied to the second clock terminal, a first voltage of a first voltage level is applied to the first voltage input terminal, and a second voltage of a second voltage level is applied to the second voltage input terminal, a third node controller, which is connected between the first voltage input terminal and the second clock terminal and controls a voltage level of a third control node according to voltage levels of the first control node and the second control node, a first output controller including a first pull-up transistor, which is connected between the first voltage input terminal and a first output terminal, of which a gate is connected to the second control node, and which outputs a first gate control signal of the first voltage level to the first output terminal, and a first pull-down transistor, which is connected between the second clock terminal and the first output terminal, of which a gate is connected to the first control node, and which outputs a first gate control signal of the second voltage level to the first output terminal, and a second output controller including a second pull-up transistor, which is connected between a fourth voltage input terminal, to which a fourth voltage of the first voltage level is applied, and a second output terminal, and outputs a second gate control signal of the first voltage level to the second output terminal, and a second pull-down transistor, which is connected between the second voltage input terminal and the second output terminal and outputs a second gate control signal of the second voltage level to the second output terminal. The second pull-down transistor may include a first gate and a second gate, and a gate of the second pull-up transistor and the first gate of the second pull-down transistor may be connected to the third control node.

The second gate of the second pull-down transistor may be connected to a third voltage input terminal to which a third voltage of the second voltage level is applied, and the third voltage may be less than the second voltage.

The third voltage may vary over time.

The second gate control signal output from each of the stages may be applied to a pixel of a pixel row corresponding to the each stage and a pixel of a pixel row corresponding to a next stage.

The first gate control signal output from the first output terminal may include a carry signal.

A carry signal corresponding to the voltage level of the third control node may be output from a carry output terminal connected to the third control node, and a timing at which the carry signal is output at the second voltage level may be the same as a timing at which the first gate control signal is output at the second voltage level.

The third node controller may include a first control transistor, which is connected between the first voltage input terminal and the third control node, and of which a gate is connected to the second control node, and a second control transistor, which is connected between the second clock terminal and the third control node, and of which a gate is connected to the first control node.

The scan driver may further include a third output controller including a third pull-up transistor, which is connected between a fifth voltage input terminal, to which a fifth voltage of the first voltage level is applied, and a third output terminal, and outputs a third gate control signal of the first voltage level to the third output terminal, and a third pull-down transistor, which is connected between the second voltage input terminal and the third output terminal and outputs a third gate control signal of the second voltage level to the third output terminal. The third pull-down transistor may include a first gate and a second gate, a gate of the third pull-up transistor and the first gate of the third pull-down transistor may be connected to the third control node, and the second gate of the third pull-down transistor may be connected to the third voltage input terminal.

When a displayed image includes a moving image, the plurality of stages may sequentially output on-voltage levels of the first gate control signal and the second gate control signal, when the displayed image includes a still image, the plurality of stages may sequentially output the on-voltage level of the first gate control signal and continuously output an off-voltage level of the second gate control signal, and the displayed image may include a frame image or a partial image of the frame image.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
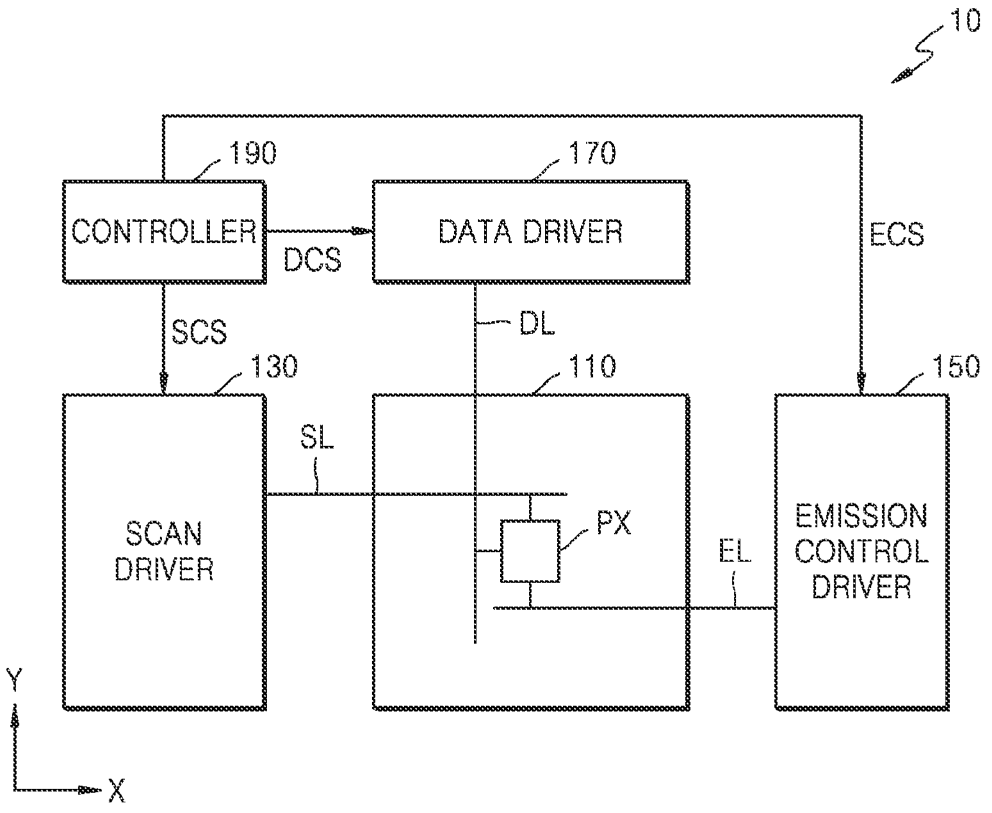
FIG. 1 is a diagram schematically illustrating a display apparatus according to an embodiment.

Reference will now be made in detail to embodiments, examples of which are illustrated in the accompanying drawings, where like reference numerals refer to like elements throughout the disclosure. In this regard, the embodiments of the disclosure may have different forms and should not be construed as being limited to the descriptions set forth herein. Accordingly, the embodiments are merely described below, by referring to the figures, to explain aspects of the description of the disclosure. As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or any variations thereof.

As the disclosure allows for various changes and numerous embodiments, certain embodiments will be illustrated in the drawings and described in detail in the written description. Hereinafter, effects and features of the disclosure and a method for accomplishing them will be described more fully with reference to the accompanying drawings, in which embodiments of the disclosure are shown. This disclosure may, however, be embodied in many different forms and should not be construed as limited to the embodiments set forth herein.

In an embodiment below, terms such as "first" and "second" are used herein merely to describe a variety of elements, but the elements are not limited by the terms. Such terms are used only for the purpose of distinguishing one element from another element.

In an embodiment below, an expression used in the singular encompasses the expression of the plural, unless it has a clearly different meaning in the context.

In an embodiment below, terms such as "include" or "comprise" may be construed to denote a certain characteristic or element, or any combinations thereof, but may not be construed to exclude the existence of or a possibility of addition of one or more other characteristics, elements, or any combinations thereof.

It will be understood that when a layer, area, or element is referred to as being "on" another layer, area, or element, it may be "directly on" the other layer, area, or element or may be "indirectly on" the other layer, area, or element with one or more intervening layers, areas, or elements therebetween.

Sizes of elements in the drawings may be exaggerated or reduced for convenience of explanation. For example, sizes and thicknesses of the elements in the drawings are randomly indicated for convenience of explanation, and thus, the disclosure is not necessarily limited to the illustrations of the drawings.

In the disclosure, "A and/or B" may include "A," "B," or "A and B." In addition, in the disclosure, "at least one of A and B" may include "A," "B," or "A and B."

In the embodiments below, when it is described that X and Y are connected to each other, it includes a case in which X and Y are electrically connected to each other, a case in which X and Y are functionally connected to each other, and a case in which X and Y are directly connected to each other. Herein, X and Y may include objects, such as devices, elements, circuits, lines, electrodes, terminals, conductive films, and layers. Therefore, a certain connection relationship, for example, the connection relationship shown in the drawings or detailed description may include a connection relationship other than the connection relationship shown in the drawings or detailed description.

For example, when X and Y are electrically connected to each other, it includes a case in which one or more elements (e.g., switches, transistors, capacitors, inductors, resistors, diodes, etc.), which enable electrical connection between X and Y, are connected between X and Y.

In the following embodiments, the term "on" used in connection with an element state may refer to an active state of the element, and the term "off" may refer to an inactive state of the element. As used in connection with a signal received by an element, "on" may refer to a signal that activates the element, and "off" may refer to a signal that deactivates the element. The element may be activated by a voltage of a high level or a voltage of a low level. For example, a P-type transistor (P-channel transistor) may be activated by a voltage of a low level, and an N-type transistor (N-channel transistor) may be activated by a voltage of a high level Accordingly, it should be understood that "on" voltages for the P-type transistor and the N-type transistor have opposite voltage levels (low vs. high) to each other. Hereinafter, a voltage level at which a transistor is turned on is referred to as an on-voltage level, and a voltage level at which a transistor is turned off is referred to as an off-voltage level.

FIG. 1 is a diagram schematically illustrating a display apparatus 10 according to an embodiment.

The display apparatus 10 according to an embodiment may include a display apparatus, such as an organic light-emitting display apparatus, an inorganic light-emitting display apparatus (an inorganic light-emitting display or an inorganic electroluminescent ("EL") display apparatus), and a quantum dot light-emitting display.

Referring to FIG. 1, the display apparatus 10 according to an embodiment may include a pixel unit 110, a scan driver 130, an emission control driver 150, a data driver 170, and a controller 190.

A plurality of pixels PX and signal lines configured to transmit an electrical signal to the plurality of pixels PX may be arranged in the pixel unit 110. The pixel unit 110 may include a display area in which an image is displayed.

The plurality of pixels PX may be repeatedly arranged in a first direction (an x direction; a row direction) and a second direction (a y direction; a column direction). The plurality of pixels PX may be arranged in various shapes, such as a stripe arrangement, a PenTile™ arrangement, and a mosaic arrangement, to implement an image. Each of the plurality of pixels PX may include an organic light-emitting diode as a display element, and the organic light-emitting diode may be connected to a pixel circuit. The pixel circuit may include a plurality of transistors and at least one capacitor.

Figure 2:
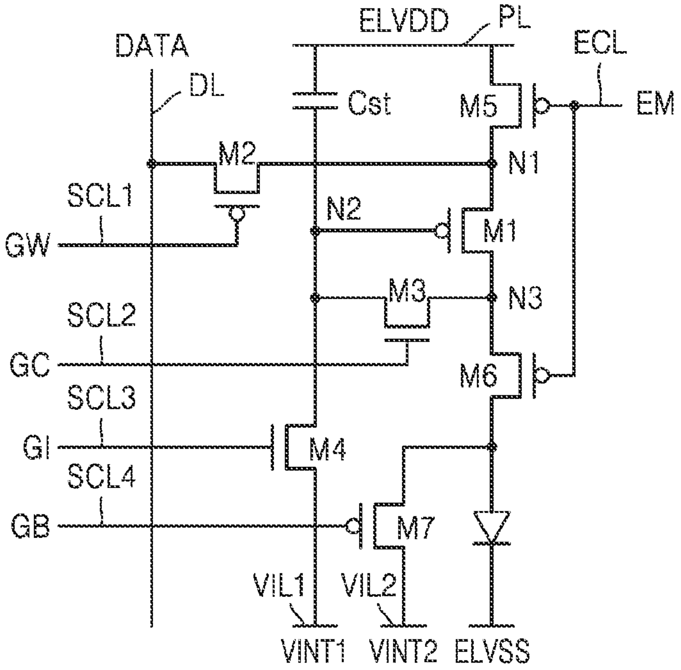
FIG. 2 is an equivalent circuit diagram illustrating a pixel according to an embodiment.

The signal lines configured to transmit an electrical signal to the plurality of pixels PX may include a plurality of scan lines SL each extending in the first direction, a plurality of emission control lines EL each extending in the first direction, and a plurality of data lines DL each extending in the second direction. The plurality of scan lines SL may be arranged apart from each other in the second direction and may be configured to transmit a scan signal to the pixels PX. The plurality of emission control lines EL may be arranged apart from each other in the second direction and may be configured to transmit an emission control signal to the pixels PX. The plurality of data lines DL may be arranged apart from each other in the first direction and may be configured to transmit a data signal to the pixels PX. Each of the plurality of pixels PX may be connected to at least one corresponding scan line from among the plurality of scan lines SL, a corresponding emission control line from among the plurality of emission control lines EL, and a corresponding data line from among the plurality of data lines DL. In an embodiment, the at least one scan line connected to the pixels PX may include at least one of a first scan control line SCL1, a second scan control line SCL2, a third scan control line SCL3, and a fourth scan control line SCL4, which are shown in FIG. 2.

The scan driver 130 may be connected to the plurality of scan lines SL and may generate scan signals in response to a control signal SCS from the controller 190 and sequentially transmit the generated signals to the scan lines SL. The scan signal may include a gate control signal for controlling turn-on and turn-off of a transistor included in the pixel PX. The scan signal may include a square wave signal in which an on-voltage (on-voltage level) at which a transistor included in the pixel PX may be turned on and an off-voltage (off-voltage level) at which the transistor may be turned off are repeated. In an embodiment, the on-voltage may include a high-level voltage (hereinafter, referred to as a "high voltage") or a low-level voltage (hereinafter, referred to as a "low voltage"). A period in which an on-voltage of a scan signal is maintained (hereinafter, referred to as an "on-voltage period") and a period in which an off-voltage of the scan signal is maintained (hereinafter, referred to as an "off-voltage period") may be determined according to a function of a transistor that receives the scan signal within the pixel PX. The scan driver 130 may include a shift register (or stage) configured to sequentially generate and output a scan signal.

The emission control driver 150 may be connected to the plurality of emission control lines EL and may generate an emission control signal in response to a control signal ECS from the controller 190 and sequentially transmit the generated signal to the emission control lines EL. The emission control signal may include a gate control signal for controlling turn-on and turn-off of a transistor included in the pixel PX. The emission control signal may include a square wave signal in which an on-voltage at which a transistor included in the pixel PX may be turned on and an off-voltage at which the transistor may be turned off are repeated. The emission control driver 150 may include a shift register (or stage) configured to sequentially generate and output an emission control signal. The data driver 170 may be connected to the plurality of data lines DL and be configured to transmit data signals to the data lines DL in response to a control signal DCS from the controller 190. The data signals received by the data lines DL may be transmitted to the pixels PX to which a scan signal is transmitted. To this end, the data driver 170 may transmit data signals to the data lines DL for synchronization with the scan signal.

The controller 190 may generate the control signal SCS, the control signal ECS, and the control signal DCS based on signals received from the outside. The controller 190 may supply the control signal SCS to the scan driver 130, supply the control signal ECS to the emission control driver 150, and supply the control signal DCS to the data driver 170.

In an embodiment, a plurality of transistors included in a pixel circuit may include N-type oxide thin-film transistors. In the oxide thin-film transistor, an active pattern (semiconductor layer) may include an oxide.

In an embodiment, some of the plurality of transistors included in the pixel circuit may include N-type oxide thin-film transistors, and the other ones may include P-type silicon thin-film transistors. In the silicon thin-film transistor, an active pattern (semiconductor layer) may include amorphous silicon, polysilicon, or the like.

FIG. 2 is an equivalent circuit diagram illustrating a pixel PX according to an embodiment.

Referring to FIG. 2, the pixel PX may include a pixel circuit PC and an organic light-emitting diode OLED as a display element connected to the pixel circuit PC. The pixel circuit PC may include a plurality of first to seventh transistors M1 to M7, a capacitor Cst, signal lines, first and second initialization-voltage lines VIL1 and VIL2, and a driving voltage line PL, the signal lines being connected to the first to seventh transistors M1 to M7 and the capacitor Cst. The signal lines may include a data line DL, a first scan control line SCL1, a second scan control line SCL2, a third scan control line SCL3, a fourth scan control line SCL4, and an emission control line ECL.

The first transistor M1 may include a driving transistor, and the second to seventh transistors M2 to M7 may include switching transistors. A first terminal of each of the first to seventh transistors M1 to M7 may include a source terminal or drain terminal, and a second terminal of each of the first to seventh transistors M1 to M7 may include a terminal different from the first terminal, according to a type (p-type or n-type) and/or operating condition of a transistor. For example, when the first terminal includes a source terminal, the second terminal may include a drain terminal. In an embodiment, the source terminal and the drain terminal may be interchangeably used with a source electrode and a drain electrode, respectively.

The driving voltage line PL may be configured to transfer a first power voltage ELVDD to the first transistor M1. The first power voltage ELVDD may include a high voltage applied to a first electrode (pixel electrode or anode) of an organic light-emitting diode included in each pixel PX. The first initialization-voltage line VIL1 may be configured to apply a first initialization-voltage VINT1 for initializing the first transistor M1 to the pixel PX. The second initialization-voltage line VIL2 may be configured to transfer a second initialization-voltage VINT2 for initializing the organic light-emitting diode OLED to the pixel PX.

In FIG. 2, the third transistor M3 and the fourth transistor M4 from among the first to seventh transistors M1 to M7 are implemented as N-channel metal-oxide-semiconductor field-effect transistors ("MOSFET"; NMOS), and the other ones are implemented as P-channel MOSFETs ("PMOS").

The first transistor M1 may be connected between the driving voltage line PL and the organic light-emitting diode OLED. The first transistor M1 may be connected to the driving voltage line PL via the fifth transistor M5 and may be electrically connected to the organic light-emitting diode OLED via the sixth transistor M6. The first transistor M1 may include a gate connected to a second node N2, a first terminal connected to a first node N1, and a second terminal connected to a third node N3. The first transistor M1 may receive a data signal according to a switching operation of the second transistor M2 and supply a driving current to the organic light-emitting diode OLED.

The second transistor M2 (data write transistor) may be connected between the data line DL and the first node N1 and may be connected to the driving voltage line PL via the fifth transistor M5. The first node N1 may include a node to which the first transistor M1 and the fifth transistor M5 are connected. The second transistor M2 may include a gate connected to a first scan control line SCL1, a first terminal connected to the data line DL, and a second terminal connected to the first node N1 (or the first terminal of the first transistor M1). The second transistor M2 may be turned on in response to a first scan control signal GW received via the first scan control line SCL1 and perform a switching operation of transferring a data signal received via the data line DL to the first node N1.

The third transistor M3 (compensation transistor) may be connected between the second node N2 and the third node N3. The third transistor M3 may be connected to the organic light-emitting diode OLED via the sixth transistor M6. The second node N2 may include a node to which the gate of the first transistor M1 is connected, and the third node N3 may include a node to which the first transistor M1 and the sixth transistor M6 are connected. The third transistor M3 may include a gate connected to the second scan control line SCL2, a first terminal connected to the second node N2 (or the gate of the first transistor M1), and a second terminal connected to the third node N3 (or the second terminal of the first transistor M1). The third transistor M3 may be turned on in response to a second scan control signal GC received via the second scan control line SCL2 and diode-connect the first transistor M1, and thus, a threshold voltage of the first transistor M1 may be compensated for.

The fourth transistor M4 (first initialization transistor) may be connected between the second node N2 and the first initialization-voltage line VIL1. The fourth transistor M4 may include a gate connected to the third scan control line SCL3, a first terminal connected to the second node N2, and a second terminal connected to the first initialization-voltage line VIL1. The fourth transistor M4 may be turned on in response to a third scan control signal GI received via the third scan control line SCL3 and may be configured to apply the first initialization-voltage VINT1 to the gate of the first transistor M1 to initialize a gate of the first transistor M1.

The fifth transistor M5 (first emission control transistor) may be connected between the driving voltage line PL and the first node N1. The sixth transistor M6 (second emission control transistor) may be connected between the third node N3 and the organic light-emitting diode OLED. The fifth transistor M5 may include a gate connected to the emission control line ECL, a first terminal connected to the driving voltage line PL, and a second terminal connected to the first node N1. The sixth transistor M6 may include a gate connected to the emission control line ECL, a first terminal connected to the third node N3, and a second terminal connected to a pixel electrode of the organic light-emitting diode OLED. The fifth transistor M5 and the sixth transistor M6 may be simultaneously turned on in response to an emission control signal EM received via the emission control line ECL, so that a driving current flows in the organic light-emitting diode OLED.

The seventh transistor M7 (second initialization transistor) may be connected between the organic light-emitting diode OLED and the second initialization-voltage line VIL2. The seventh transistor M7 may include a gate connected to the fourth scan control line SCL4, a first terminal connected to the second terminal of the sixth transistor M6 and the pixel electrode of the organic light-emitting diode OLED, and a second terminal connected to the second initialization-voltage line VIL2. The seventh transistor M7 may be turned on in response to a fourth scan control signal GB received via the fourth scan control line SCL4 and may be configured to apply the second initialization-voltage VINT2 to the pixel electrode of the organic light-emitting diode OLED so as to initialize the organic light-emitting diode OLED. The seventh transistor M7 may be omitted.

The capacitor Cst may include a first electrode and a second electrode. The first electrode of the capacitor Cst may be connected to the gate of the first transistor M1, and the second electrode may be connected to the driving voltage line PL. The capacitor Cst may store and maintain a voltage corresponding to a voltage difference between opposite ends, i.e., the driving voltage line PL and the gate of the first transistor M1, so that a voltage applied to the gate of the first transistor M1 may be maintained.

The organic light-emitting diode OLED may include the pixel electrode and an opposite electrode, and the opposite electrode may receive a second power voltage ELVSS. The second power voltage ELVSS may include a low voltage to be applied to a second electrode (opposite electrode or cathode) of the organic light-emitting diode OLED. The organic light-emitting diode OLED may receive a driving current IOLED from the first transistor T1 and emit light, so that an image is displayed. The first power voltage ELVDD and the second power voltage ELVSS may include driving voltages that allow the plurality of pixels PX to emit light.

The pixel PX may be operated in a non-emission period and an emission period during one frame period. The frame period may include a period in which one frame image is displayed. The non-emission period may include an initialization period in which the fourth transistor M4 is turned on so that the gate of the first transistor M1 is initialized, a date writing period in which the second transistor M2 is turned on so that a data signal is supplied to the pixel, a compensation period in which the third transistor M3 is turned on so that the threshold voltage of the first transistor M1 is compensated for, and a reset period in which the seventh transistor M7 is turned on so that the organic light-emitting diode OLED is initialized. The emission period may include a period in which the fifth transistor M5 and the sixth transistor M6 are turned on so that the organic light-emitting diode OLED emits light. The emission period may be greater than each of the initialization period, data writing period, compensation period, and reset period of the non-emission period.

In the present embodiment, at least one of the plurality of transistors M1 to M7 may include a semiconductor layer including an oxide, and the remaining ones may include a semiconductor layer including silicon. For example, when the first transistor (driving transistor) directly affecting a brightness of the display apparatus includes a semiconductor layer including polycrystalline silicon that is highly reliable, a high-resolution display apparatus may be implemented.

Figure 3:
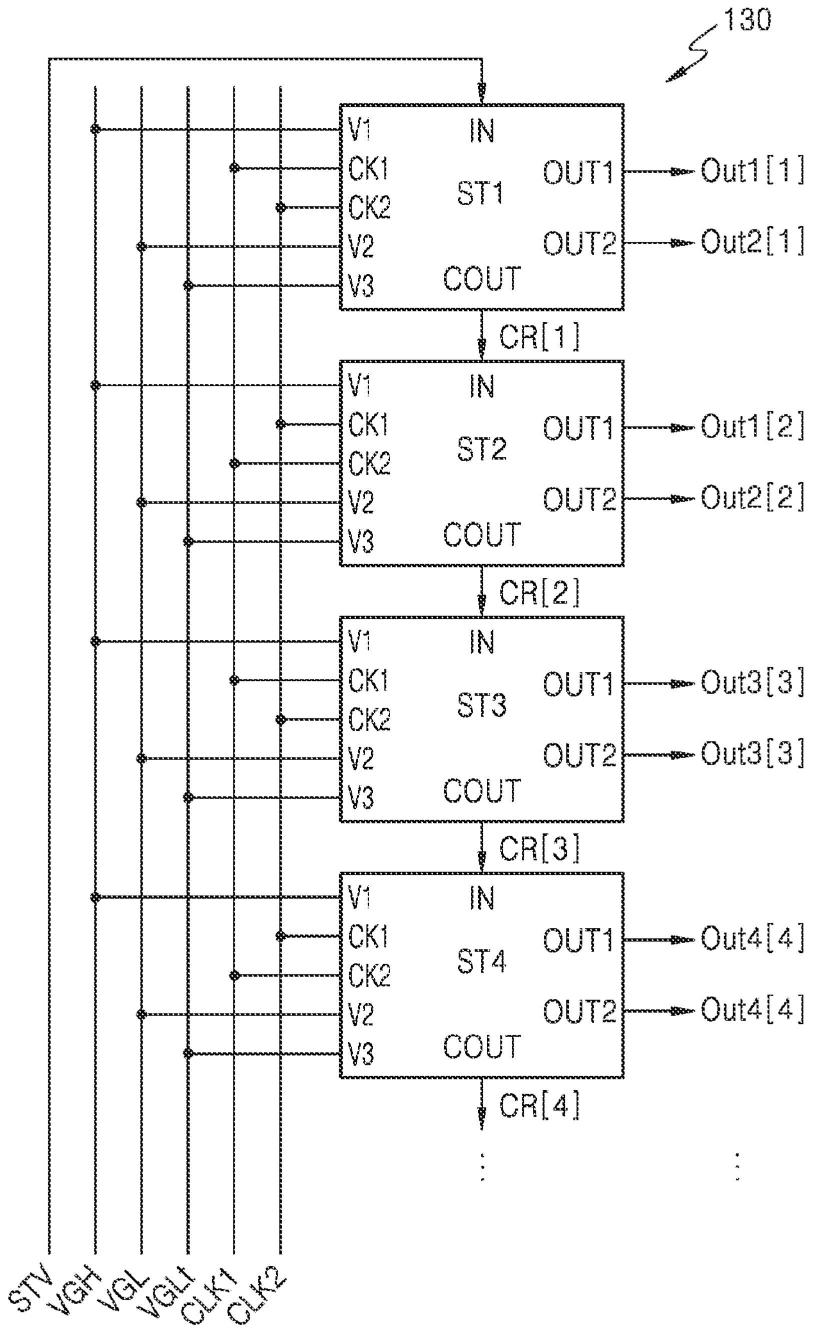
FIG. 3 is a diagram schematically illustrating a scan driver according to an embodiment.

In addition, because the oxide semiconductor has high carrier mobility and low leakage current, a voltage drop is not large even when the display apparatus is driven for a long time. In other words, a color change of an image according to a voltage drop is not large even when the display apparatus is driven at low frequencies, and thus, the display apparatus may be driven at low frequencies. Because the oxide semiconductor has an advantage of low leakage current, as described above, at least one of the third transistor M3 and the fourth transistor M4, which are connected to the gate of the first transistor M1, may be adopted as an oxide semiconductor so as to prevent leakage current that may flow to the gate of the first transistor M1, and at the same time, reduce power consumption. FIG. 3 is a diagram schematically illustrating a scan driver 130 according to an embodiment.

Referring to FIG. 3, the scan driver 130 may include a plurality of stages ST1, ST2, ST3, ST4, etc. The stages ST1, ST2, ST3, ST4, etc. may correspond to pixel rows (pixel lines) provided in the pixel unit 110, respectively. The number of stages of the scan driver 130 may be variously modified according to the number of pixel rows.

Each of the stages ST1, ST2, ST3, ST4, etc. may output a plurality of output signals in response to a start signal. For example, each of the stages ST1, ST2, ST3, ST4, etc. may output a first output signal and a second output signal. Here, the first output signal output from each of the stages ST1, ST2, ST3, ST4, etc. may include a gate control signal for controlling turn-on and turn-off of a P-type transistor, and the second output signal may include a gate control signal for controlling turn-on and turn-off of an N-type transistor. For example, the first output signal output from each of the stages ST1, ST2, ST3, ST4, etc. may include the first scan control signal GW applied via a first scan control line SCL (see FIG. 2), and the second output signal may include the second scan control signal GC applied via a second scan control line SCL2 (see FIG. 2) or the third scan control signal GI applied via a third scan control line SCL3 (see FIG. 2).

Each of the stages ST1, ST2, ST3, ST4, etc. may include an input terminal IN, a first clock terminal CK1, a second clock terminal CK2, a first voltage input terminal V1, a second voltage input terminal V2, a third voltage input terminal V3, a first output terminal OUT1, a second output terminal OUT2, and a carry output terminal COUT.

The input terminal IN may receive an external signal STV or a carry signal output from a previous stage, as a start signal. In an embodiment, the external signal STV may be applied to the input terminal IN of the first stage ST1, and from the second stage ST2, a carry signal (previous carry signal) output from a previous stage may be applied to the input terminal IN. Here, the previous carry signal may include a carry signal output from an immediately preceding stage that is adjacent. For example, the first stage ST1 may start driving by the external signal STV, and a carry signal CR[1] output from the first stage ST1 may be input to the input terminal IN of the second stage ST2.

A first clock signal CLK1 or a second clock signal CLK2 may be transmitted to the first clock terminal CK1 and the second clock terminal CK2. The first clock signal CLK1 and the second clock signal CLK2 may be alternately applied to the stages ST1, ST2, ST3, ST4, etc. For example, in an odd-numbered stage, the first clock signal CLK1 may be applied to the first clock terminal CK1, and the second clock signal CLK2 may be applied to the second clock terminal CK2. In addition, in an even-numbered stage, the second clock signal CLK2 may be applied to the first clock terminal CK1, and the first clock signal CLK1 may be applied to the second clock terminal CK2.

The first voltage input terminal V1 may receive a first voltage VGH that is a high voltage, and the second voltage input terminal V2 may receive a second voltage VGL that is a low voltage. The third voltage input terminal V3 may receive a third voltage VGLt. The first voltage VGH, the second voltage VGL, and the third voltage VGLt may be supplied as global signals from the controller 190 shown in FIG. 1 and/or a power supply unit (not shown).

The first output terminal OUT1 may output a first output signal Out1, and the second output terminal OUT2 may output a second output signal Out2. When the first output signal Out1 is a low voltage, the second output signal Out2 may be a high voltage. The first output signal Out1 and the second output signal Out2 may control turn-on and turn-off of transistors of different types from each other. For example, the first output signal Out1 may include a gate control signal for controlling turn-on and turn-off of a P-type transistor, and the second output signal Out2 may include a gate control signal for controlling turn-on and turn-off of an N-type transistor. An on-voltage of the first output signal Out1 may be a low voltage, and an on-voltage of the second output signal Out2 may be a high voltage. The carry output terminal COUT may output a carry signal CR.

Figure 4:
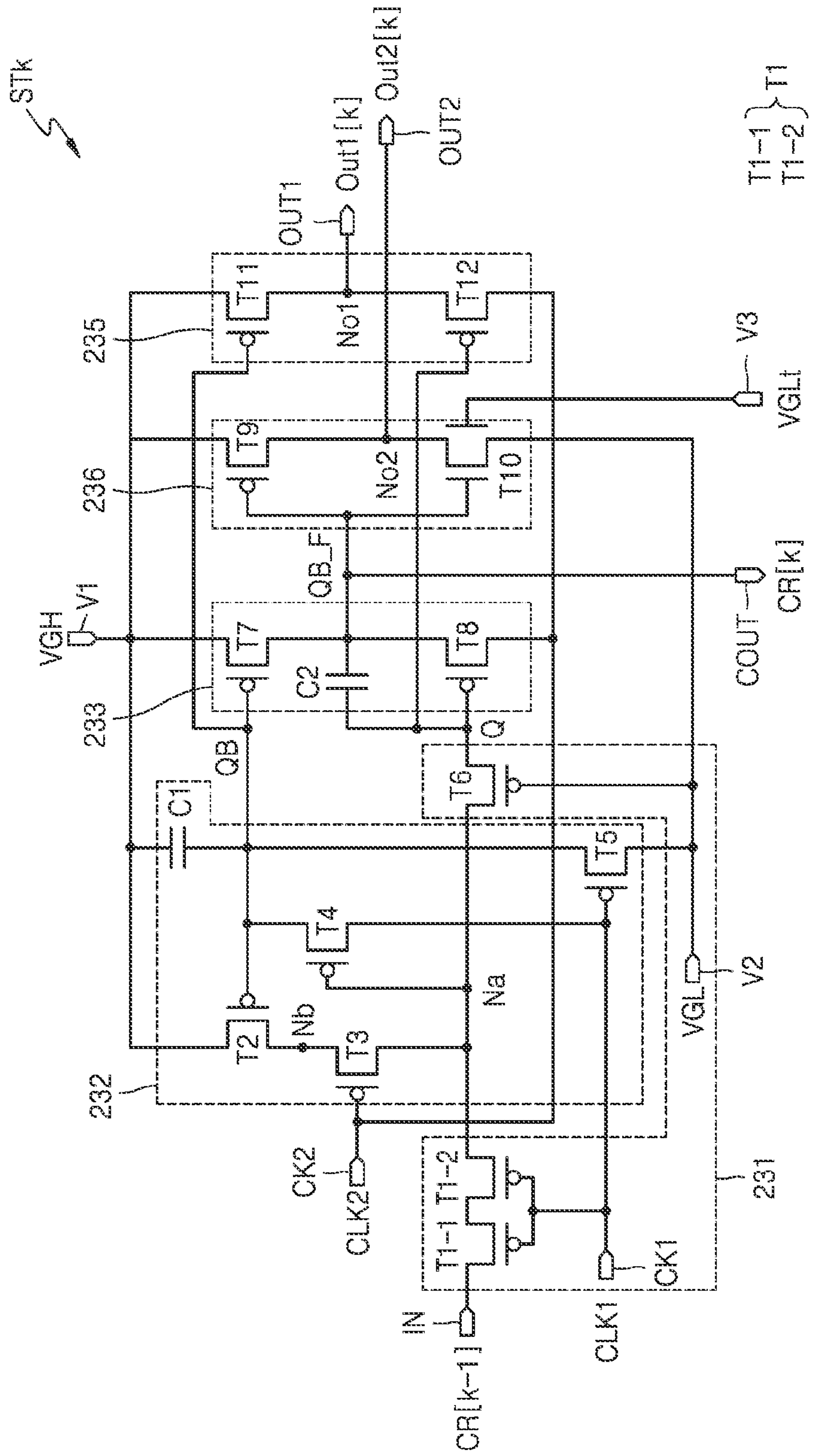
FIG. 4 is a circuit diagram illustrating an example of a stage included in the scan driver in FIG. 3.
Figure 5A:
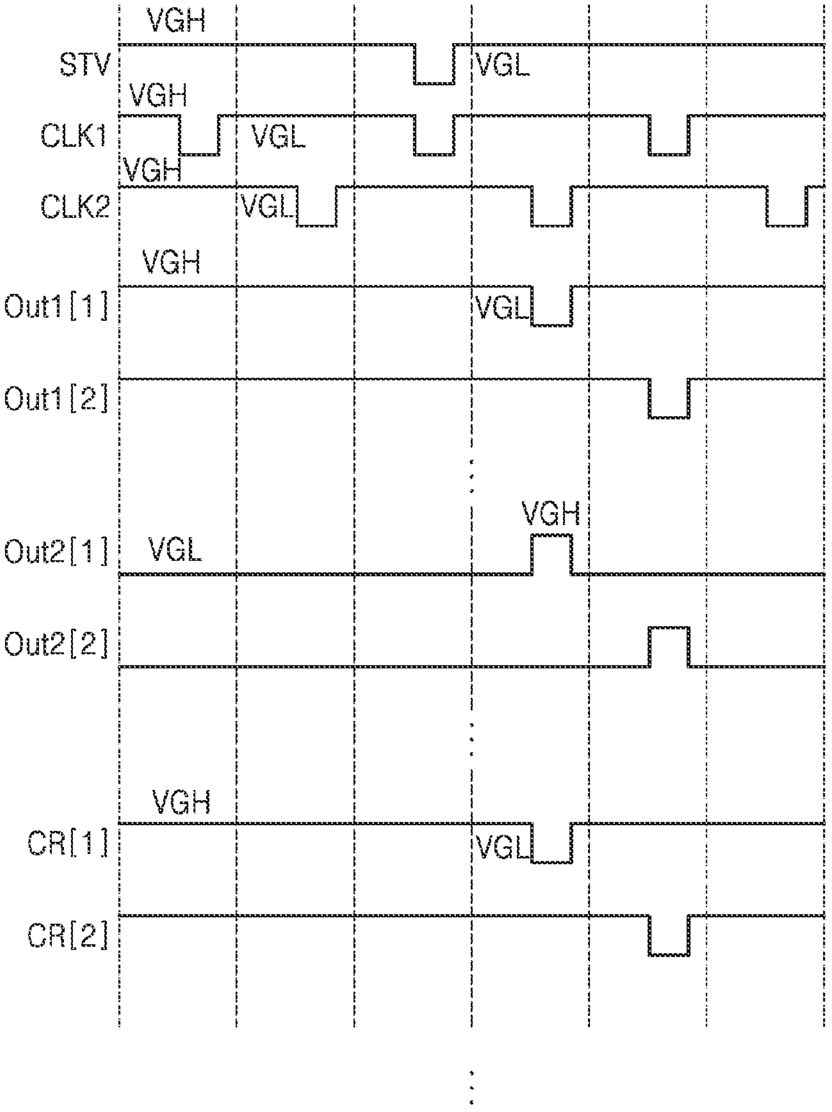
FIG. 5A is a waveform diagram of an input/output signal of the scan driver in FIG. 3.
Figure 5B:
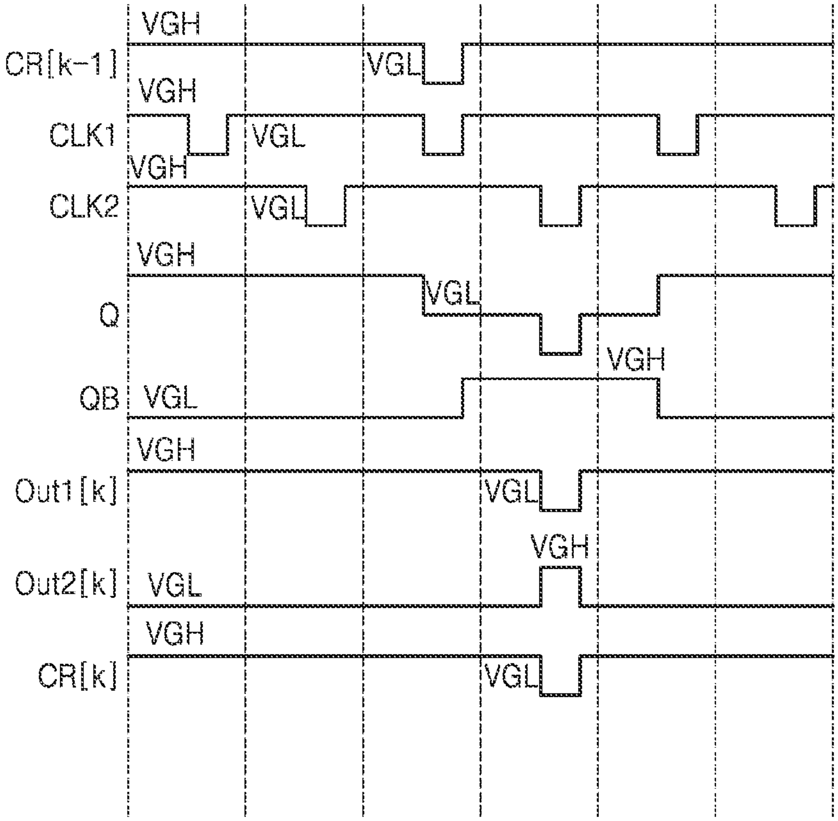
FIG. 5B is a waveform diagram illustrating driving of the stage in FIG. 4.
Figure 6:
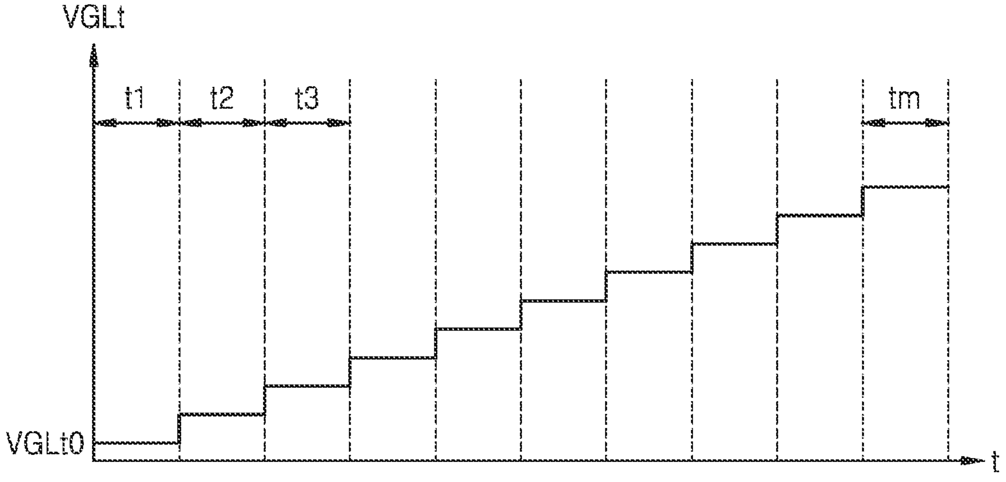
FIG. 6 is a waveform diagram of a third voltage.

FIG. 4 is a circuit diagram illustrating an example of a stage STK included in the scan driver 130 in FIG. 3. FIG. 5A is a waveform diagram of an input/output signal of the scan driver 130 in FIG. 3. FIG. 5B is a waveform diagram illustrating driving of the stage STK in FIG. 4. FIG. 6 is a waveform diagram of the third voltage VGLt.

Each of the stages ST1, ST2, ST3, ST4, etc. may include a plurality of nodes, and hereinafter, some nodes from among the plurality of nodes are referred to as a first control node Q, a second control node QB, and a third control node QB_F. Hereinafter, a $k^{th}$ stage STK is described as an example of an odd-numbered stage, and the $k^{th}$ stage STK may output a $k^{th}$ first output signal Out1 [k] and a $k^{th}$ second output signal Out2[k] to a $k^{th}$ row of the pixel unit 110. Hereinafter, for convenience of explanation, the $k^{th}$ stage STK, the $k^{th}$ first output signal Out1[k], and the $k^{th}$ second output signal Out2[k] are described as a stage STK, a first output signal Out1[k], and a second output signal Out2[k], respectively.

The stage STK may include a first node controller 231, a second node controller 232, a third node controller 233, a first output controller 235, and a second output controller 236. Each of the first node controller 231, the second node controller 232, the third node controller 233, the first output controller 235, and the second output controller 236 may include at least one transistor. The at least one transistor may include an N-type transistor and/or a P-type transistor. The N-type transistor may include an N-type oxide semiconductor transistor. The P-type transistor may include a P-type silicon semiconductor transistor. The N-type oxide semiconductor transistor may include a dual gate transistor including a first gate and a second gate, where the first gate is a top gate disposed over a semiconductor, and the second gate is a bottom gate disposed under the semiconductor. For example, first to ninth transistors T1 to T9, an eleventh transistor T11, and a twelfth transistor T12 of the stage STk may be P-type transistors, and a tenth transistor T10 may be an N-type transistor.

A previous carry signal CR[k−1] may be applied to the input terminal IN as a start signal, the first clock signal CLK1 may be applied to the first clock terminal CK1, and the second clock signal CLK2 may be applied to the second clock terminal CK2. The first voltage VGH may be applied to the first voltage input terminal V1, the second voltage VGL may be applied to the second voltage input terminal V2, and the third voltage VGLt may be applied to the third voltage input terminal V3. When k is 1, the external signal STV may be applied to the input terminal IN of the first stage ST1 as a start signal.

The first node controller 231 may be connected between the input terminal IN and the first control node Q. The first node controller 231 may control a voltage of the first control node Q based on the start signal (e.g., the external signal STV or previous carry signal) applied to the input terminal IN or the first clock signal CLK1 applied to the first clock terminal CK1. The first node controller 231 may include the first transistor T1 and the sixth transistor T6.

The first transistor T1 may include a pair of sub-transistors connected in series to each other between the input terminal IN and a first node Na. For example, the first transistor T1 may include a first sub-transistor T1-1 and a second sub-transistor T1-2. Gates of the first sub-transistor T1-1 and the second sub-transistor T1-2 may be connected to the first clock terminal CK1.

The sixth transistor T6 may be connected between the first node Na and the first control node Q. A gate of the sixth transistor T6 may be connected to the second voltage input terminal V2. The sixth transistor T6 may electrically connect the first node Na and the first control node Q so as to control a voltage level of the first control node Q to correspond to a voltage level of the first node Na.

The second node controller 232 may be connected between the second clock terminal CK2 and the second control node QB. The second node controller 232 may control a voltage of the second control node QB, based on the first clock signal CLK1 applied to the first clock terminal CK1 and the second clock signal CLK2 applied to the second clock terminal CK2. The second node controller 232 may include the second to fifth transistors T2 to T5 and a first capacitor C1.

The second transistor T2 may be connected to the first voltage input terminal V1 and a second node Nb. A gate of the second transistor T2 may be connected to the second control node QB.

The third transistor T3 may be connected between the first node Na and the second node Nb. A gate of the third transistor T3 may be connected to the second clock terminal CK2.

The fourth transistor T4 may be connected between the second control node QB and the first clock terminal CK1. A gate of the fourth transistor T4 may be connected to the first node Na.

The fifth transistor T5 may be connected between the second control node QB and the second voltage input terminal V2. A gate of the fifth transistor T5 may be connected to the first clock terminal CK1.

The first capacitor C1 may be connected between the first voltage input terminal V1 and the second control node QB.

The third node controller 233 may be connected between the first voltage input terminal V1 and the second clock terminal CK2. The third node controller 233 may control a voltage of the third control node QB_F according to the voltage levels of the first control node Q and the second control node QB. The carry output terminal COUT may be connected to the third control node QB_F, and the third node controller 233 may also function as an output controller configured to output a carry signal. The third node controller 233 may output an output signal having a voltage level of the third control node QB_F to the carry output terminal COUT as a carry signal CR[k]. The third node controller 233 may include a seventh transistor T7, an eighth transistor T8, and a second capacitor C2.

The seventh transistor T7 may be connected between the first voltage input terminal V1 and the third control node QB_F. A gate of the seventh transistor T7 may be connected to the second control node QB. The seventh transistor T7 may be named as a "first control transistor".

The eighth transistor T8 may be connected between the second clock terminal CK2 and the third control node QB_F. A gate of the eighth transistor T8 may be connected to the first control node Q. The eighth transistor T8 may be named as a "second control transistor".

The second capacitor C2 may be connected between the first control node Q and the third control node QB_F.

The first output controller 235 may be connected between the first voltage input terminal V1 and the second clock terminal CK2. The first output controller 235 may output the first output signal Out1 [k] of a high voltage or low voltage according to the voltage levels of the first control node Q and the second control node QB. The first output controller 235 may transfer the first voltage VGH or the second clock signal CLK2 to the first output terminal OUT1 connected to a first output node No1, according to the voltage levels of the first control node Q and the second control node QB. A high voltage of the first voltage VGH and a low voltage of the second clock signal CLK2 may be output as the first output signal Out1 [k] from the first output terminal OUT1. The first output controller 235 may include the eleventh transistor T11 and the twelfth transistor T12.

The eleventh transistor T11 may be connected between the first voltage input terminal V1 and the first output terminal OUT1 (the first output node No1). A gate of the eleventh transistor T11 may be connected to the second control node QB.

The twelfth transistor T12 may be connected between the second clock terminal CK2 and the first output terminal OUT1 (the first output node No1). A gate of the twelfth transistor T12 may be connected to the first control node Q.

The second output controller 236 may be connected between the first voltage input terminal V1 and the second voltage input terminal V2. The second output controller 236 may output the second output signal Out2[k] of a high voltage or low voltage according to the voltage level of the third control node QB_F. The second output controller 236 may transfer the first voltage VGH or the second voltage VGL to the second output terminal OUT2 connected to a second output node No2, according to the voltage level of the third control node QB_F. The high voltage of the first voltage VGH or the low voltage of the second voltage VGL may be output as the second output signal Out2[k] from the second output terminal OUT2. A second output controller 236 may include the ninth transistor T9 and the tenth transistor T10.

The ninth transistor T9 may be connected between the first voltage input terminal V1 and the second output terminal OUT2 (the second output node No2). A gate of the ninth transistor T9 may be connected to the third control node QB_F.

The tenth transistor T10 may be connected between the second voltage input terminal V2 and the second output terminal OUT2 (the second output node No2). The tenth transistor T10 may include a first gate and a second gate. The first gate of the tenth transistor T10 may be connected to the third control node QB_F, and the second gate of the tenth transistor T10 may be connected to the third voltage input terminal V3.

As shown in FIGS. 5A and 5B, the first clock signal CLK1 and the second clock signal CLK2 may include a square wave signal in which the first voltage VGH that is a high voltage and the second voltage VGL that is a low voltage are repeated. A period of each of the first clock signal CLK1 and the second clock signal CLK2 may be 2H including one high voltage and one low voltage. The first clock signal CLK1 and the second clock signal CLK2 may include signals having the same waveform as each other and being provided by shifting a phase. For example, the second clock signal CLK2 may have the same waveform as the first clock signal CLK1 and be applied by shifting a phase (phase shift) at certain intervals. An on-voltage period of the first clock signal CLK1 supplied via a first clock signal line and an on-voltage period of the second clock signal CLK2 supplied via a second clock signal line may not overlap each other. A length of each of the on-voltage period of the first clock signal CLK1 and the second clock signal CLK2 may be approximately 1H or a certain length less than 1H.

In FIG. 5B, the previous carry signal CR[k-1], the first clock signal CLK1, the second clock signal CLK2, node voltages of the first control node Q and the second control node QB, the carry signal CR[k], the first output signal Out1[k], and the second output signal Out2[k] are shown. Hereinafter, for convenience of explanation, it is expressed that the voltage level of the first voltage VGH is a high level and the voltage level of the second voltage VGL is a low level.

When a start signal of a low voltage is applied to the input terminal IN, the first clock signal CLK1 of a low voltage is applied to the first clock terminal CK1, and the second clock signal CLK2 of a high voltage may be applied to the second clock terminal CK2. The first transistor T1 and the fifth transistor T5 may be turned on according to the first clock signal CLK1. According to the turned-on first transistor T1, the first node Na may become a low level so that the fourth transistor T4 is turned on, and according to the turned-on fourth transistor T4 and the turned-on fifth transistor T5, the second control node QB may become a low level. In addition, because the sixth transistor T6 is turned on according to the second voltage VGL, the first control node Q and the first node Na may be electrically connected to each other so that the first control node Q may become a low level.

The twelfth transistor T12 of which a gate is connected to the first control node Q of a low level and the eleventh transistor T11 of which a gate is connected to the second control node QB of a low level may be turned on, so that the first voltage VGH may be output as the first output signal Out1 [k] from the first output terminal OUT1. The second transistor T2 and the seventh transistor T7 of which gates are connected to the second control node QB of a low level and the eighth transistor T8 of which a gate is connected to the first control node Q of a low level may be turned on, so that the second node Nb and the third control node QB_F may be in a high-level state of the first voltage VGH. The tenth transistor T10 of which a gate is connected to the third control node QB_F of a high level may be turned on, so that the second voltage VGL may be output as the second output signal Out2[k] from the second output terminal OUT2. In addition, a carry signal CR[k] of a high level, which is a voltage level of the third control node QB_F, may be output from the carry output terminal COUT connected to the third control node QB_F.

The start signal may transition from a low voltage to a high voltage, the first clock signal CLK1 of a high voltage may be applied to the first clock terminal CK1, and the second clock signal CLK2 of a high voltage may be applied to the second clock terminal CK2. Because the first transistor T1 and the third transistor T3 are turned off according to the first clock signal CLK1 and the second clock signal CLK2 and the sixth transistor T6 is continuously turned on according to the second voltage VGL of a low voltage, the first node Na and the first control node Q may maintain a low-level state. Because the fifth transistor T5 is turned off according to the first clock signal CLK1 of a high voltage and the first node Na is a low level, the fourth transistor T4 may be continuously turned on so that the first clock signal CLK1 of a high voltage is transferred to the second control node QB and the second control node QB is set to a high level. Accordingly, the second transistor T2, the seventh transistor T7, and the eleventh transistor T11, of which gates are connected to the second control node QB of a high level, may be turned off.

Thereafter, when the second clock signal CLK2 transitions from a high voltage to a low voltage while the first clock signal CLK1 is a high voltage, the third transistor T3 may be turned on. According to the third transistor T3, the sixth transistor T6, the eighth transistor T8, and the second capacitor C2, which are in a turn-on state, the second clock signal CLK2 of a low voltage may be transferred to the third control node QB_F so that the third control node QB_F is in a low-level state, and the first control node Q in a low-level state may be in a lower low-level state by capacitor coupling (cap coupling).

A carry signal CR[k] of a low level, which is a voltage level of the third control node QB_F, may be output from the carry output terminal COUT connected to the third control node QB_F of a low level. The twelfth transistor T12 of which a gate is connected to the first control node Q of a low level may be turned on, so that the second clock signal CLK2 of a low voltage may be output as the first output signal Out1 [k] from the first output terminal OUT1. The ninth transistor T9 of which a gate is connected to the third control node QB_F of a low level may be turned on, so that the first voltage VGH of a high level applied to the first voltage input terminal V1 may be output as the second output signal Out2[k] from the second output terminal OUT2. In other words, the carry signal CR[k] of a low level, the first output signal Out1[k] of a low level, and the second output signal Out2[k] of a high level may be output in synchronization with a timing of the second clock signal CLK2 of a low level. Subsequently, when the second clock signal CLK2 transitions from a low voltage to a high voltage while the first clock signal CLK1 is a high voltage, the third transistor T3 may be turned off, the first control node Q may maintain a low-level state, and the second control node QB may maintain a high-level state. Because the eighth transistor T8 of which a gate is connected to the first control node Q is turned on, the third control node QB_F may be set to a high level according to the second clock signal CLK2 of a high voltage. The carry signal CR[k] of a high level, which is a voltage level of the third control node QB_F, may be output from the carry output terminal COUT connected to the third control node QB_F. The twelfth transistor T12 of which a gate is connected to the first control node Q of a low level may be turned on, so that a high voltage of the second clock signal CLK2 may be output as the first output signal Out1 [k] from the first output terminal OUT1. The tenth transistor T10 of which a gate is connected to the third control node QB_F of a high level may be turned on, so that the second voltage VGL of a low level applied to the second voltage input terminal V2 may be output as the second output signal Out2[k] from the second output terminal OUT2. In other words, the carry signal CR[k] of a high level, the first output signal Out1[k] of a high level, and the second output signal Out2[k] of a low level may be output in synchronization with a timing at which the second clock signal CLK2 transitions to a high voltage. Thereafter, when the first clock signal CLK1 transitions from a high voltage to a low voltage while the second clock signal CLK2 is a high voltage, the first transistor T1 and the fifth transistor T5 may be turned on. According to the turned-on first transistor T1 and the sixth transistor T6 turned on according to the second voltage VGL, the first control node Q may be set to a high level by a high voltage of the start signal. According to the second control node QB according to the turned-on fifth transistor T5, the second control node QB may be set to a low level state according to the second voltage VGL. Accordingly, the eighth transistor T8 may be turned off, and the seventh transistor T7 may be turned on, so that the third control node QB_F may be set to a high level state according to the first voltage VGH. The carry signal CR[k] of a high level, which is a voltage level of the third control node QB_F, may be output from the carry output terminal COUT connected to the third control node QB_F. The first voltage VGH may be output as the first output signal Out1 [k] from the first output terminal OUT1 via the eleventh transistor T11, which is turned on since a gate thereof is connected to the second control node QB of a low level. The second voltage VGL applied to the second voltage input terminal V2 may be output as the second output signal Out2[k] from the second output terminal OUT2 via the tenth transistor T10, which is turned on since a gate thereof is connected to the third control node QB_F of a high level. In other words, the carry signal CR[k] of a high level, the first output signal Out1[k] of a high level, and the second output signal Out2[k] of a low level may be maintained.

As shown in FIGS. 5A and 5B, an output timing at which the carry signal CR of a low voltage starts, an output timing at which the first output signal Out1 of a low voltage starts, and an output timing at which the second output signal Out2 of a high voltage starts may be the same as each other.

Until a first output signal Out1[k−1] of a low voltage, which is an output of a previous stage, is applied to the input terminal IN as a start signal, the first control node Q may maintain a high-level state, the second control node QB may maintain a low-level state, and the third control node QB_F may maintain a high-level state. Subsequent operations overlap those described above, and redundant descriptions thereof are omitted.

An odd-numbered stage of the scan driver 130 shown in FIG. 3 may output the first output signal Out1 of a low voltage and the second output signal Out2 of a high voltage, in synchronization with a low voltage timing of the second clock signal CLK2. An even-numbered stage may output the first output signal Out1 of a low voltage and the second output signal Out2 of a high voltage, in synchronization with a low voltage timing of the first clock signal CLK1.

A threshold voltage of an N-type transistor may be phase-shifted by repeatedly receiving on-bias over time. Accordingly, the threshold voltage shift of the N-type transistor may be compensated for by applying a low voltage having a different polarity from a high voltage to a second gate of the N-type transistor of which the first gate repeatedly receives a high voltage. For example, the second gate of the tenth transistor T10 of which the first gate repeatedly receives a high voltage may be connected to a voltage source (a third voltage input terminal) providing a low voltage.

In an embodiment, a low-voltage period in which the second output signal Out2[k] is a low-voltage level may be greater in length than a high-voltage period in which the second output signal Out2[k] is a high-voltage level. The low-voltage period of the second output signal Out2[k] may include a period in which the third control node QB_F is in a high-level state. Accordingly, the tenth transistor T10 of which the first gate is connected to the third control node QB_F may receive a high voltage for a long period of time.

In an embodiment, a low voltage may be applied to the second gate of the tenth transistor T10. In addition, a voltage value of the low voltage applied to the second gate of the tenth transistor T10 may be changed in stages according to use time. For example, the third voltage VGLt of a low voltage may be applied to the second gate of the tenth transistor T10, and a voltage value of the third voltage VGLt may be increased by stages according to use time. While the first gate of the tenth transistor T10 receives a high voltage, a low voltage having a different polarity from the high voltage may be applied to the second gate of the tenth transistor T10, and when the voltage applied to the second gate is changed according to time, a threshold voltage shift of the tenth transistor T10 may be minimized so that a scan driver may be stably driven, and thus, the reliability of the display apparatus may be ensured even when the display apparatus is used for a long period of time.

In an embodiment, as shown in FIG. 6, the third voltage VGLt may include a voltage that varies in units of certain time. In the third voltage VGLt, a specific voltage VGLt0 may be initially applied and may be changed to increase according to use time. The initial specific voltage VGLt0 may include a voltage different from the second voltage VGL. For example, the initial specific voltage VGLt0 may include a voltage less than the second voltage VGL. Voltage variable times t1, t2, t3, . . . , and tm of the third voltage VGLt may be differently set from each other.

In another embodiment, the third voltage VGLt may be set as a constant voltage that is not variable. For example, a third voltage at which the threshold voltage shift of the tenth transistor T10 is the smallest may be determined within a reliability guarantee time predicted through calculation and/or experiment on stress applied to the tenth transistor T10 according to a certain voltage. The constant voltage may include a voltage different from the second voltage VGL. For example, the constant voltage may include a voltage less than the second voltage VGL. As described above, while the stages ST1, ST2, ST3, ST4, etc. operate, first output signals Out1[1], Out1[2], Out1[3], Out1[4], etc. of a low voltage may be sequentially output, second output signals Out2[1], Out2[2], Out2[3], Out2[4], etc. of a high voltage may be sequentially output, and carry signals CR[1], CR[2], CR[3], CR[4], etc. of a low voltage may be sequentially output.

Figure 7:
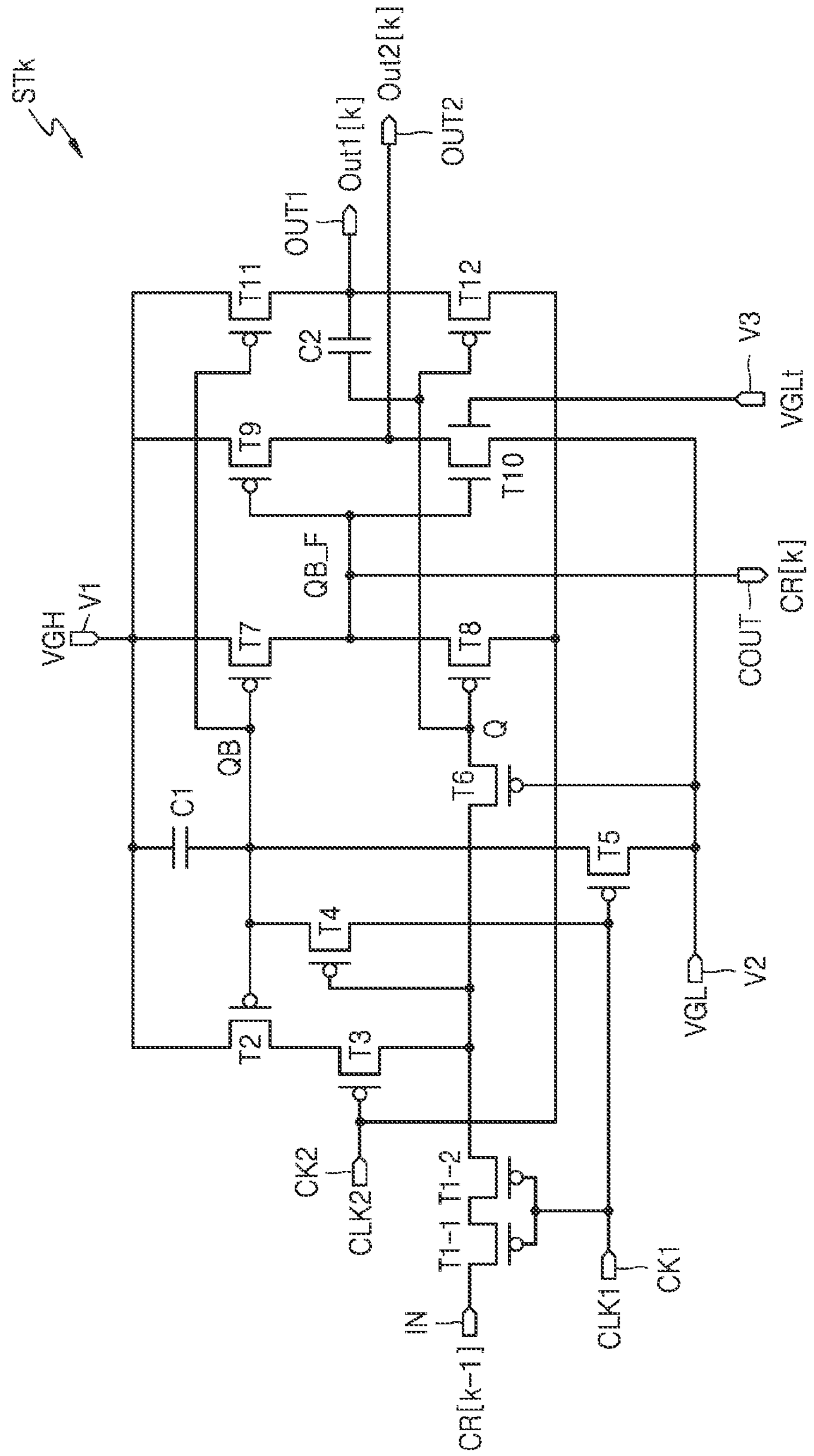
FIGS. 7 and 8 are diagrams illustrating various modifications of a circuit of a stage of a scan driver, according to an embodiment.
Figure 8:
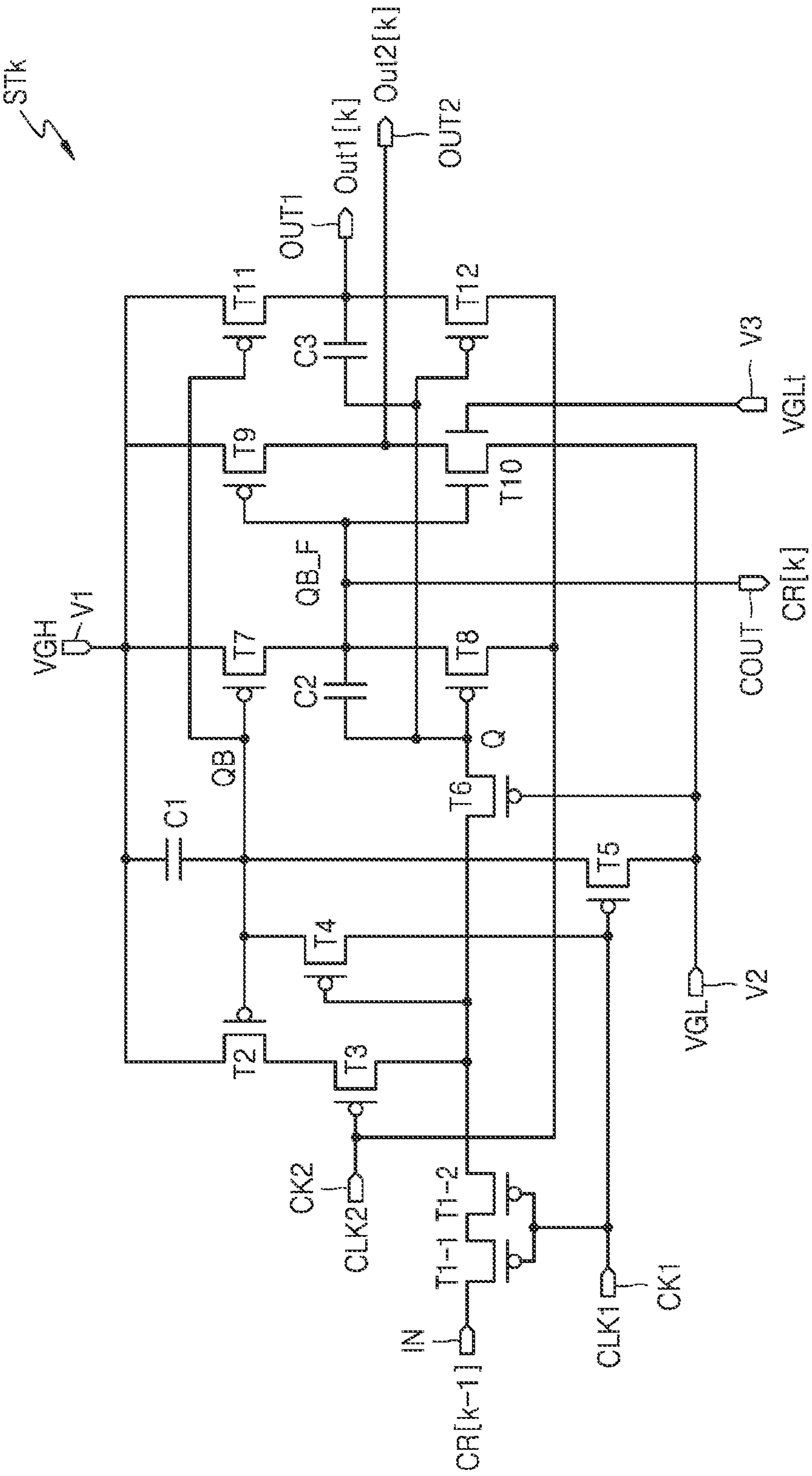

FIGS. 7 and 8 are diagrams illustrating various modifications of a circuit of a stage STK of a scan driver according to an embodiment.

The stage STk shown in FIG. 7 differs from the stage shown in FIG. 4 in that the second capacitor C2 is connected between the first control node Q and the first output terminal OUT1, and other configurations and operations are the same as those of the stage shown in FIG. 4.

The stage STK shown in FIG. 8 differs from the stage shown in FIG. 4 in that a third capacitor C3 is added between the first control node Q and the first output terminal OUT1, and other configurations and operations are the same as those of the stage shown in FIG. 4.

Figure 9:
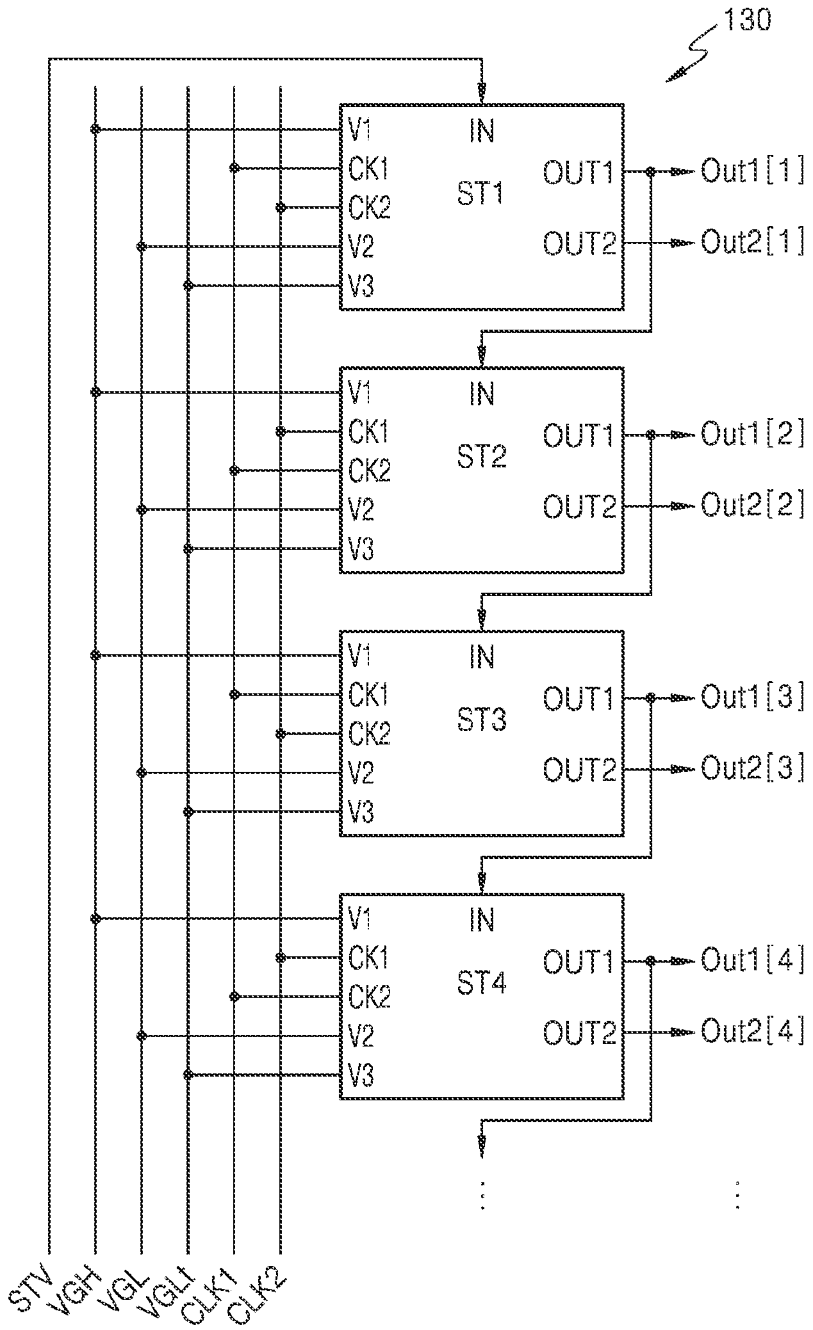
FIG. 9 is a diagram schematically illustrating a scan driver according to an embodiment.

FIG. 9 is a diagram schematically illustrating a scan driver 130 according to an embodiment. FIGS. 10 to 13 are circuit diagrams illustrating various examples of a stage included in the scan driver 130 in FIG. 9.

The scan driver 130 shown in FIG. 9 differs from the scan driver shown in FIG. 3 in that the carry output terminal COUT is omitted in each of the stages, and each of the stages outputs the first output signal Out1 to the input terminal IN of a next stage as a carry signal.

Figure 10:
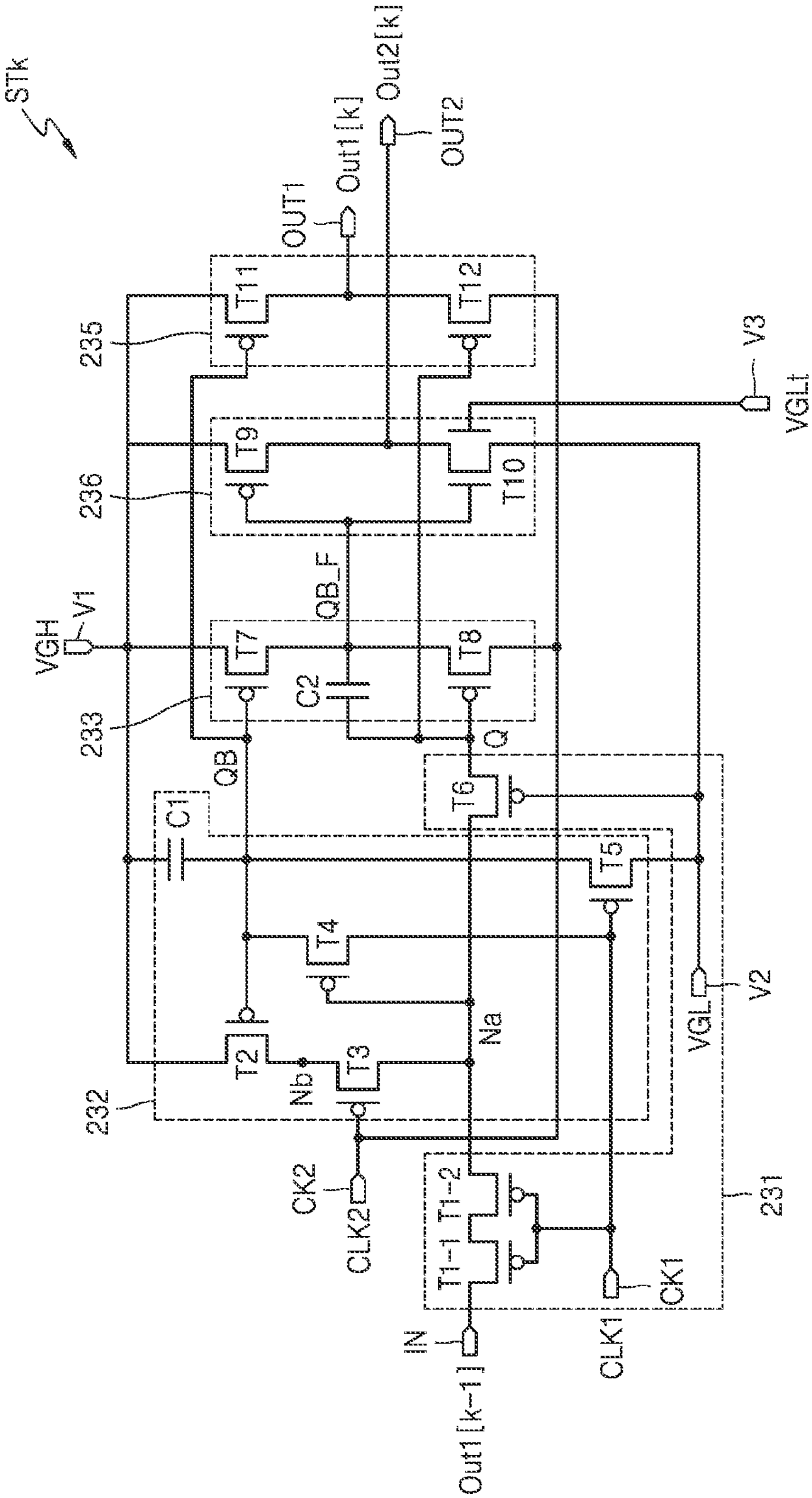
FIGS. 10 to 13 are circuit diagrams illustrating various examples of a stage included in the scan driver in FIG. 9.

The stage STK shown in FIG. 10 differs from the stage shown in FIG. 4 in that an additional carry output terminal COUT is not connected to the third control node QB_F, and other configurations and operations are the same as those of the stage shown in FIG. 4. The first output signal Out1 [k] may be input to the input terminal IN of a next stage as a carry signal.

Figure 11:
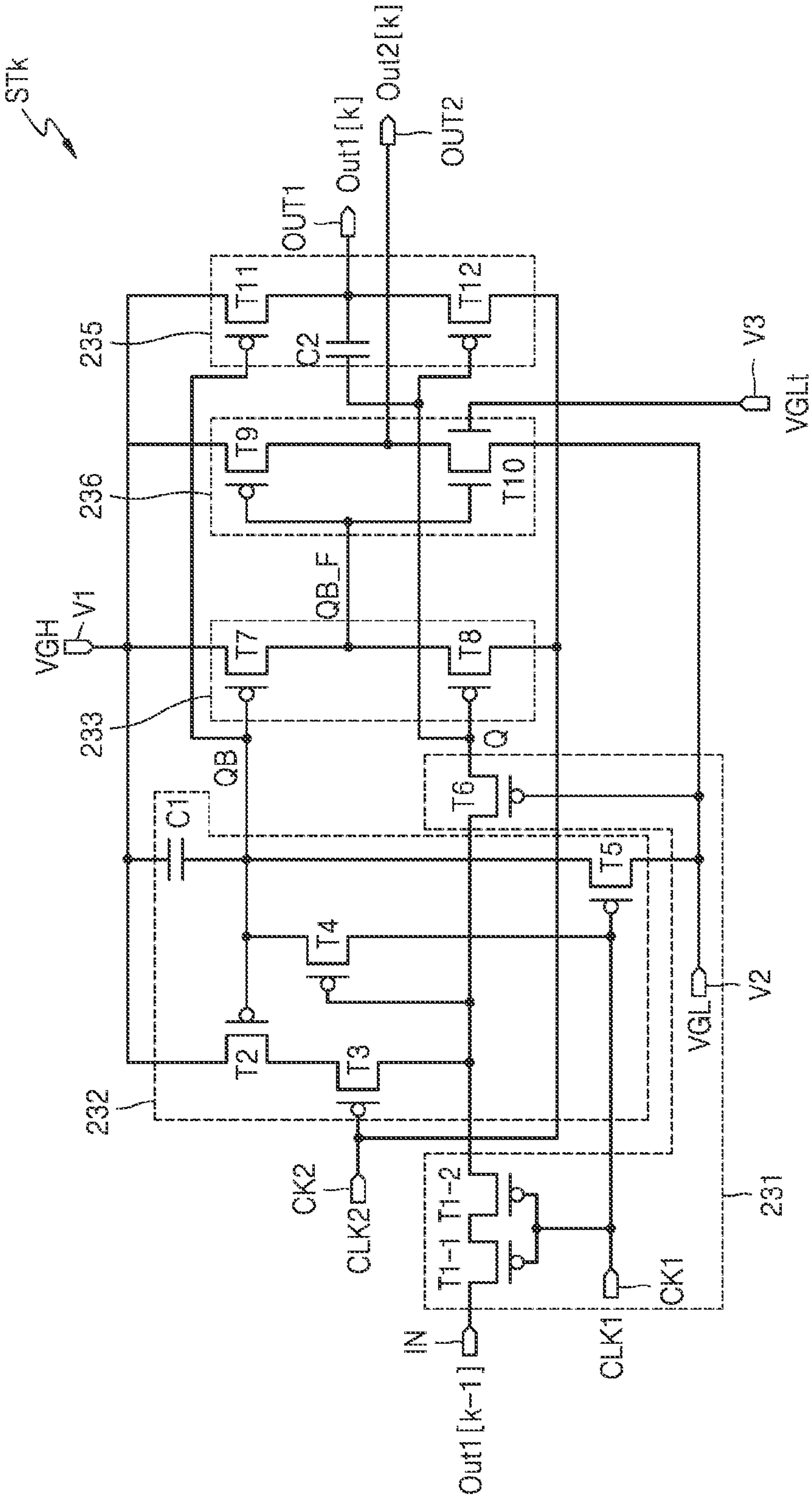

The stage STK shown in FIG. 11 differs from the stage shown in FIG. 10 in that the second capacitor C2 is connected between the first control node Q and the first output terminal OUT1, and other configurations and operations are the same as those of the stage shown in FIG. 10.

Figure 12:
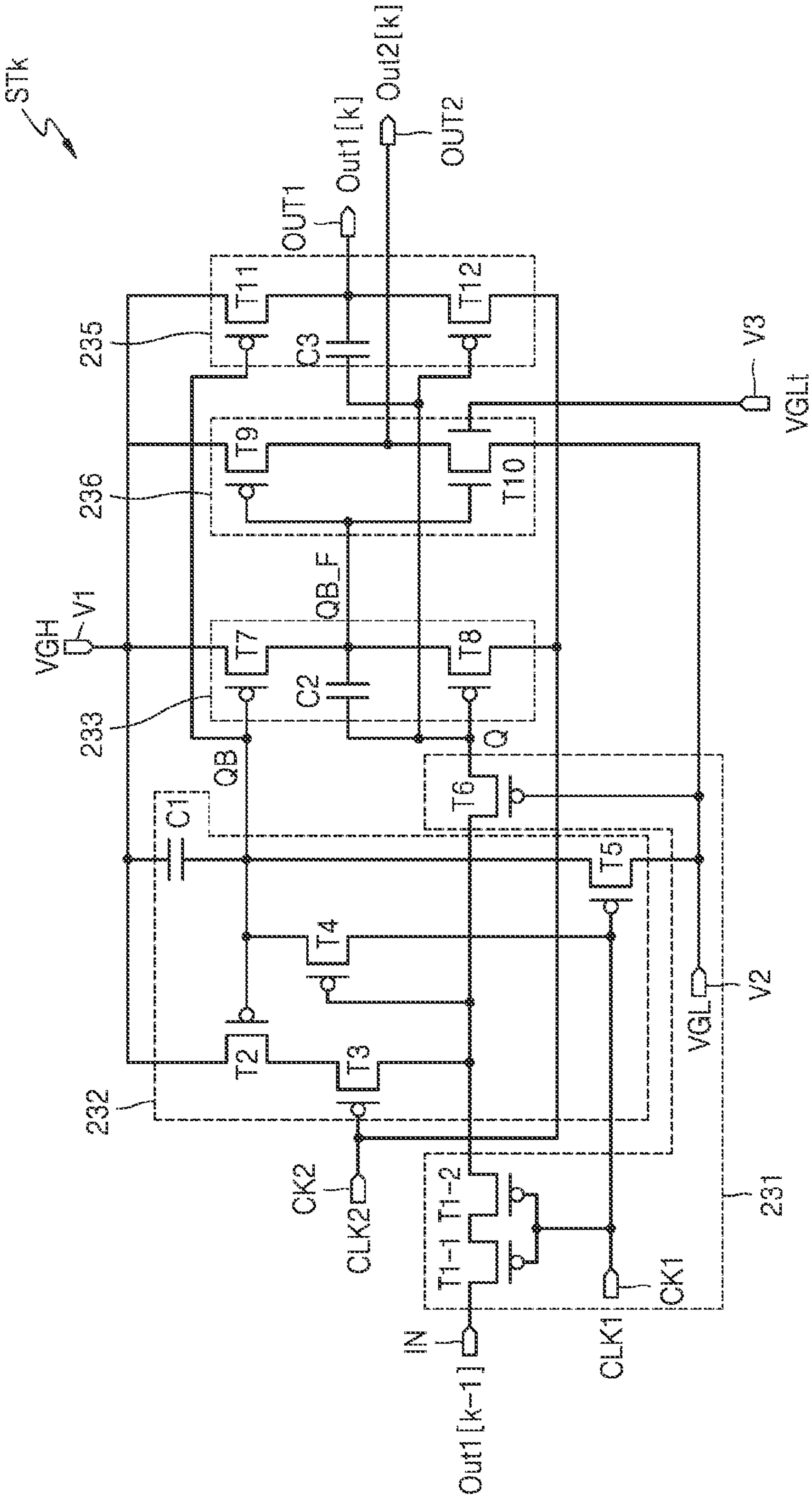

The stage STK shown in FIG. 12 differs from the stage shown in FIG. 10 in that the third capacitor C3 is added between the first control node Q and the first output terminal OUT1, and other configurations and operations are the same as those of the stage shown in FIG. 10.

Figure 13:
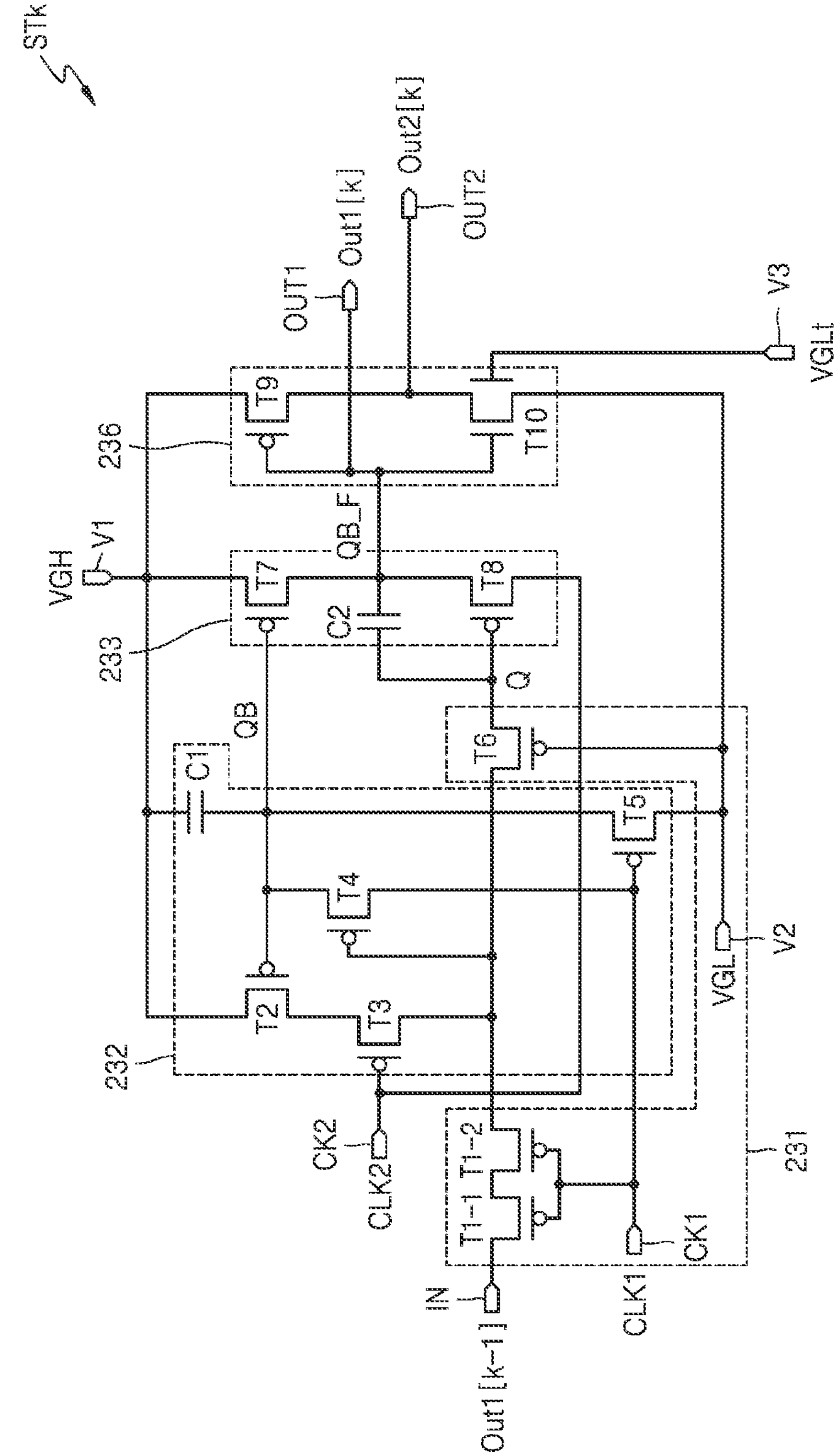

The stage STK shown in FIG. 13 differs from the stage shown in FIG. 10 in that the first output controller 235 including the eleventh transistor T11 and the twelfth transistor T12 is omitted, and the first output terminal OUT1 is connected to the third control node QB_F. When the third control node QB_F is in a low-level state, the first output signal Out1 [k] of a low voltage may be output from the first output terminal OUT1. When the third control node QB_F is in a high-level state, the first output signal Out1 [k] of a high voltage may be output from the first output terminal OUT1. In addition, the first output signal Out1 [k] may be input to the input terminal IN of a next stage as a carry signal. Other configurations and operations of the stage STK shown in FIG. 13 are the same as those of the stage shown in FIG. 10.

Figure 14:
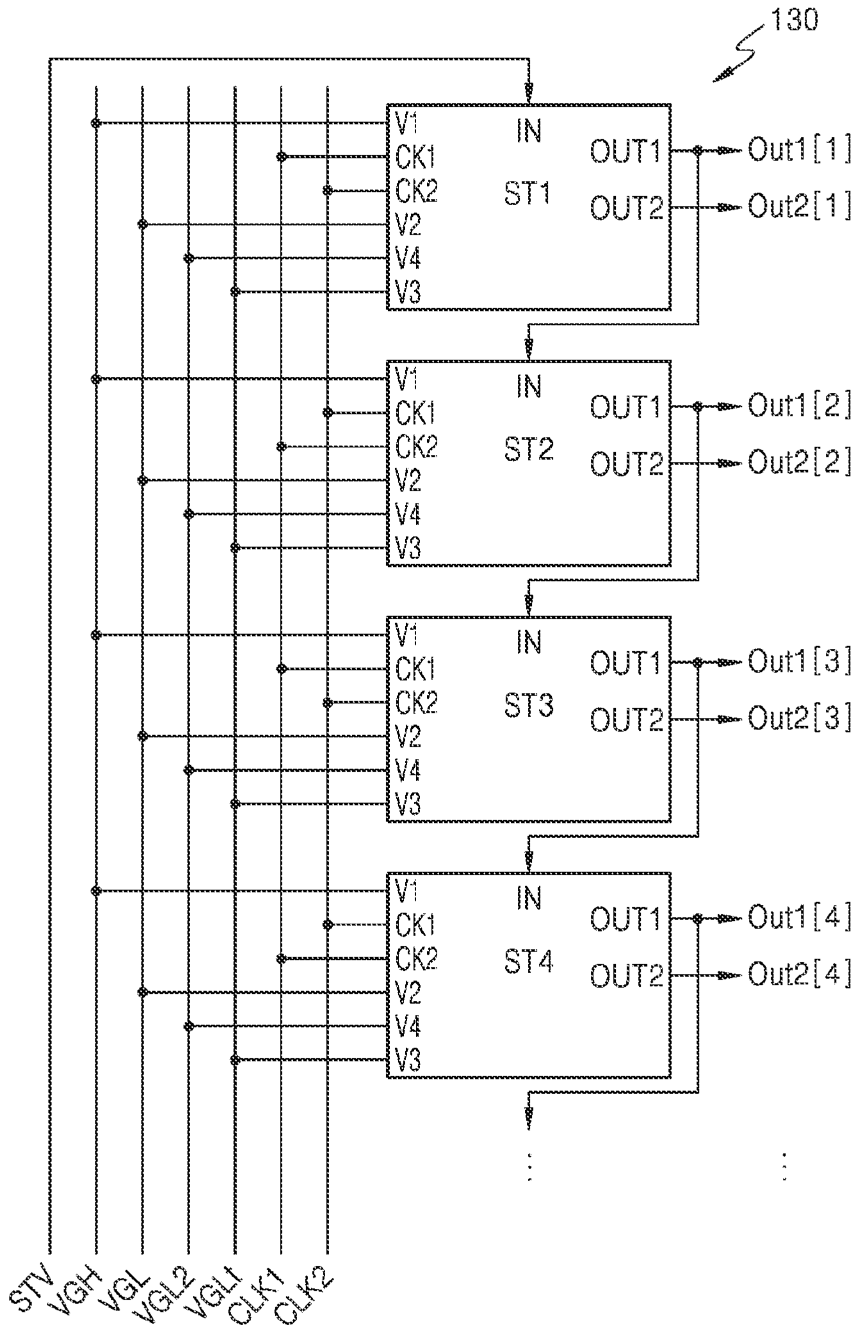
FIG. 14 is a diagram schematically illustrating a scan driver according to an embodiment.
Figure 15:
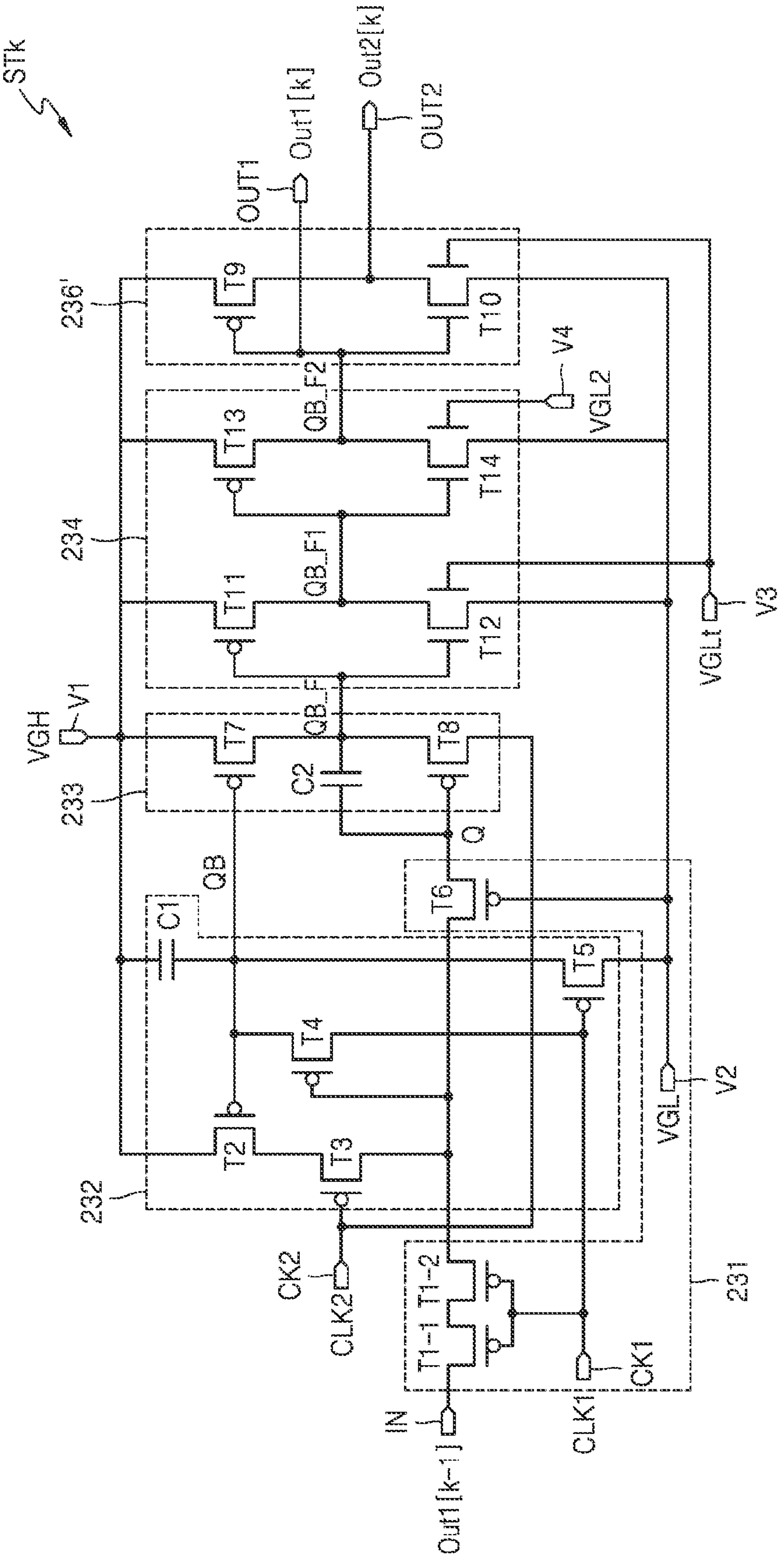
FIGS. 15 and 16 are circuit diagrams illustrating an example of a stage included in the scan driver in FIG. 14.
Figure 16:
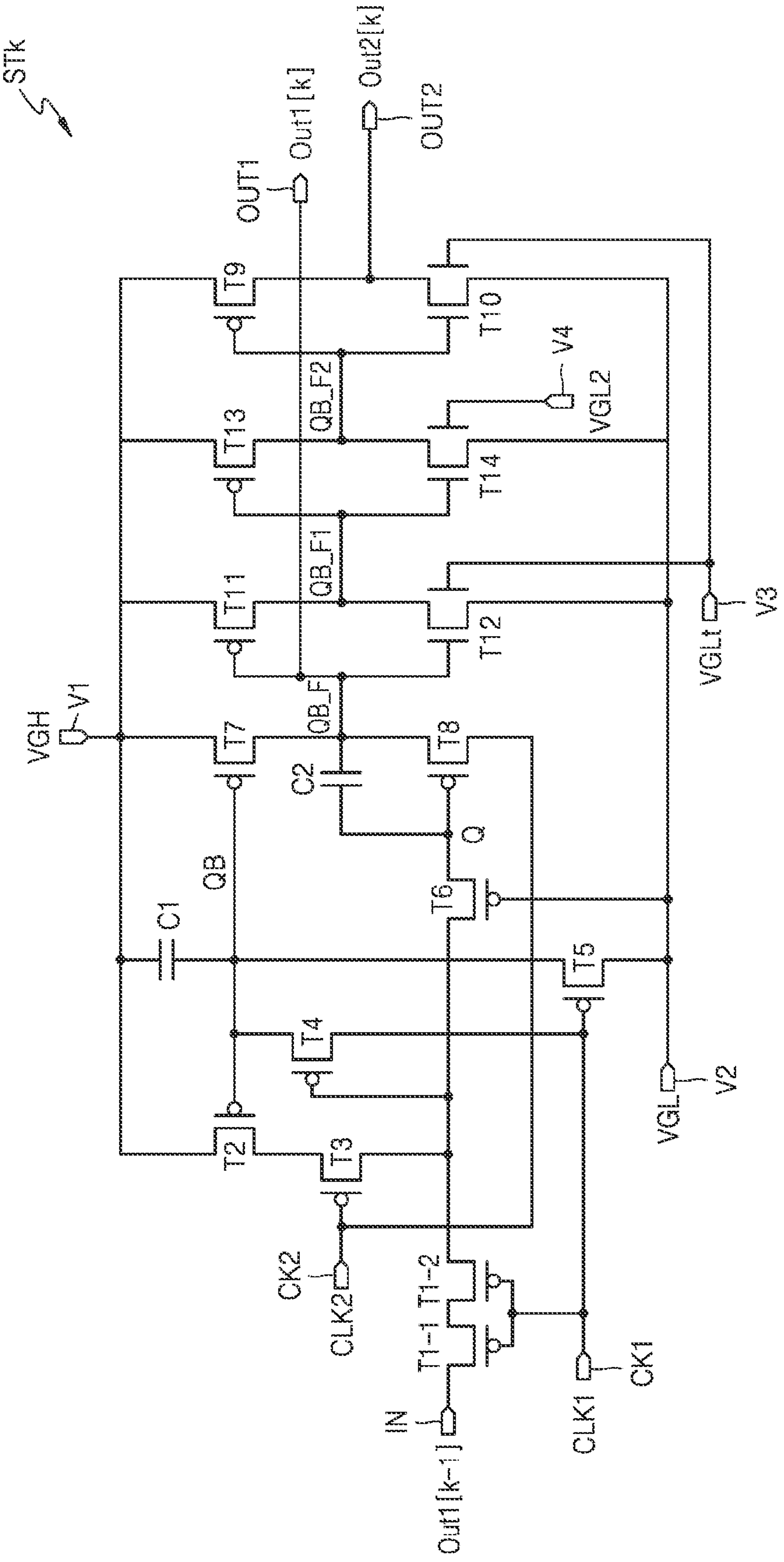

FIG. 14 is a diagram schematically illustrating a scan driver 130 according to an embodiment. FIGS. 15 and 16 are circuit diagrams illustrating an example of a stage included in the scan driver 130 in FIG. 14.

The scan driver 130 shown in FIG. 14 differs from the scan driver shown in FIG. 9 in that a fourth voltage input terminal V4, to which a fourth voltage VGL2 is applied, is added to each of the stages. The fourth voltage VGL2 may include a low voltage that is less than the second voltage VGL. The fourth voltage VGL2 may be supplied as a global signal from the controller 190 shown in FIG. 1 and/or a power supply unit (not shown).

The stage STK shown in FIG. 15 may include the first node controller 231, the second node controller 232, the third node controller 233, a fourth node controller 234, and a second output controller 236'. Hereinafter, differences from the stage STK shown in FIG. 13 are mainly described.

The stage STK may include the first control node Q, the second control node QB, the third control node QB_F, a fourth control node QB_F1, and a fifth control node QB_F2. Each of the first node controller 231, the second node controller 232, and the third node controller 233 are the same as a corresponding element of the stage STK shown in FIG. 13, and redundant descriptions thereof are omitted.

The fourth node controller 234 may be connected between the first voltage input terminal V1 and the second voltage input terminal V2. The fourth node controller 234 may set the fourth control node QB_F1 and the fifth control node QB_F2 to a voltage level of the first voltage VGH or second voltage VGL according to a voltage level of the third control node QB_F. The fourth node controller 234 may include the eleventh transistor T11, the twelfth transistor T12, a thirteenth transistor T13, and a fourteenth transistor T14. The eleventh transistor T11 and the thirteenth transistor T13 may include P-type transistors, and the twelfth transistor T12 and the fourteenth transistor T14 may include N-type transistors.

The eleventh transistor T11 may be connected between the first voltage input terminal V1 and the fourth control node QB_F1, and a gate of the eleventh transistor T11 may be connected to the third control node QB_F.

The twelfth transistor T12 may be connected between the second voltage input terminal V2 and the fourth control node QB_F1. The first gate of the twelfth transistor T12 may be connected to the third control node QB_F, and the second gate of the twelfth transistor T12 may be connected to the third voltage input terminal V3. The thirteenth transistor T13 may be connected between the first voltage input terminal V1 and the fifth control node QB_F2, and a gate of the thirteenth transistor T13 may be connected to the fourth control node QB_F1.

The fourteenth transistor T14 may be connected between the second voltage input terminal V2 and the fifth control node QB_F2, and a first gate of the fourteenth transistor T14 may be connected to the fourth control node QB_F1 and a second gate of the fourteenth transistor T14 may be connected to the fourth voltage input terminal V4.

The first output terminal OUT1 may be connected to the fifth control node QB_F2, the first voltage VGH of a high level or the second voltage VGL of a low level may be output as the first output signal Out1 [k] from the first output terminal OUT1, according to the voltage level of the fifth control node QB_F2. For example, the first output signal Out1 [k] may be applied to the first scan control line SCL1 of the $k^{th}$ pixel row shown in FIG. 2, and may be applied to the input terminal IN of a next stage as a carry signal.

The second output controller 236' may be connected between the first voltage input terminal V1 and the second voltage input terminal V2. The second output controller 236' may output the first voltage VGH of a high level or the second voltage VGL of a low level as the second output signal Out2[k], according to a voltage level of the fifth control node QB_F2. For example, the second output signal Out2[k] may be applied to the second scan control line SCL2 or third scan control line SCL3 of the $k^{th}$ pixel row shown in FIG. 2. The second output controller 236' may include the ninth transistor T9 and the tenth transistor T10. The ninth transistor T9 may include a P-type transistor, and the tenth transistor T10 may include an N-type transistor. The ninth transistor T9 may be connected to the first voltage input terminal V1 and the second output terminal OUT2, and a gate of the ninth transistor T9 may be connected to the fifth control node QB_F2.

The tenth transistor T10 may be connected between the second voltage input terminal V2 and the second output terminal OUT2. The first gate of the tenth transistor T10 may be connected to the fifth control node QB_F2, and the second gate of the tenth transistor T10 may be connected to the third voltage input terminal V3.

When the third control node QB_F is in a high-level state, the twelfth transistor T12 may be turned on so that the fourth control node QB_F1 may be set to a low level of the second voltage VGL. Because the fourth control node QB_F1 is in a low-level state, the thirteenth transistor T13 may be turned on so that the fifth control node QB_F2 may be set to a high level of the first voltage VGH. Accordingly, the first voltage VGH of a high level may be output as the first output signal Out1 [k] from the first output terminal OUT1. Because the fifth control node QB_F2 is in a high-level state, the tenth transistor T10 may be turned on so that the second voltage VGL of a low level may be output as the second output signal Out2[k] from the second output terminal OUT2.

When the third control node QB_F is in a low-level state, the eleventh transistor T11 may be turned on so that the fourth control node QB_F1 may be set to a high level of the first voltage VGH. Because the fourth control node QB_F1 is in a high-level state, the fourteenth transistor T14 may be turned on so that the fifth control node QB_F2 may be set to a low level of the second voltage VGL. Accordingly, the second voltage VGL of a low level may be output as the first output signal Out1 [k] from the first output terminal OUT1. Because the fifth control node QB_F2 is in a low-level state, the ninth transistor T9 may be turned on so that the first voltage VGH of a high level may be output as the second output signal Out2[k] from the second output terminal OUT2. For example, the second output signal Out2[k] may be applied to the second scan control line SCL2 or third scan control line SCL3 of the $k^{th}$ pixel row shown in FIG. 2.

In the embodiment of FIG. 15, a threshold voltage shift of an N-type transistor may be compensated for by applying a low voltage to second gates of the tenth transistor T10, the twelfth transistor T12, and the fourteenth transistor T14, which are N-type transistors, and of which first gates repeatedly receive a high voltage. In addition, a voltage value of the third voltage VGLt of a low level applied to second gates of the tenth transistor T10 and the twelfth transistor T12, which are turned on during a low-voltage period of the second output signal Out2[k], may be increased by steps according to use time, as shown in FIG. 6.

Other configurations and operations of the stage STK shown in FIG. 15 are the same as those of the stage shown in FIG. 13.

The stage STK shown in FIG. 16 differs from the stage shown in FIG. 15 in that the first output terminal OUT1 is connected to the third control node QB_F, and other configurations and operations are the same as those of the stage shown in FIG. 15.

Figure 17:
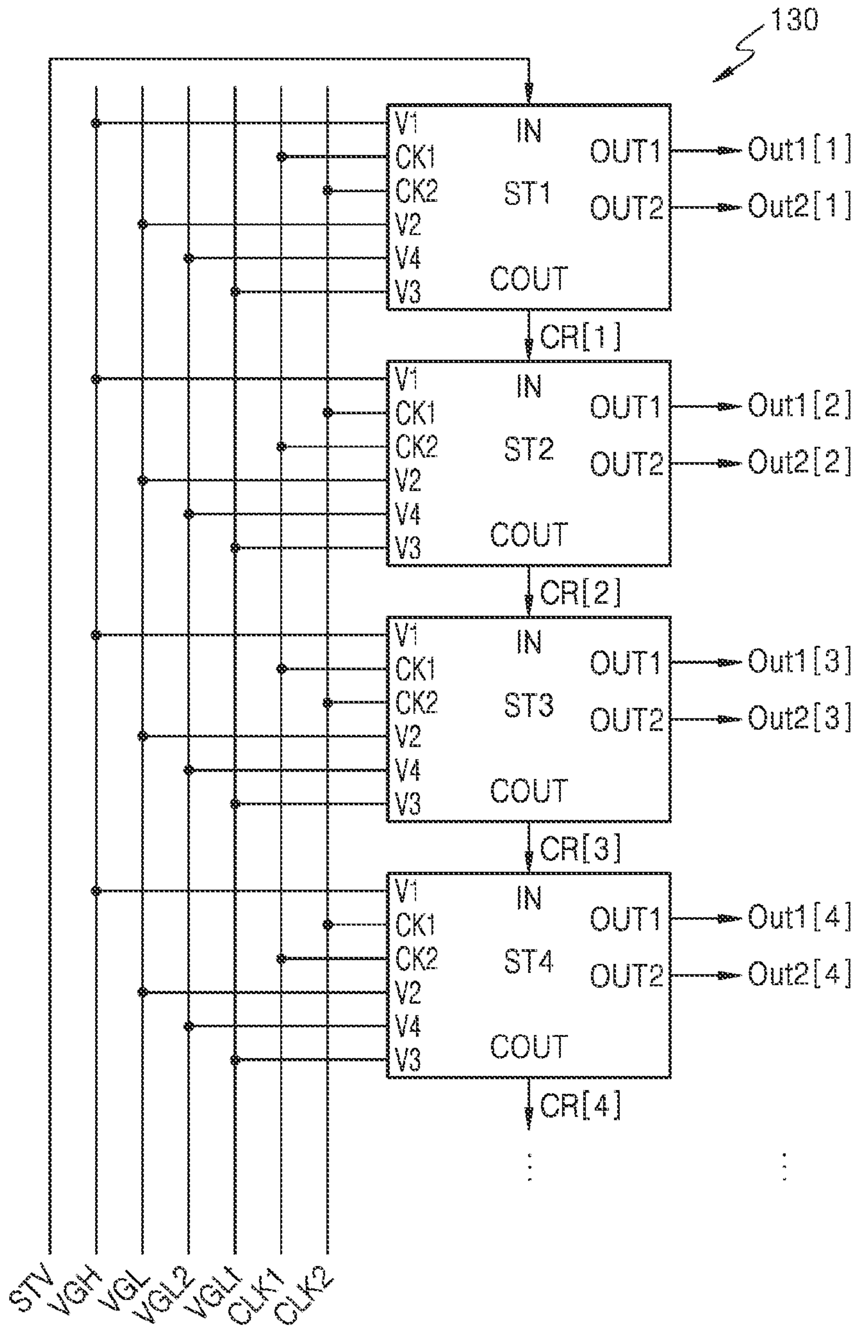
FIG. 17 is a diagram schematically illustrating a scan driver according to an embodiment.
Figure 18:
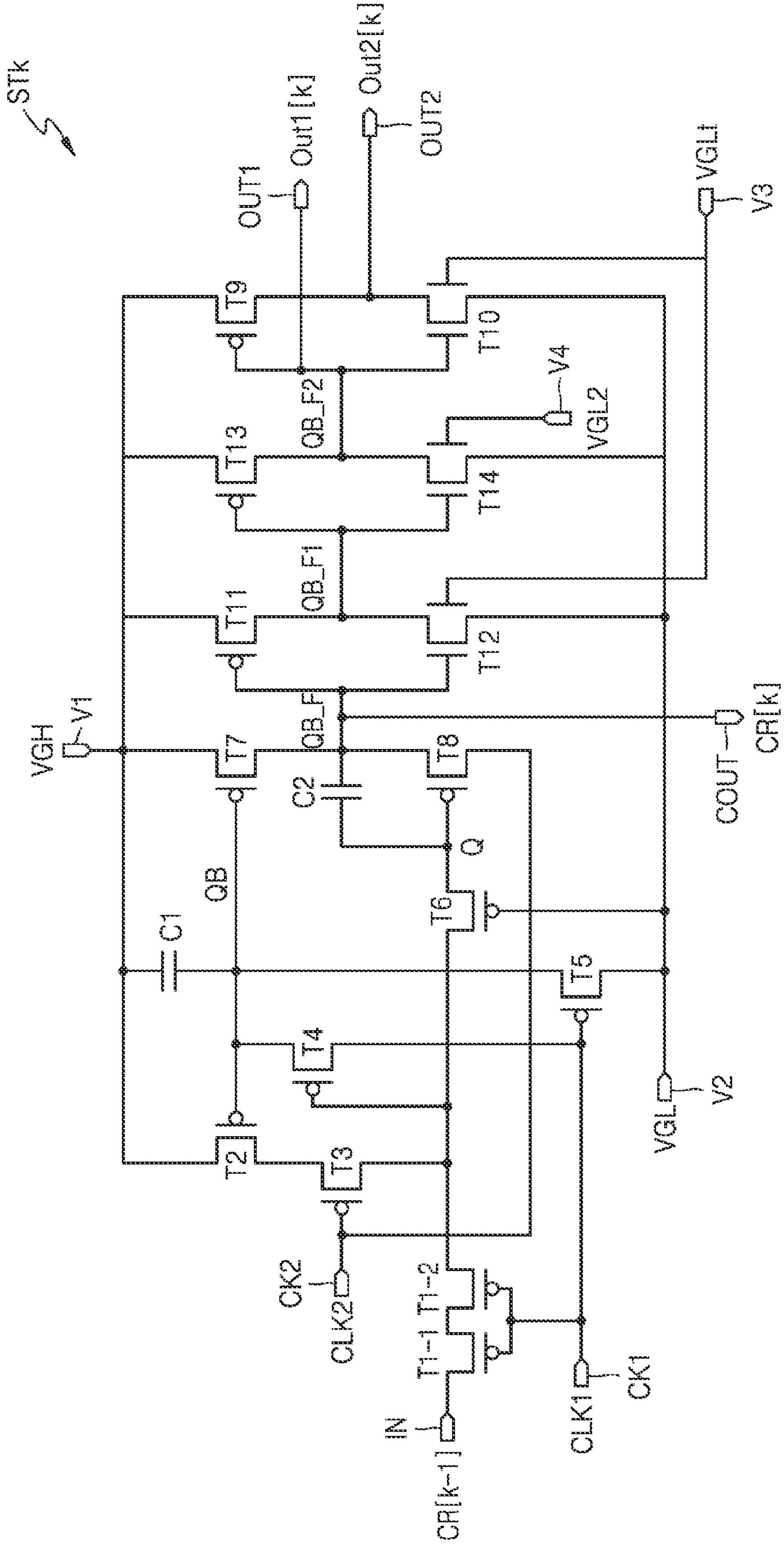
FIGS. 18 and 19 are circuit diagrams illustrating an example of a stage included in the scan driver in FIG. 17.
Figure 19:
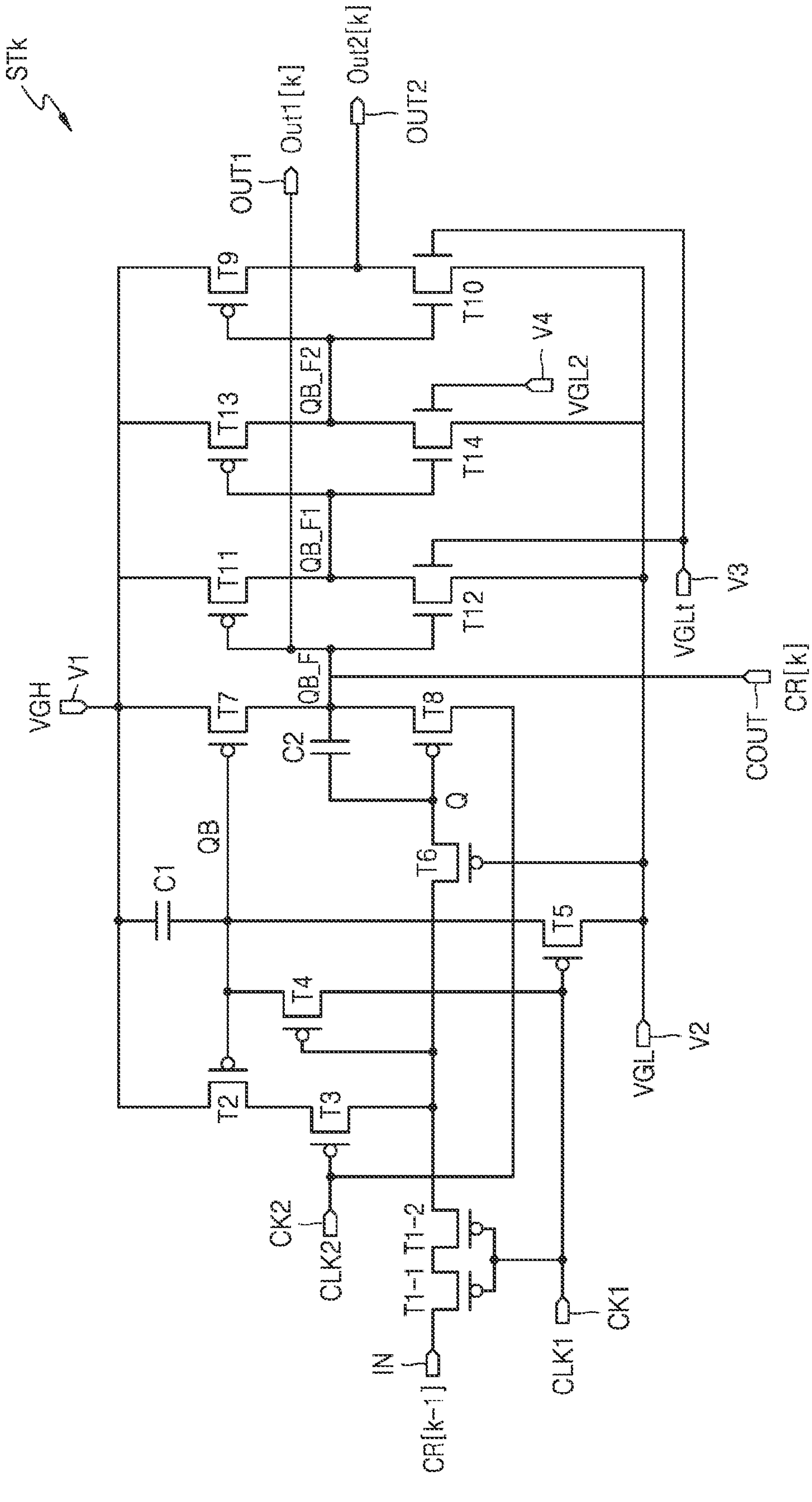

The first output terminal OUT1 may be connected to the third control node QB_F, and the first voltage VGH or the second voltage VGL, which is a low voltage of the second clock signal CLK2, may be output as the first output signal Out1 [k] from the first output terminal OUT1, according to voltage levels of the first control node Q and the second control node QB. FIG. 17 is a diagram schematically illustrating a scan driver 130 according to an embodiment. FIGS. 18 and 19 are circuit diagrams illustrating an example of a stage included in the scan driver 130 in FIG. 17.

The scan driver 130 shown in FIG. 17 differs from the scan driver shown in FIG. 14 in that each of the stages includes the carry output terminal COUT that outputs the carry signal CR separate from the first output signal Out1 to the input terminal IN of a next stage.

In the stage STK shown in FIG. 18, the carry output terminal COUT may be connected to the third control node QB_F, the carry signal CR[k] having a voltage level of the third control node QB_F may be output from the carry output terminal COUT, and the previous carry signal CR[k−1] output from a previous stage may be applied to the input terminal IN. Other configurations and operations of the stage STK shown in FIG. 18 are the same as those of the stage shown in FIG. 15.

In the stage STK shown in FIG. 19, the carry output terminal COUT may be connected to the third control node QB_F, the carry signal CR[k] having a voltage level of the third control node QB_F may be output from the carry output terminal COUT. Other configurations and operations of the stage STK shown in FIG. 19 are the same as those of the stage shown in FIG. 16.

In the embodiments of FIGS. 3 to 19, a single scan driver may simultaneously output a first output signal and a second output signal, where the first output signal has a low voltage as an on-voltage, and the second output signal has a high voltage as an on-voltage. In a display apparatus to which the embodiments of FIGS. 3 to 19 are applied, a size of a driver may be reduced as compared to a display apparatus individually having a scan driver outputting a scan signal of which a low voltage is an on-voltage and a scan driver outputting a scan signal of which a high voltage is an on-voltage, and thus, a non-display area may be minimized.

Figure 20:
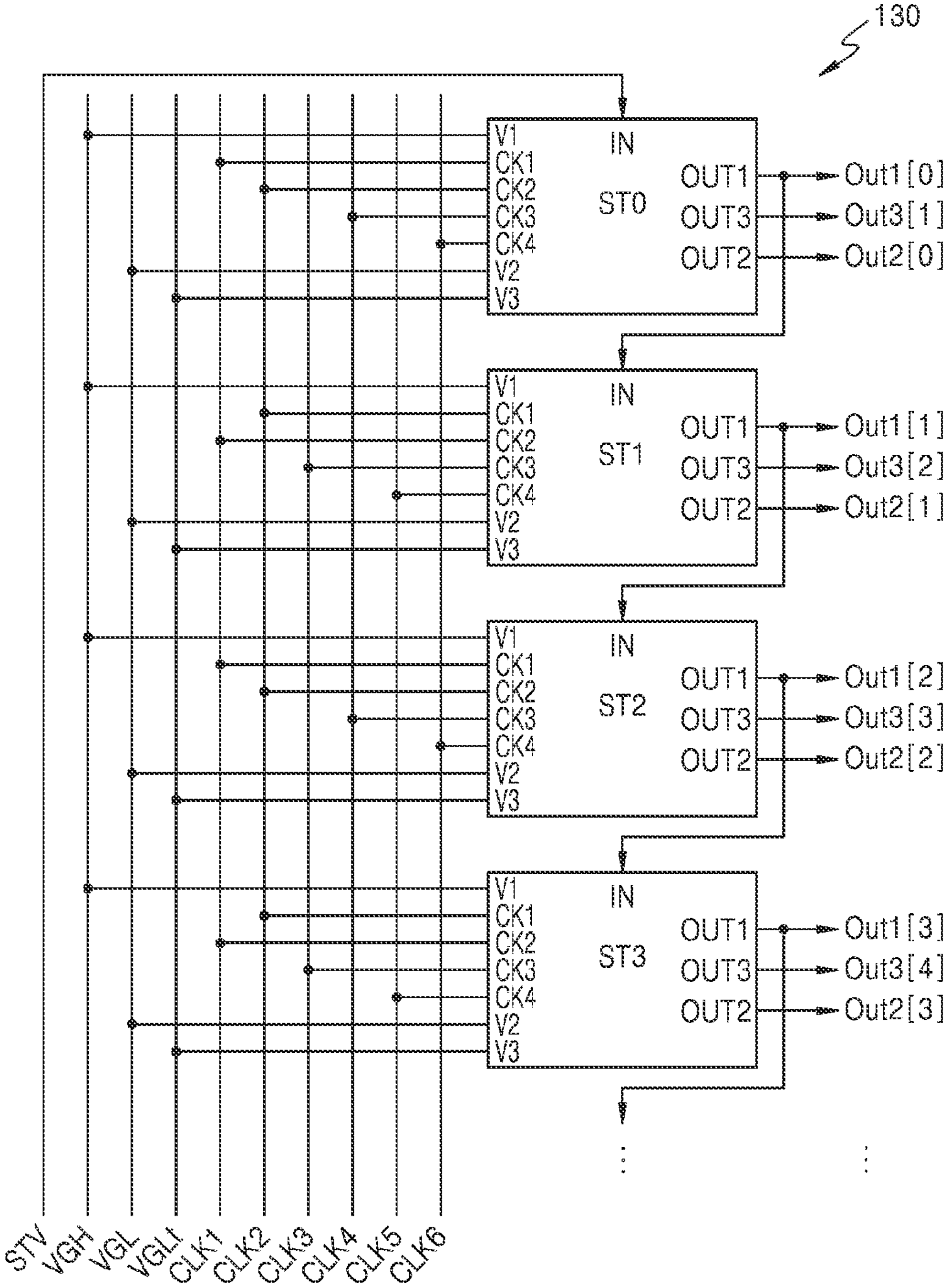
FIG. 20 is a diagram schematically illustrating a scan driver according to an embodiment.
Figure 21:
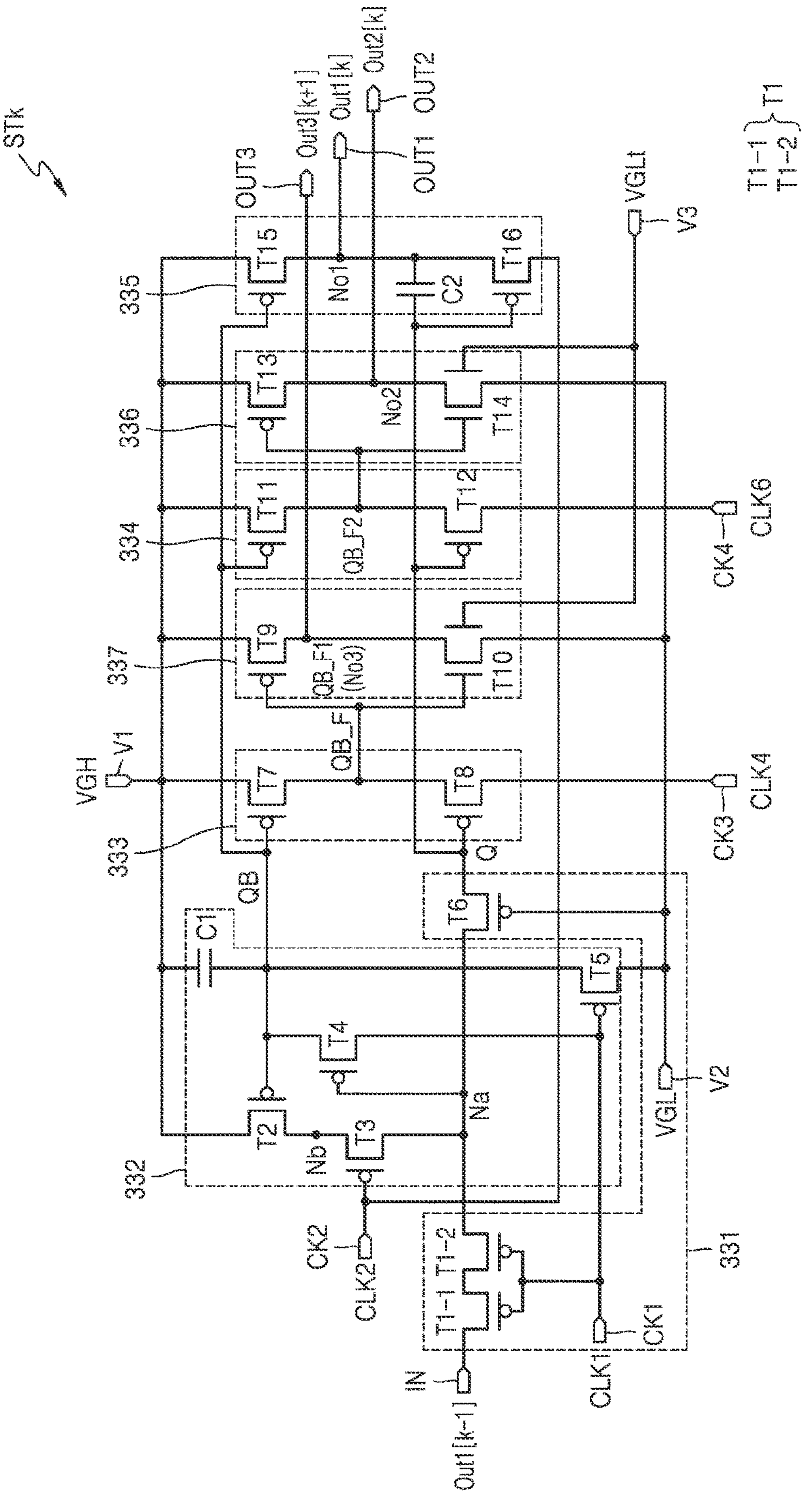
FIG. 21 is a circuit diagram illustrating an example of a stage included in the scan driver in FIG. 20.
Figure 22:
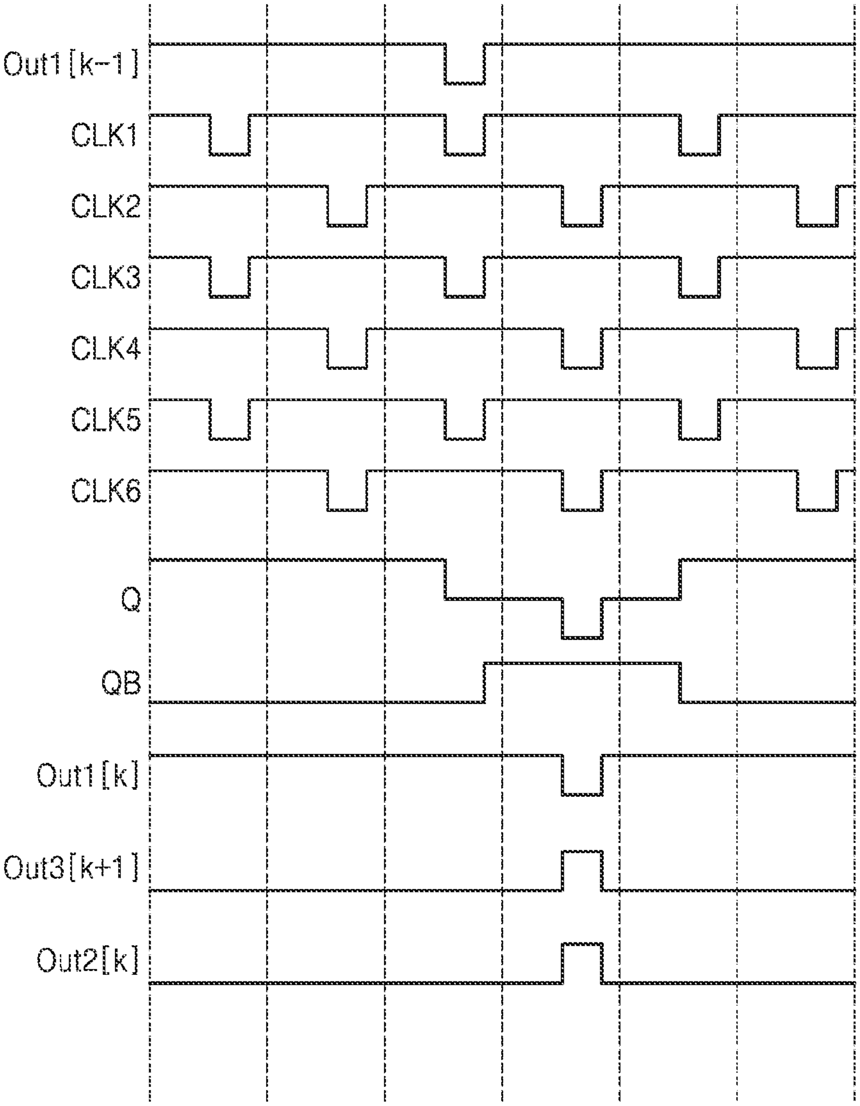
FIG. 22 is a waveform diagram illustrating an example of an operation of a stage in FIG. 20.

FIG. 20 is a diagram schematically illustrating a scan driver 130 according to an embodiment. FIG. 21 is a circuit diagram illustrating an example of a stage included in the scan driver 130 in FIG. 20. FIG. 22 is a waveform diagram illustrating an example of an operation of the stage STK in FIG. 20.

Referring to FIG. 20, the scan driver 130 may include a plurality of stages ST0, ST1, ST2, ST3, etc. The stages ST0, ST1, ST2, ST3, etc. may correspond to pixel rows (pixel lines) provided in the pixel unit 110, respectively. The number of stages of the scan driver 130 may be variously modified according to the number of pixel rows.

Each of the stages ST0, ST1, ST2, ST3, etc. may output a plurality of output signals in response to a start signal. For example, each of the stages ST0, ST1, ST2, ST3, etc. may output the first output signal Out1, the second output signal Out2, and a third output signal Out3. Here, the first output signal Out1 output from each of the stages ST0, ST1, ST2, ST3, etc. may include a gate control signal for controlling turn-on and turn-off of a P-type transistor, and the second output signal Out2 and the third output signal Out3 may include a gate control signal for controlling turn-on and turn-off of an N-type transistor. An on-voltage of the first output signal Out1 may include a low voltage, and an on-voltage of the second output signal Out2 and the third output signal Out3 may include a high voltage. For example, the first output signal Out1 output from each of the stages ST0, ST1, ST2, ST3, etc. may include the first scan control signal GW applied to the first scan control line SCL1 (see FIG. 2), the second output signal Out2 may include the second scan control signal GC applied to the second scan control line SCL2 (see FIG. 2), and the third output signal Out3 may include the third scan control signal GI applied to the third scan control line SCL3 (see FIG. 2). A pixel row to which the second output signal Out2 is applied and a pixel row to which the third output signal Out3 is applied may be different from each other, the second output signal Out2 and the third output signal Out3 being output from each of the stages ST0, ST1, ST2, ST3, etc. For example, the third scan control line SCL3 connected to a pixel arranged in a second pixel row may receive a third output signal Out3[2] output from the first stage ST1, and the first scan control line SCL1 and the second scan control line SCL2 may receive a first output signal Out1[1] and a second output signal Out2[1] that are subsequently output from the second stage ST2.

Each of the stages ST0, ST1, ST2, ST3, etc. may include the input terminal IN, the first clock terminal CK1, the second clock terminal CK2, a third clock terminal CK3, a fourth clock terminal CK4, the first voltage input terminal V1, the second voltage input terminal V2, the third voltage input terminal V3, the first output terminal OUT1, the second output terminal OUT2, and a third output terminal OUT3.

The input terminal IN may receive the external signal STV as a start signal or may receive the first output signal Out1 output as a carry signal from a previous stage. In an embodiment, the external signal STV may be applied to the input terminal IN of a zero stage ST0, and from the first stage ST1, the first output signal Out1 output from a previous stage may be applied to the input terminal IN.

A first clock signal CLK1 or a second clock signal CLK2 may be applied to the first clock terminal CK1 and the second clock terminal CK2. The first clock signal CLK1 and the second clock signal CLK2 may be alternately applied to the stages ST0, ST1, ST2, ST3, etc. For example, in an odd-numbered stage, the first clock signal CLK1 may be applied to the first clock terminal CK1, and the second clock signal CLK2 may be applied to the second clock terminal CK2. In addition, in an even-numbered stage, the second clock signal CLK2 may be applied to the first clock terminal CK1, and the first clock signal CLK1 may be applied to the second clock terminal CK2.

A third clock signal CLK3 or a fourth clock signal CLK4 may be applied to the third clock terminal CK3. The third clock signal CLK3 and the fourth clock signal CLK4 may be alternately applied to the stages ST0, ST1, ST2, ST3, etc. For example, the fourth clock signal CLK4 may be applied to the third clock terminal CK3 of an odd-numbered stage, and the third clock signal CLK3 may be applied to the third clock terminal CK3 of an even-numbered stage. The third clock signal CLK3 and the fourth clock signal CLK4 may include square wave signals in which the first voltage VGH that is a high voltage and the second voltage VGL that is a low voltage are repeated. A period of the third clock signal CLK3 and fourth clock signal CLK4 may be 2H including one high voltage and one low voltage. The third clock signal CLK3 and the fourth clock signal CLK4 may include signals having the same waveform as each other and being phase-shifted. The third clock signal CLK3 and the first clock signal CLK1 have the same phase as each other, and the fourth clock signal CLK4 and the second clock signal CLK2 may have the same phase as each other.

A fifth clock signal CLK5 and a sixth clock signal CLK6 may be applied to the fourth clock terminal CK4. The fifth clock signal CLK5 and the sixth clock signal CLK6 may be alternately applied to the stages ST0, ST1, ST2, ST3, etc. For example, the sixth clock signal CLK6 may be applied to the fourth clock terminal CK4 of an odd-numbered stage, and the fifth clock signal CLK5 may be applied to the fourth clock terminal CK4 of an even-numbered stage. Or, the sixth clock signal CLK6 may be applied to the fourth clock terminal CK4 of an even-numbered stage, and the fifth clock signal CLK5 may be applied to the fourth clock terminal CK4 of an odd-numbered stage. The fifth clock signal CLK5 and the sixth clock signal CLK6 may include square wave signals in which the first voltage VGH that is a high voltage and the second voltage VGL that is a low voltage are repeated. A period of the fifth clock signal CLK5 and sixth clock signal CLK6 may be 2H including one high voltage and one low voltage. The fifth clock signal CLK5 and the sixth clock signal CLK6 may include signals having the same waveform as each other and being phase-shifted. The fifth clock signal CLK5 and the first clock signal CLK1 have the same phase as each other, and the sixth clock signal CLK6 and the second clock signal CLK2 may have the same phase as each other.

The first voltage input terminal V1 may receive the first voltage VGH that is a high voltage, and the second voltage input terminal V2 may receive the second voltage VGL that is a low voltage. The third voltage input terminal V3 may receive the third voltage VGLt. The first voltage VGH, the second voltage VGL, and the third voltage VGLt may be applied as global signals from the controller 190 shown in FIG. 1 and/or a power supply unit (not shown). As shown in FIG. 6, the third voltage VGLt may include a voltage that varies in units of certain time. In an embodiment, in the third voltage VGLt, a specific voltage may be initially applied, and the third voltage may be changed by steps according to use time. In another embodiment, the third voltage VGLt may be set as a constant voltage that is not variable. The constant voltage may include a voltage different from the second voltage VGL. For example, the initial specific voltage VGLt0 and constant voltage of the third voltage VGLt may include a voltage less than the second voltage VGL.

The first output terminal OUT1 may output the first output signal Out1, the second output terminal OUT2 may output the second output signal Out2, and the third output terminal OUT3 may output the third output signal Out3. The first output signal Out1 may be output to the input terminal IN of a next stage as a carry signal. Voltage levels of the second output signal Out2 and the third output signal Out3 may be the same as each other. The voltage levels of the first output signal Out1 and the second output signal Out2 may be opposite to each other. The voltage levels of the first output signal Out1 and the third output signal Out3 may be opposite to each other. For example, when the first output signal Out1 is a low voltage, the second output signal Out2 and the third output signal Out3 may be a high voltage.

Referring to FIG. 21, each of the stages ST0, ST1, ST2, ST3, etc. may have a plurality of nodes, and hereinafter, some of the plurality of nodes are referred to as the first control node Q, the second control node QB, the third control node QB_F, the fourth control node QB_F1, and the fifth control node QB_F2. The fourth control node QB_F1 may include a third output node No3 to which the third output terminal OUT3 is connected. Hereinafter, the stage STK, which is a $k^{th}$ stage, is described as an example of an odd-numbered stage, and the stage STK may output the first output signal Out1[k] and the second output signal Out2[k] to a $k^{th}$ pixel row of the pixel unit 110 and at the same time, output a third output signal Out3[k+1] to a (k+1)th pixel row.

The stage STk may include a first node controller 331, a second node controller 332, a third node controller 333, a fourth node controller 334, a first output controller 335, a second output controller 336, and a third output controller 337. Each of the first node controller 331, the second node controller 332, the third node controller 333, the fourth node controller 334, the first output controller 335, the second output controller 336, and the third output controller 337 may include at least one transistor. The at least one transistor may include an N-type transistor and/or a P-type transistor. The N-type transistor may include an N-type oxide semiconductor transistor. The P-type transistor may include a P-type silicon semiconductor transistor. The N-type oxide semiconductor transistor may include a dual gate transistor including a first gate and a second gate, where the first gate includes a top gate disposed over a semiconductor, and the second gate includes a bottom gate disposed under the semiconductor. For example, the first to ninth transistors T1 to T9, the eleventh to thirteenth transistors T11 to T13, the fifteenth transistor T15, and the sixteenth transistor T16 may include P-type transistors, and the tenth transistor T10 and the fourteenth transistor T14 may include N-type transistors, of the stage STK.

A previous first output signal Out1 [k−1] may be applied to the input terminal IN as a start signal, the first clock signal CLK1 may be applied to the first clock terminal CK1, and the second clock signal CLK2 may be applied to the second clock terminal CK2. In an odd-numbered stage, the fourth clock signal CLK4 may be applied to the third clock terminal CK3, and the sixth clock signal CLK6 may be applied to the fourth clock terminal CK4. The first voltage VGH may be applied to the first voltage input terminal V1, the second voltage VGL may be applied to the second voltage input terminal V2, and the third voltage VGLt may be applied to the third voltage input terminal V3. When k is 0, an external signal STV may be applied to the input terminal IN of the zero stage ST0 as a start signal.

The first node controller 331 may be connected between the input terminal IN and the first control node Q. The first node controller 331 may control a voltage of the first control node Q based on a start signal (e.g., the external signal STV or a previous first output signal) applied to the input terminal IN or the first clock signal CLK1 applied to the first clock terminal CK1. The first node controller 331 may include the first transistor T1 and the sixth transistor T6.

The first transistor T1 may include a pair of sub-transistors, which are connected in series to each other between the input terminal IN and a first node Na. For example, the first transistor T1 may include a first sub-transistor T1-1 and a second sub-transistor T1-2. Gates of the first sub-transistor T1-1 and the second sub-transistor T1-2 may be connected to the first clock terminal CK1.

The sixth transistor T6 may be connected between the first node Na and the first control node Q. A gate of the sixth transistor T6 may be connected to the second voltage input terminal V2.

The second node controller 332 may be connected between the first node Na and the second control node QB. The second node controller 332 may control a voltage of the second control node QB, based on the first clock signal CLK1 applied to the first clock terminal CK1 and the second clock signal CLK2 applied to the second clock terminal CK2.

The second node controller 332 may include the second to fifth transistors T2 to T5 and the first capacitor C1.

The second transistor T2 may be connected to the first voltage input terminal V1 and a second node Nb. A gate of the second transistor T2 may be connected to the second control node QB.

The third transistor T3 may be connected between the first node Na and the second node Nb. A gate of the third transistor T3 may be connected to the second second clock terminal CK2.

The fourth transistor T4 may be connected between the second control node QB and the first clock terminal CK1. A gate of the fourth transistor T4 may be connected to the first node Na.

The fifth transistor T5 may be connected between the second control node QB and the second voltage input terminal V2. A gate of the fifth transistor T5 may be connected to the first clock terminal CK1.

The first capacitor C1 may be connected between the first voltage input terminal V1 and the second control node QB.

The third node controller 333 may be connected between the first voltage input terminal V1 and the third clock terminal CK3. The third node controller 333 may control a voltage of the third control node QB_F according to voltages of the first control node Q and the second control node QB. The third node controller 333 may include the seventh transistor T7 and the eighth transistor T8.

The seventh transistor T7 may be connected between the first voltage input terminal V1 and the third control node QB_F. A gate of the seventh transistor T7 may be connected to the second control node QB.

The eighth transistor T8 may be connected between the third clock terminal CK3 and the third control node QB_F. A gate of the eighth transistor T8 may be connected to the first control node Q.

The fourth node controller 334 may be connected between the first voltage input terminal V1 and the fourth clock terminal CK4. The fourth node controller 334 may control a voltage of the fifth control node QB_F2 according to the voltages of the first control node Q and the second control node QB. The fourth node controller 334 may include the eleventh transistor T11 and the twelfth transistor T12.

The eleventh transistor T11 may be connected between the first voltage input terminal V1 and the fifth control node QB_F2. A gate of the eleventh transistor T11 may be connected to the second control node QB.

The twelfth transistor T12 may be connected between the fourth clock terminal CK4 and the fifth control node QB_F2. A gate of the twelfth transistor T12 may be connected to the first control node Q.

The first output controller 335 may be connected between the first voltage input terminal V1 and the second clock terminal CK2. The first output controller 335 may output the first output signal Out1 [k] of a high voltage or the first output signal Out1 [k] of a low voltage, according to the voltages of the first control node Q and the second control node QB. The first output controller 335 may output a high voltage of the first voltage VGH and a low voltage of the second clock signal CLK2 from the first output terminal OUT1 connected to a first output node No1, according to the voltage levels of the first control node Q and the second control node QB. The first output controller 335 may include the fifteenth transistor T15, the sixteenth transistor T16, and the second capacitor C2.

The fifteenth transistor T15 may be connected between the first voltage input terminal V1 and the first output terminal OUT1 (the first output node No1). A gate of the fifteenth transistor T15 may be connected to the second control node QB.

The sixteenth transistor T16 may be connected between the second clock terminal CK2 and the first output terminal OUT1. A gate of the sixteenth transistor T16 may be connected to the first control node Q.

The second capacitor C2 may be connected between the first control node Q and the first output terminal OUT1.

The second output controller 336 may be connected between the first voltage input terminal V1 and the second voltage input terminal V2. The second output controller 336 may output the second output signal Out2[k] of a high voltage or the second output signal Out2[k] of a low voltage according to the voltage level of the fifth control node QB_F2. The second output controller 336 may output the first voltage VGH or the second voltage VGL as the second output signal Out2[k] from the second output terminal OUT2 connected to the second output node No2, according to the voltage of the fifth control node QB_F2. The second output controller 336 may include the thirteenth transistor T13 and the fourteenth transistor T14.

The thirteenth transistor T13 may be connected between the first voltage input terminal V1 and the second output terminal OUT2 (the second output node No2). A gate of the thirteenth transistor T13 may be connected to the fifth control node QB_F2.

The fourteenth transistor T14 may be connected between the second voltage input terminal V2 and the second output terminal OUT2. The fourteenth transistor T14 may include a first gate and a second gate. The first gate of the fourteenth transistor T14 may be connected to the fifth control node QB_F2, and the second gate of the fourteenth transistor T14 may be connected to the third voltage input terminal V3.

The third output controller 337 may be connected between the first voltage input terminal V1 and the second voltage input terminal V2. The third output controller 337 may output the third output signal Out3[k+1] of a high voltage or the third output signal Out3[k+1] of a low voltage according to the voltage level of the third control node QB_F. The third output controller 337 may output a high voltage of the first voltage VGH or a low voltage of the second voltage VGL as the third output signal Out3[k+1] from the third output terminal OUT3 connected to the fourth control node QB_F1, according to the voltage of the third control node QB_F. The third output controller 337 may include the ninth transistor T9 and the tenth transistor T10.

The ninth transistor T9 may be connected between the first voltage input terminal V1 and the third output terminal OUT3 (fourth control node QB_F1 or third output node No3). A gate of the ninth transistor T9 may be connected to the third control node QB_F.

The tenth transistor T10 may be connected between the second voltage input terminal V2 and the third output terminal OUT3. The tenth transistor T10 may include a first gate and a second gate. The first gate of the tenth transistor T10 may be connected to the third control node QB_F, and the second gate of the tenth transistor T10 may be connected to the third voltage input terminal V3.

Referring to FIG. 22, when a start signal of a low voltage is applied to the input terminal IN, the first clock signal CLK1 of a low voltage may be applied to the first clock terminal CK1, the second clock signal CLK2 of a high voltage may be applied to the second clock terminal CK2, the fourth clock signal CLK4 of a high voltage may be applied to the third clock terminal CK3, and the sixth clock signal CLK6 of a high voltage may be applied to the fourth clock terminal CK4. The first transistor T1 and the fifth transistor T5 may be turned on according to the first clock signal CLK1. The first node Na may be in a low-level state according to the turned-on first transistor T1 so that the fourth transistor T4 is turned on, and according to the turned-on fourth transistor T4 and the turned-on fifth transistor T5, the second control node QB may be set to a low-level state according to the second voltage VGL. In addition, the sixth transistor T6 may be turned on according to the second voltage VGL so that the first control node Q may be set to a low-level state.

The eighth transistor T8, the twelfth transistor T12, and the sixteenth transistor, of which gates are connected to the first control node Q of a low level, and the seventh transistor T7, the eleventh transistor T11, and the fifteenth transistor T15, of which gates are connected to the second control node QB of a low level may be turned on. The first voltage VGH of a high level may be output as the first output signal Out1 [k] from the first output terminal OUT1 according to the turned-on fifteenth transistor T15 and the turned-on sixteenth transistor T16. The fifth control node QB_F2 may be set to a high level of the first voltage VGH according to the turned-on eleventh transistor T11 and the turned-on twelfth transistor T12, so that the fourteenth transistor T14 of which the gate is connected to the fifth control node QB_F2 is turned on and the second voltage VGL of a low level may be output as the second output signal Out2[k] from the second output terminal OUT2. The third control node QB_F may be set to a high level of the first voltage VGH according to the turned-on seventh transistor T7 and the turned-on eighth transistor T8, so that the tenth transistor T10 of which the gate is connected to the third control node QB_F may be turned on and the second voltage VGL of a low level may be output as the third output signal Out3[k+1] from the third output terminal OUT3.

A start signal may transition from a low voltage to a high voltage, the first clock signal CLK1 of a high voltage may be applied to the first clock terminal CK1, the second clock signal CLK2 of a high voltage may be applied to the second clock terminal CK2, the fourth clock signal CLK4 of a high voltage may be applied to the third clock terminal CK3, and the sixth clock signal CLK6 of a high voltage may be applied to the fourth clock terminal CK4. Because the first transistor T1 and the third transistor T3 are turned off according to the first clock signal CLK1 and the second clock signal CLK2 and the sixth transistor T6 is continuously turned on according to the second voltage VGL of a low voltage, the first node Na and the first control node Q may maintain a low-level state. Because the fifth transistor T5 is turned off according to the first clock signal CLK1 of a high voltage and the first node Na is a low level, the fourth transistor T4 may be continuously turned on so that a high voltage of the first clock signal CLK1 is transferred to the second control node QB and the second control node QB is set to a high level. Accordingly, the second transistor T2, the seventh transistor T7, the eleventh transistor T11, and the fifteenth transistor T15, of which gates are connected to the second control node QB of a high level, may be turned off.

Thereafter, when the second clock signal CLK2, the fourth clock signal CLK4, and the sixth clock signal CLK6 transition from a high voltage to a low voltage while the first clock signal CLK1 of a high voltage is applied to the first clock terminal CK1, the third transistor T3 may be turned on. The third control node QB_F may be set to a low level according to the fourth clock signal CLK4 of a low voltage, by the third transistor T3, the sixth transistor T6, the eighth transistor T8, which are in a turn-on state, and the second capacitor C2, and the voltage level of the first control node Q may be set to an even lower low-voltage level.

Because the eighth transistor T8 of which the gate is connected to the first control node Q is turned on, the third control node QB_F may be set to a low level according to the fourth clock signal CLK4. The ninth transistor T9 of which the gate is connected to the third control node QB_F may be turned on, and the first voltage VGH applied to the first voltage input terminal V1 may be output as the third output signal Out3[k+1] from the third output terminal OUT3. Because the twelfth transistor T12 of which the gate is connected to the first control node Q is turned on, the fifth control node QB_F2 may be set to a low level according to the sixth clock signal CLK6. The thirteenth transistor T13 of which the gate is connected to the fifth control node QB_F2 may be turned on, and the first voltage VGH applied to the first voltage input terminal V1 may be output as the second output signal Out2[k] from the second output terminal OUT2. Because the sixteenth transistor T16 of which the gate is connected to the first control node Q is turned on, the second clock signal CLK2 of a low voltage may be output as the first output signal Out1 [k] from the first output terminal OUT1. In other words, the first output signal Out1 [k] of a low voltage, the second output signal Out2[k] of a high voltage, and the third output signal Out3[k+1] of a high voltage may be output in synchronization with a timing of the second clock signal CLK2, the fourth clock signal CLK4, and the sixth clock signal CLK6 of a low voltage. The first output signal Out1[k] may also be applied to the input terminal IN of a next stage. The third output signal Out3[k+1] may be applied to a pixel of a pixel row corresponding to the next stage.

Subsequently, when the second clock signal CLK2, the fourth clock signal CLK4, and the sixth clock signal CLK6 transition from a low voltage to a high voltage while the first clock signal CLK1 of a high voltage is applied to the first clock terminal CK1, the third transistor T3 may be turned off, the first control node Q may maintain a low-level state, and the second control node QB may maintain a high-level state. Because the eighth transistor T8 of which the gate is connected to the first control node Q is turned on, the third control node QB_F may be set to a high level according to the fourth clock signal CLK4 of a high voltage. The tenth transistor T10 of which the gate is connected to the third control node QB_F may be turned on, and the second voltage VGL applied to the second voltage input terminal V2 may be output as the third output signal Out3[k+1] from the third output terminal OUT3. Because the twelfth transistor T12 of which the gate is connected to the first control node Q is turned on, the fifth control node QB_F2 may be set to a high level according to the sixth clock signal CLK6. The fourteenth transistor T14 of which the gate is connected to the fifth control node QB_F2 may be turned on, and the second voltage VGL applied to the second voltage input terminal V2 may be output as the second output signal Out2[k] from the second output terminal OUT2. The sixteenth transistor T16 of which the gate is connected to the first control node Q may be turned on so that a high voltage of the second clock signal CLK2 may be output as the first output signal Out1 [k] from the first output terminal OUT1. In other words, the first output signal Out1 [k] of a high voltage, the second output signal Out2[k] of a low voltage, and the third output signal Out3[k+1] of a low voltage may be output in synchronization with a timing at which the second clock signal CLK2, the fourth clock signal CLK4, and the sixth clock signal CLK6 transition from a low voltage to a high voltage.

Thereafter, when the first clock signal CLK1 transitions from a high voltage to a low voltage while the second clock signal CLK2, the fourth clock signal CLK4, and the sixth clock signal CLK6 of a high voltage are applied, the fifth transistor T5 may be turned on. The first control node Q may be set to a high level according to a high voltage of the start signal by the turned-on first transistor T1 and the sixth transistor T6 turned on according to the second voltage VGL. The second control node QB may be set to a low-level state according to the second voltage VGL by the turned-on fifth transistor T5. Accordingly, the eighth transistor T8 may be turned off, and the seventh transistor T7 may be turned on, so that the third control node QB_F may be set to a high-level state according to the first voltage VGH. The tenth transistor T10 of which the gate is connected to the third control node QB_F may be turned on, so that the second voltage VGL of a low voltage may be output as the third output signal Out3[k+1] from the third output terminal OUT3. The eleventh transistor T11 of which the gate is connected to the second control node QB may be turned on, and the fifth control node QB_F2 may be set to a high-level state according to the first voltage VGH. The fourteenth transistor T14 of which the gate is connected to the fifth control node QB_F2 may be turned on, so that the second voltage VGL of a low voltage may be output as the second output signal Out2[k] from the second output terminal OUT2. The fifteenth transistor T15 of which the gate is connected to the second control node QB may be turned on, and the first voltage VGH may be output as the first output signal Out1 [k] from the first output terminal OUT1. In other words, the first output signal Out1 [k] of a high voltage, the second output signal Out2[k] of a low voltage, and the third output signal Out3[k+1] of a low voltage may be maintained.

Until a previous first output signal Out1 [k−1] of a low voltage, which is an output of a previous stage, is applied to the input terminal IN as a start signal, the first control node Q may maintain a high-level state, and the second control node QB may maintain a low-level state. Subsequent operations overlap those described above, and redundant descriptions thereof are omitted.

In an embodiment, in the second output signal Out2[k] and the third output signal Out3[k+1], a low-voltage period may be greater in length than a high-voltage period. The low-voltage period of the second output signal Out2[k] may include a period in which the fifth control node QB_F2 is in a high-level state, and the low voltage period of the third output signal Out3[k+1] may include a period in which the third control node QB_F is in a high-level state. Accordingly, the tenth transistor T10 of which the first gate is connected to the third control node QB_F and the fourteenth transistor T14 of which the first gate is connected to the fifth control node QB_F2 may receive a high voltage for a long period of time. In the embodiment, the third voltage VGLt that is a low voltage may be applied to the second gates of the tenth transistor T10 and the fourteenth transistor T14, and a voltage value of the third voltage VGLt may be increased by steps according to use time.

In an embodiment, as shown in FIG. 6, the third voltage VGLt may include a voltage that varies in units of certain time. In another embodiment, the third voltage may be set as a constant voltage that is not variable. Hereinafter, contents of the embodiment overlapping those described with reference to FIG. 6 are not described in detail.

An odd-numbered stage of the scan driver 130 shown in FIG. 20 may output the first output signal Out1 of a low voltage, the second output signal Out2 of a high voltage, and the third output signal Out3 of a high voltage, in synchronization with a low voltage timing of the second clock signal CLK2, the fourth clock signal CLK4, and the sixth clock signal CLK6. An even-numbered stage may output the first output signal Out1 of a low voltage, the second output signal Out2 of a high voltage, and the third output signal Out3 of a high voltage, in synchronization with a low voltage timing of the first clock signal CLK1, the third clock signal CLK3, and the fifth clock signal CLK5.

Accordingly, the stages ST0, ST1, ST2, ST3, etc. may sequentially output the first output signals Out1[0], Out1[1], Out1[2], Out1[3], etc. of a low voltage, sequentially output the second output signals Out2[0], Out2[1], Out2[2], Out2[3], etc. of a high voltage, and sequentially output the third output signals Out3[1], Out3[2], Out3[3], Out3[4], etc. of a high voltage.

Figure 23A:
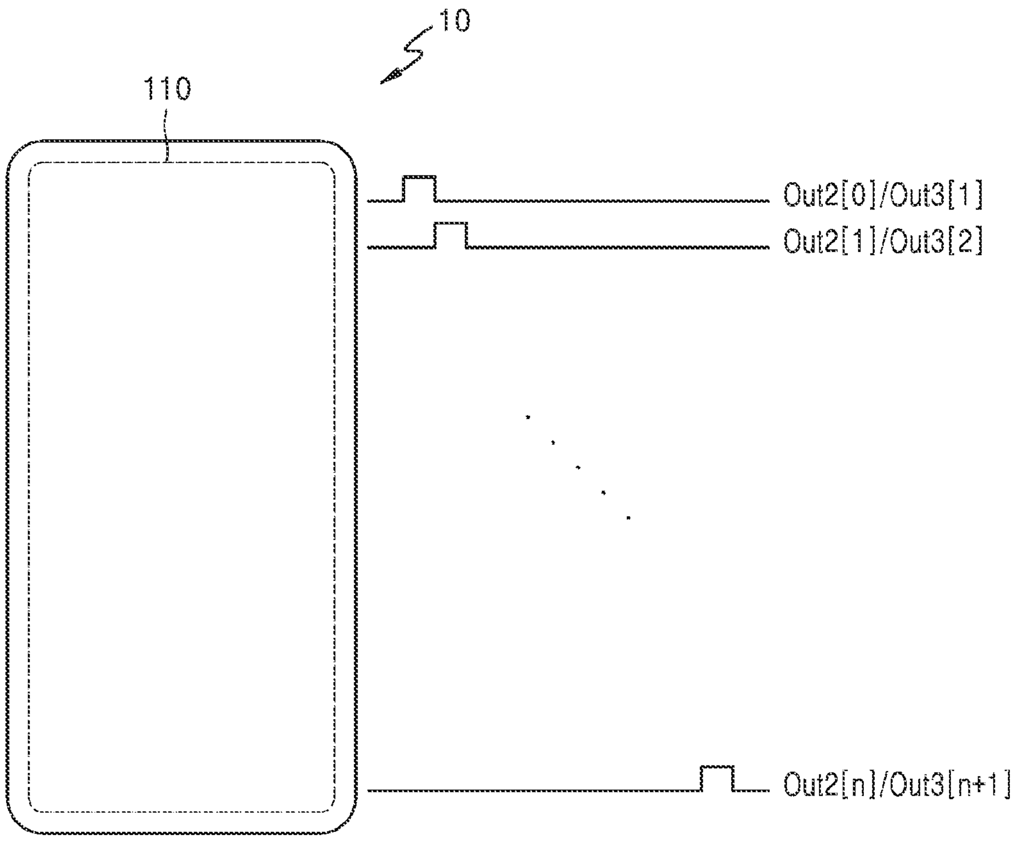
FIGS. 23A and 23B are diagrams illustrating an example of an operation of a scan driver according to an embodiment.
Figure 23B:
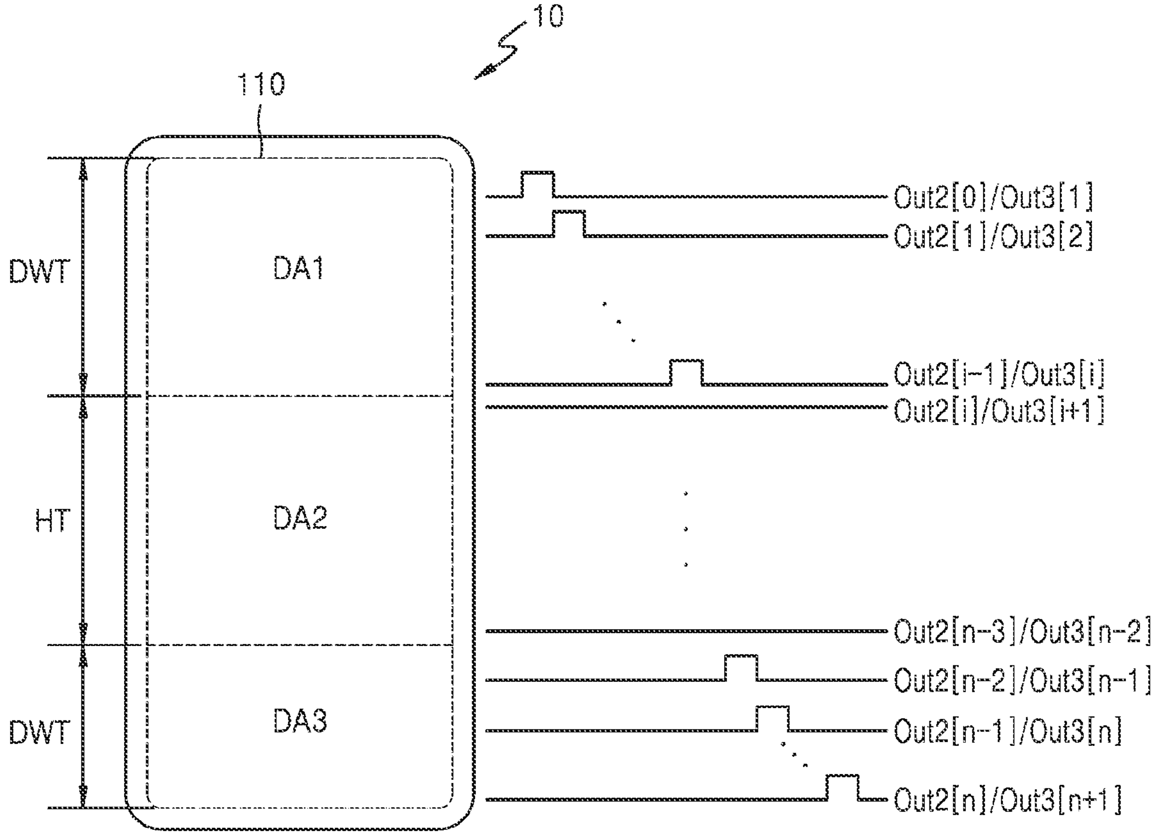
Figure 24:
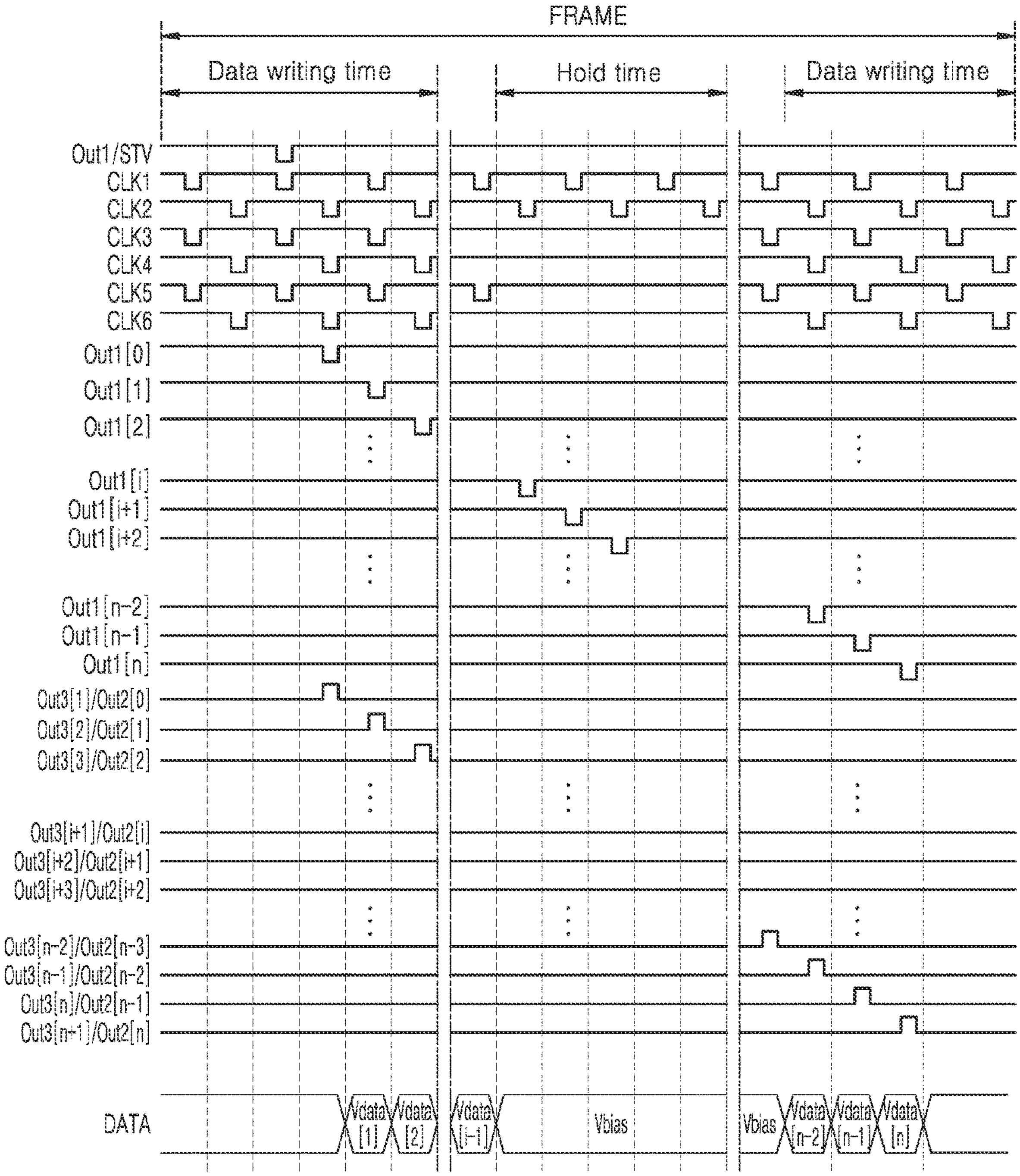
FIG. 24 is an operation timing diagram of a scan driver according to FIGS. 23A and 23B.

FIGS. 23A and 23B are diagrams illustrating an operation of a scan driver, according to an embodiment. FIG. 24 is an operation timing diagram of the scan driver according to FIGS. 23A and 23B. In FIGS. 23A and 23B, the second output signal Out2 and the third output signal Out3 which are output from the scan driver are shown as an example. As shown in FIG. 24, in an embodiment, one frame FRAME may include a data writing time DWT in which a data signal is applied and a hold time HT in which a data signal is not applied and a previous data signal is maintained, in pixels. One or more data writing times DWT and one or more hold times HT may be included in the one frame FRAME.

The data writing time DWT may include a time at which the first output signal Out1, the second output signal Out2, and the third output signal Out3 are applied to consecutive pixel rows of a first area in which an image different from an image displayed in the previous frame, for example, a moving image, is displayed. The hold time HT may include a time at which the first output signal Out1 is applied to consecutive pixel rows of a second area in which the same image as the image displayed in the previous frame, for example, a still image, is displayed, and the second output signal Out2 and the third output signal Out3 are not applied. In the data writing time DWT, a data voltage Vdata corresponding to a data signal DATA applied to a data line in synchronization with the first output scan signal Out1 may be applied to a corresponding pixel. In the hold time HT, a bias voltage Vbias applied to a data line in synchronization with the first output scan signal Out1 may be applied to a corresponding pixel.

Stages corresponding to the pixel rows of the first area from among the stages ST0, ST1, ST2, ST3, etc. of the scan driver may sequentially output the first output signals Out1 of a low voltage, sequentially output the second output signals Out2 of a high voltage, and sequentially output the third output signals Out3 of a high voltage. Accordingly, the corresponding data voltage Vdata may be applied to each of the pixels of the first area of the pixel unit 110 so that a moving image is displayed in the first area.

Stages corresponding to the pixel rows of the second area from among the stages ST0, ST1, ST2, ST3, etc. of the scan driver may sequentially output the first output signals Out1 of a low voltage, and the second output signals Out2 and the third output signals Out3 may be output as a low voltage. Accordingly, the bias voltage Vbias may be applied without data writing on a data line of each of the pixels of the second area of the pixel unit 110, so that a data signal of the previous frame is maintained and a still image is displayed in the second area. In the hold time HT, the third clock signal CLK3 and the fourth clock signal CLK4, and the fifth clock signal CLK5 and the sixth clock signal CLK6 may be applied at a high voltage, which affect the second output signal Out2 and the third output signal Out3. FIG. 23A is an embodiment in which the pixel unit 110 is entirely a first area. For example, one frame image displayed in the entire pixel unit 110 may include a moving image. The stages ST0, ST1, ST2, ST3, etc. of the scan driver 130 may sequentially output the first output signals Out1[0], Out1[1], Out1[2], . . . , Out1[n] of a low voltage, sequentially output the second output signals Out2[0], Out2[1], Out2[2], . . . , Out2[n] of a high voltage, and sequentially output the third output signals Out3[1], Out3[2], Out3[3], . . . , Out3[n+1] of a high voltage. Accordingly, an image corresponding to a data signal applied to each of the pixels of the pixel unit 110 via a data line may be displayed on a screen.

FIG. 23B is an embodiment in which a portion of the pixel unit 110 is a first area and the other portion is a second area. For example, a portion of a frame image displayed in the entire pixel unit 110 may include a moving image, and the other portion may include a still image, and in this case, the moving image and the still image may include partial images of the frame image. The moving image is displayed may mean a new image different from a previous image is displayed. The still image is displayed may mean that a previous image continues. As shown in FIG. 24, the stages ST0, ST1, ST2, ST3, etc. of the scan driver 130 may sequentially output the first output signals Out1[0], Out1[1], Out1[2], . . . , Out1 [n] of a low voltage. In addition, zero to $(i-1)^{st}$ stages ST0 to STi-1 and $(n-2)^{th}$ to $n^{th}$ stages STn-2 to STn corresponding to the first areas DA1 and DA3 from among the stages ST0, ST1, ST2, ST3, etc. of the scan driver 130 may sequentially output the second output signals Out2[0] to Out2[i−1] and Out2[n−2] to Out2[n] of a high voltage and the third output signals Out3[1] to Out3[i] and Out3[n−1] to Out3[n+1] of a high voltage. Here, i may include a natural number less than n. In addition, an $i^{th}$ to $(n-3)^{th}$ stages STi to STn-3 corresponding to the second area DA2 from among the stages ST0, ST1, ST2, ST3, etc. of the scan driver may output the second output signals Out2[i] to Out2[n−3] of a low voltage and the third output signals Out3[i+1] to Out3[n−2] of a low voltage.

Figure 28:
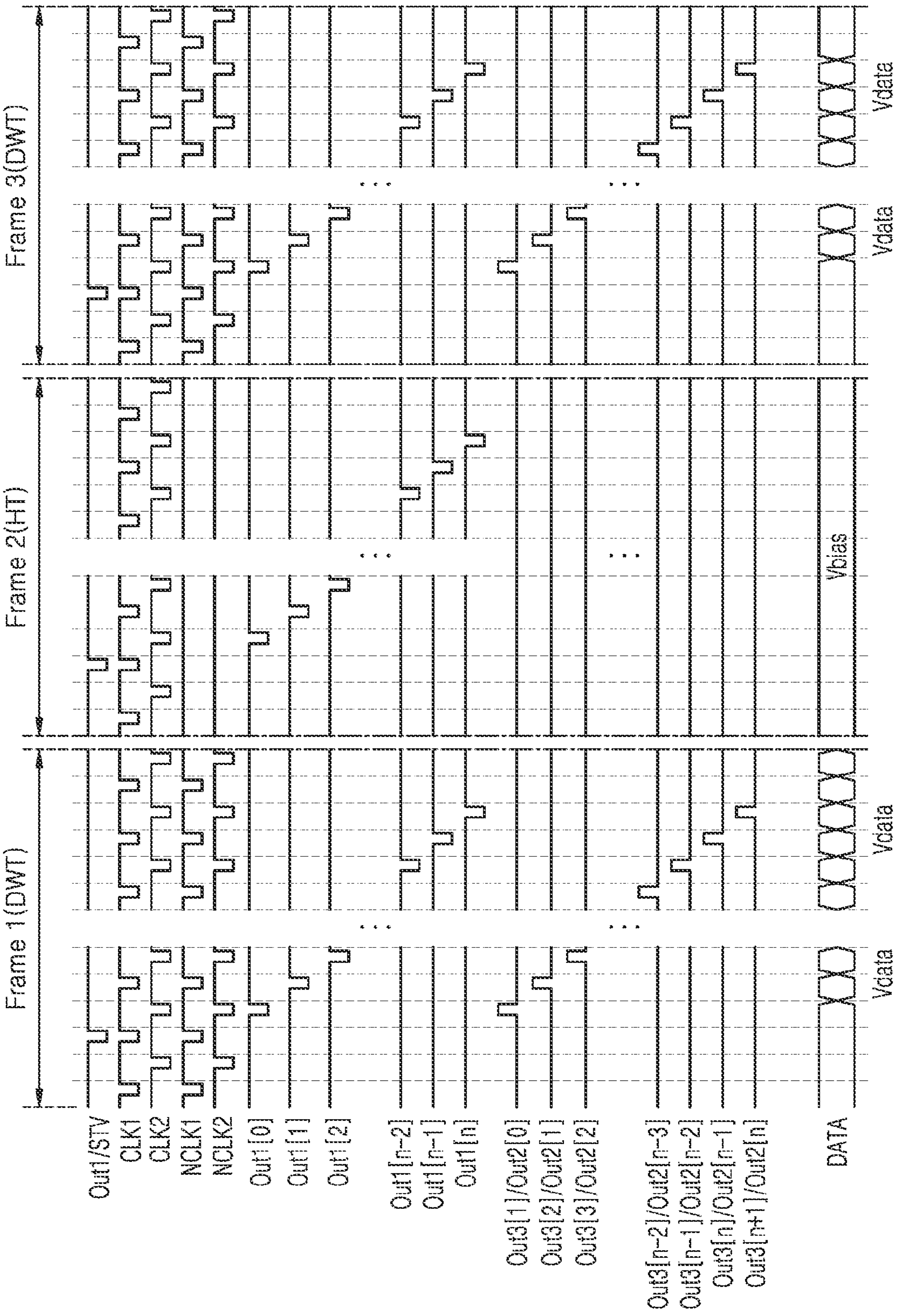
FIG. 28 is an operation timing diagram of the scan driver in FIG. 25.

In FIG. 24, a moving image and a still image are displayed in one frame image. However, embodiments are not limited thereto. For example, as shown in FIG. 28 to be described later, the same is applicable to a case in which a moving image or a still image is displayed in one frame image.

A scan driver according to an embodiment may be driven at low power through selective driving of either performing or not performing a shift register operation (e.g., an operation of sequentially outputting a phase-shifted output signal) on some output signals according to a type of a displayed image. For example, in a driving including the data writing time DWT in which a moving image is displayed and the hold time HT in which a still image is displayed, in the data writing time DWT, corresponding stages may perform a shift register operation, and in the hold time HT, may not perform a shift register operation, with respect to the second output signal and third output signal which are irrelevant to data writing. Accordingly, the scan driver may sequentially output the second output signal and third output signal of an on-voltage in the data writing time DWT, while, in the hold time HT, continuously outputting the second output signal and third output signal of an off-voltage instead of outputting the second output signal and third output signal of an on-voltage.

Figure 25:
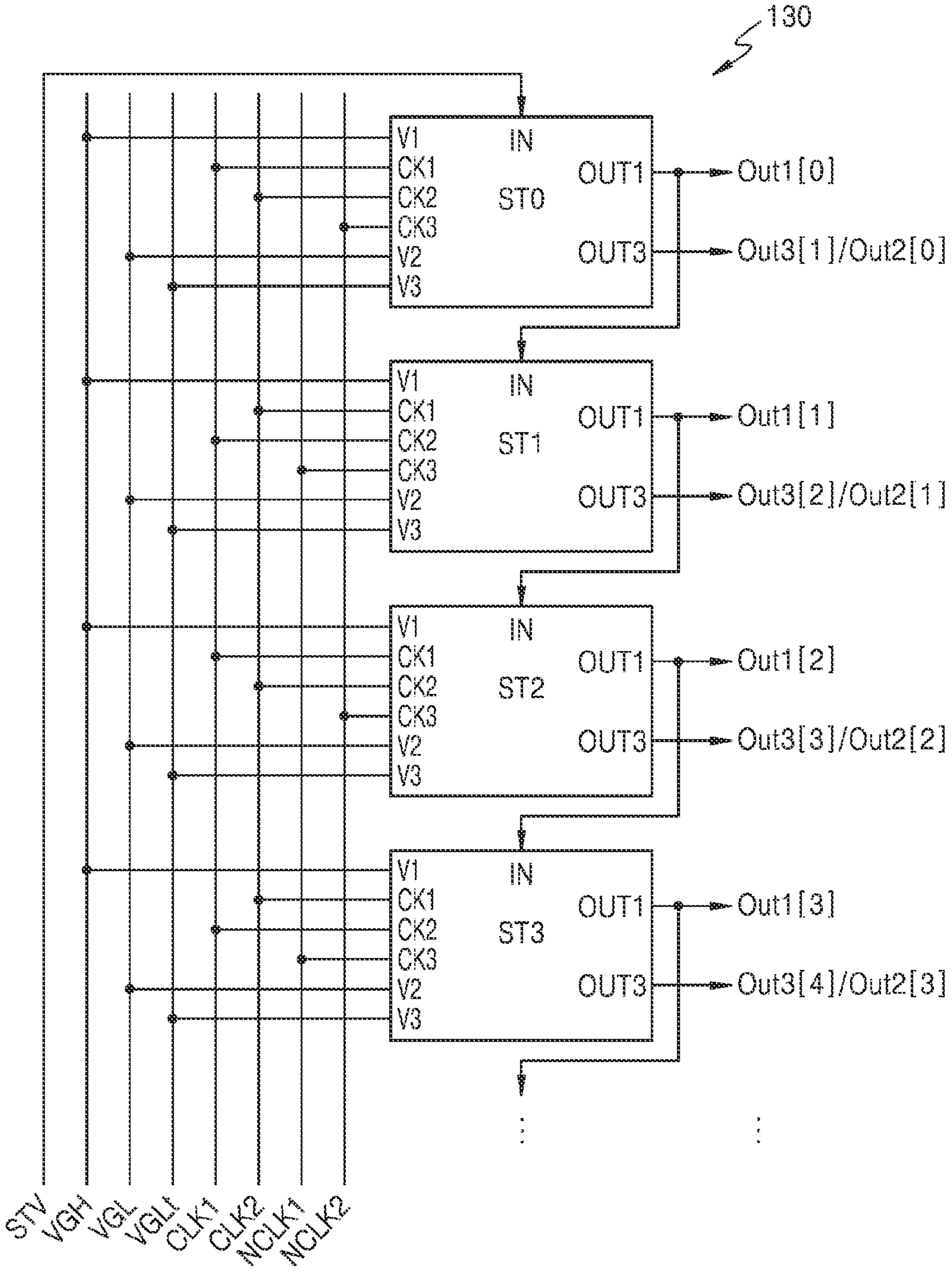
FIG. 25 is a diagram schematically illustrating a scan driver according to an embodiment.
Figure 26:
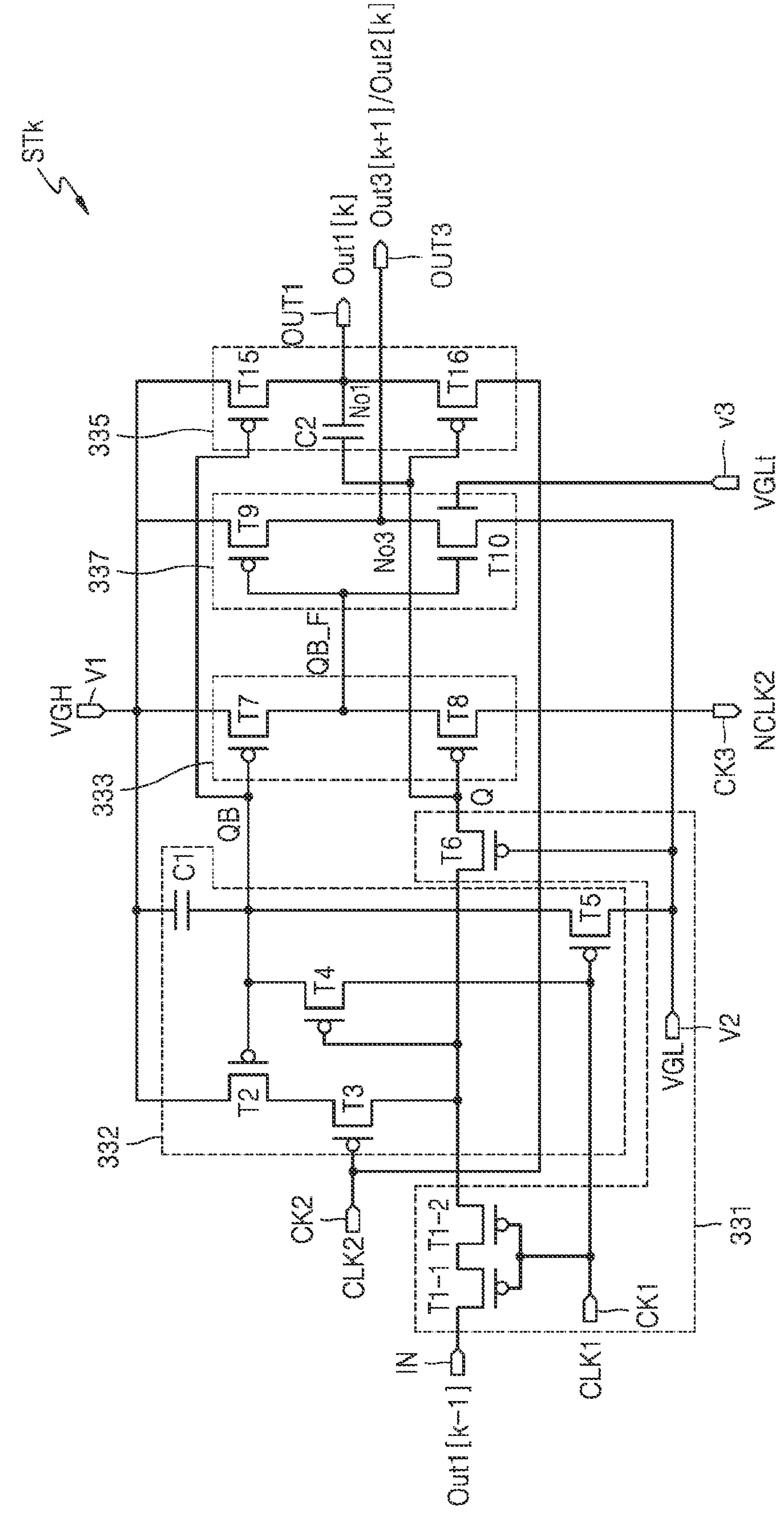
FIG. 26 is a circuit diagram illustrating an example of a stage included in the scan driver in FIG. 25.
Figure 27:
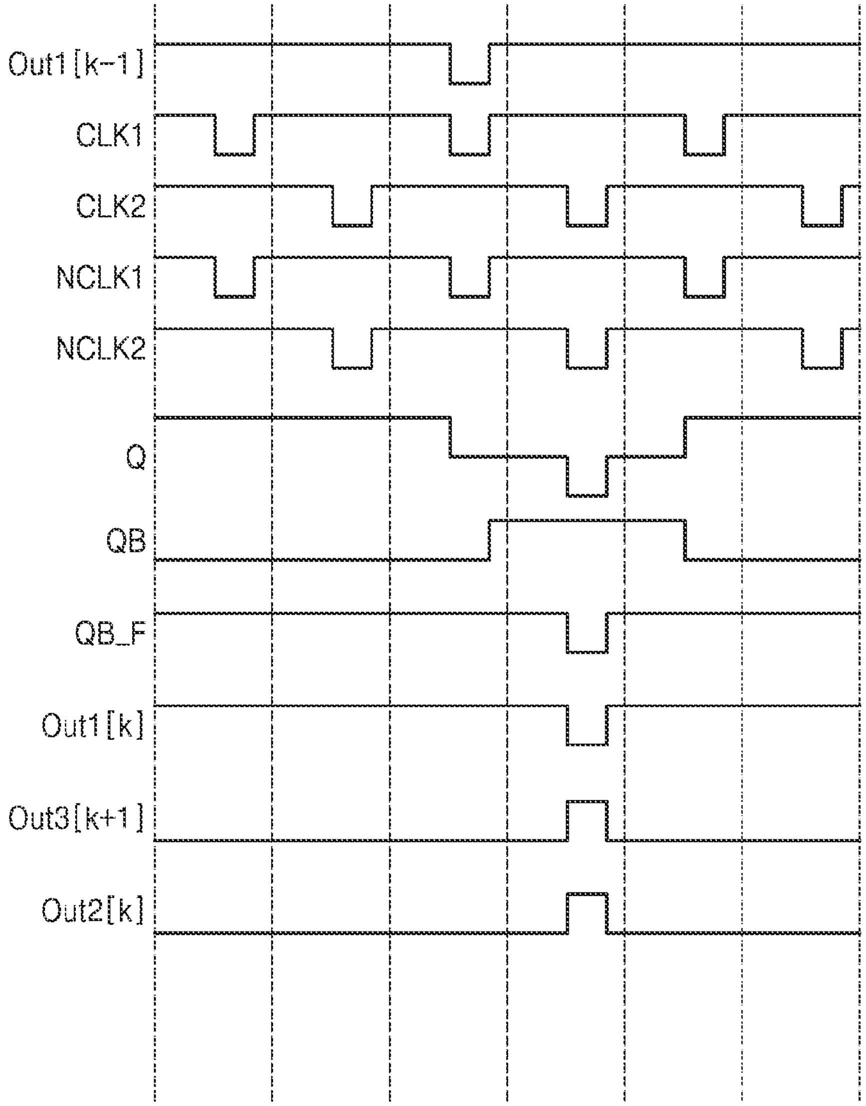
FIG. 27 is a waveform diagram illustrating an example of an operation of the stage in FIG. 26.

FIG. 25 is a diagram schematically illustrating a scan driver 130 according to an embodiment. FIG. 26 is a circuit diagram illustrating an example of a stage included in the scan driver 130 in FIG. 25. FIG. 27 is a waveform diagram illustrating an example of an operation of the stage STK in FIG. 26. FIG. 28 is an operation timing diagram of the scan driver 130 in FIG. 25.

The scan driver 130 shown in FIG. 25 differs from the scan driver shown in FIG. 20 in that a seventh clock signal NCLK1 or eighth clock signal NCLK2 may be applied to the third clock terminal CK3 of each of the stages ST0, ST1, ST2, ST3, etc., an output signal output from the third output terminal OUT3 may be shared with the third output signal Out3 and the second output signal Out2, and the fourth clock terminal CK4 and the second output terminal OUT2 are omitted.

In another embodiment, an output signal output from the third output terminal OUT3 may include the third output signal Out3[k+1] or the second output signal Out2[k]. For example, a first scan driver and a second scan driver may be individually provided, where the first scan driver outputs the second output signal Out2, and the second scan driver outputs the third output signal Out3.

The seventh clock signal NCLK1 or eighth clock signal NCLK2 may be alternately applied to the stages ST0, ST1, ST2, ST3, etc. For example, the eighth clock signal NCLK2 may be applied to the third clock terminal CK3 of an odd-numbered stage, and the seventh clock signal NCLK1 may be applied to the third clock terminal CK3 of an even-numbered stage. The seventh clock signal NCLK1 and the eighth clock signal NCLK2 may include square wave signals, in which the first voltage VGH that is a high voltage and the second voltage VGL that is a low voltage are repeated. A period of the seventh clock signal NCLK1 and eighth clock signal NCLK2 may be 2H including one high voltage and one low voltage. The seventh clock signal NCLK1 and the eighth clock signal NCLK2 may include signals having the same waveform as each other and being phase-shifted. The seventh clock signal NCLK1 and the first clock signal CLK1 have the same phase as each other, and the eighth clock signal NCLK2 and the second clock signal CLK2 may have the same phase as each other.

As shown in FIG. 26, in each of the stages ST0, ST1, ST2, ST3, etc., the fourth node controller 334 and the second output controller 336 are omitted in the stage shown in FIG. 21, where the fourth node controller 334 includes the eleventh transistor T11 and the twelfth transistor T12, and the second output controller 336 includes the thirteenth transistor T13 and the fourteenth transistor T14, and an output signal output from the third output terminal OUT3 may be shared with the third output signal Out3 and the second output signal Out2. In FIG. 26, the stage STK is shown as an example of an odd-numbered stage. Hereinafter, differences from FIGS. 20 to 22 are mainly described.

When the first control node Q is a low level, the sixteenth transistor T16 of the first output controller 335 may be turned on so that a high voltage or low voltage of the second clock signal CLK2 may be output as the first output signal Out1 [k] from the first output terminal OUT1. When the second control node QB is a low level, the fifteenth transistor T15 of the first output controller 335 may be turned on so that the first voltage VGH applied to the first voltage input terminal V1 may be output as the first output signal Out1 [k] from the first output terminal OUT1. When the second control node QB is a low level, the seventh transistor T7 of the third node controller 333 may be turned on and transfer a high voltage of the first voltage VGH to the third control node QB_F. When the first control node Q is a low level, the eighth transistor T8 may be turned on and transfer a high voltage or low voltage of the eighth clock signal NCLK2 to the third control node QB_F.

When the third control node QB_F is a high level, the tenth transistor T10 of the third output controller 337 may be turned on and the second voltage VGL applied to the second voltage input terminal V2 may be output from the third output terminal OUT3 as the second output signal Out2[k] and/or the third output signal Out3[k+1]. When the third control node QB_F is a low level, the ninth transistor T9 of the third output controller 337 may be turned on and the first voltage VGH applied to the first voltage input terminal V1 may be output from the third output terminal OUT3 as the second output signal Out2[k] and/or the third output signal Out3[k+1].

An odd-numbered stage of the scan driver 130 shown in FIG. 25 may output the first output signal Out1 of a low voltage, the second output signal Out2 of a high voltage, and the third output signal Out3 of a high voltage, in synchronization with a low voltage timing of the second clock signal CLK2 and eighth clock signal NCLK2. An even-numbered stage may output the first output signal Out1 of a low voltage, the second output signal Out2 of a high voltage, and the third output signal Out3 of a high voltage, in synchronization with a low voltage timing of the first clock signal CLK1 and seventh clock signal NCLK1.

In the display apparatus 10 according to an embodiment, selective driving of the stages ST0, ST1, ST2, ST3, etc. may be performed in units of frames.

Referring to FIG. 28, in pixels included in the pixel unit 110, an image may be displayed by writing the data signal DATA in a first frame Frame1, an image may be displayed while the data signal DATA written in the first frame Frame1 is maintained, in a subsequent second frame Frame2, and an image may be displayed by writing the data signal, in a subsequent third frame Frame3. In the first frame Frame1 and third frame Frame3, the data voltage Vdata of each of the pixels is applied to data lines of the pixel unit 110, and in the second frame Frame2, the bias voltage Vbias may be applied to the data lines of the pixel unit 110. The bias voltage Vbias may include a voltage at which a pixel displays an image corresponding to a previous data signal.

In the first frame Frame1 and third frame Frame3, the stages ST0, ST1, ST2, ST3, etc. of the scan driver may sequentially output the first output signals Out1[0], Out1[1], Out1[2], Out1[3], etc. of a low voltage, sequentially output the second output signals Out2[0], Out2[1], Out2[2], Out2[3], etc. of a high voltage, and sequentially output the third output signals Out3[1], Out3[2], Out3[3], Out3[4], etc. of a high voltage. Accordingly, the data voltage Vdata corresponding to a data signal may be applied to each of pixels of the pixel unit 110, and thus, an image corresponding to data signals may be displayed.

In the second frame Frame2, the stages ST0, ST1, ST2, ST3, etc. of the scan driver may sequentially output the first output signals Out1[0], Out1[1], Out1[2], Out1[3], etc. of a low voltage. In addition, the stages ST0, ST1, ST2, ST3, etc. of the scan driver may continuously output the second output signals Out2[0], Out2[1], Out2[2], Out2[3], etc. and third output signals Out3[1], Out3[2], Out3[3], Out3[4], etc. of a low voltage. In the second frame Frame2 in which the scan driver is operated for the hold time HT, the seventh clock signal NCLK1 or eighth clock signal NCLK2 that affect the second output signal Out2 and the third output signal Out3 may be applied as a high voltage.

In FIG. 28, the hold time HT is allocated during one frame between the first frame Frame1 and the third frame Frame3. However, in another embodiment, the hold time HT may be allocated during two or more frames between the first frame Frame1 and the third frame Frame3. In the embodiment shown in FIG. 28, one frame image displays a moving image or a still image. However, embodiments are not limited thereto. For example, as shown in FIG. 24, the same is applicable to a case in which one frame image displays a moving image and a still image.

Figure 29:
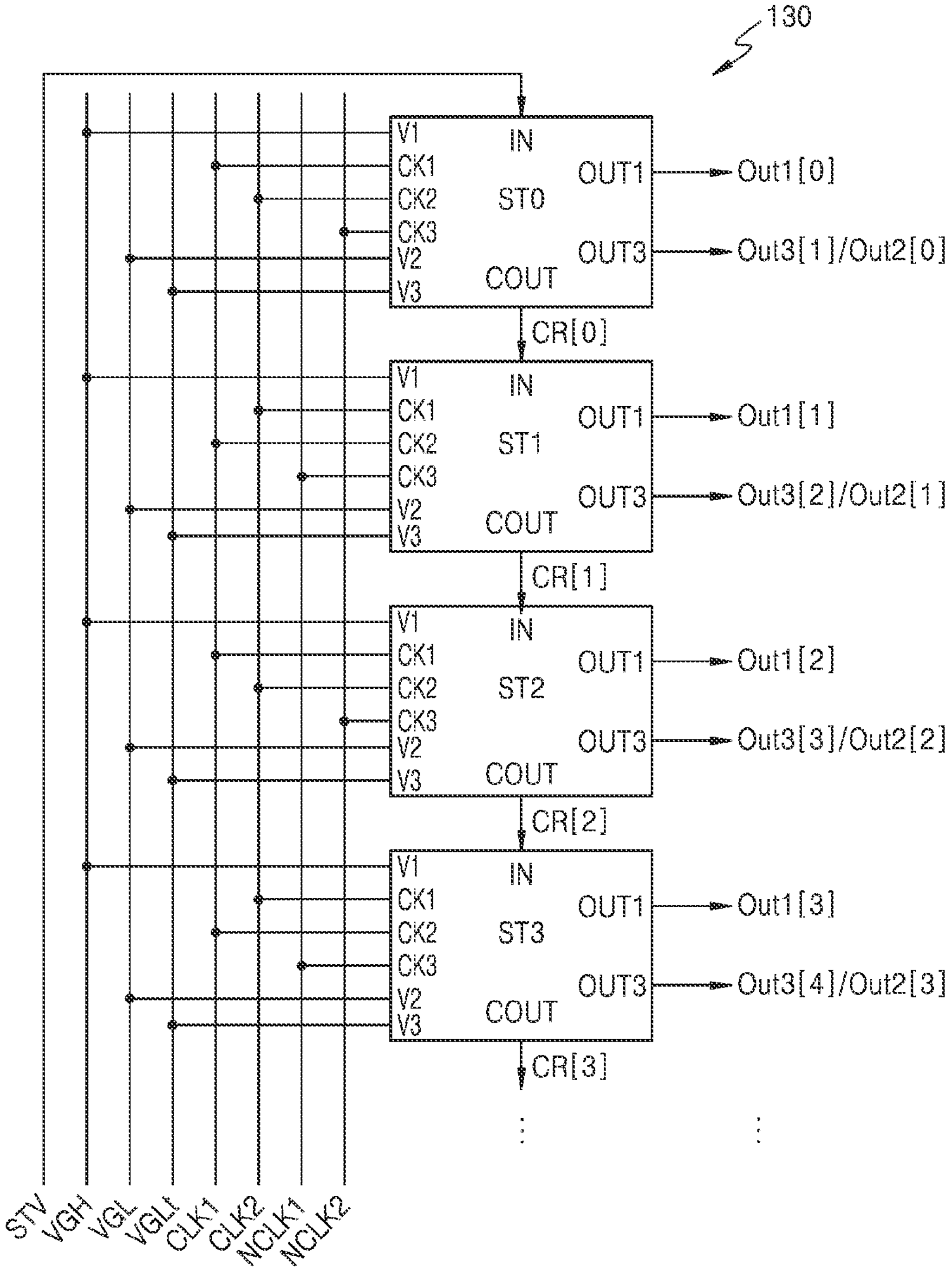
FIG. 29 is a diagram schematically illustrating a scan driver according to an embodiment.
Figure 30:
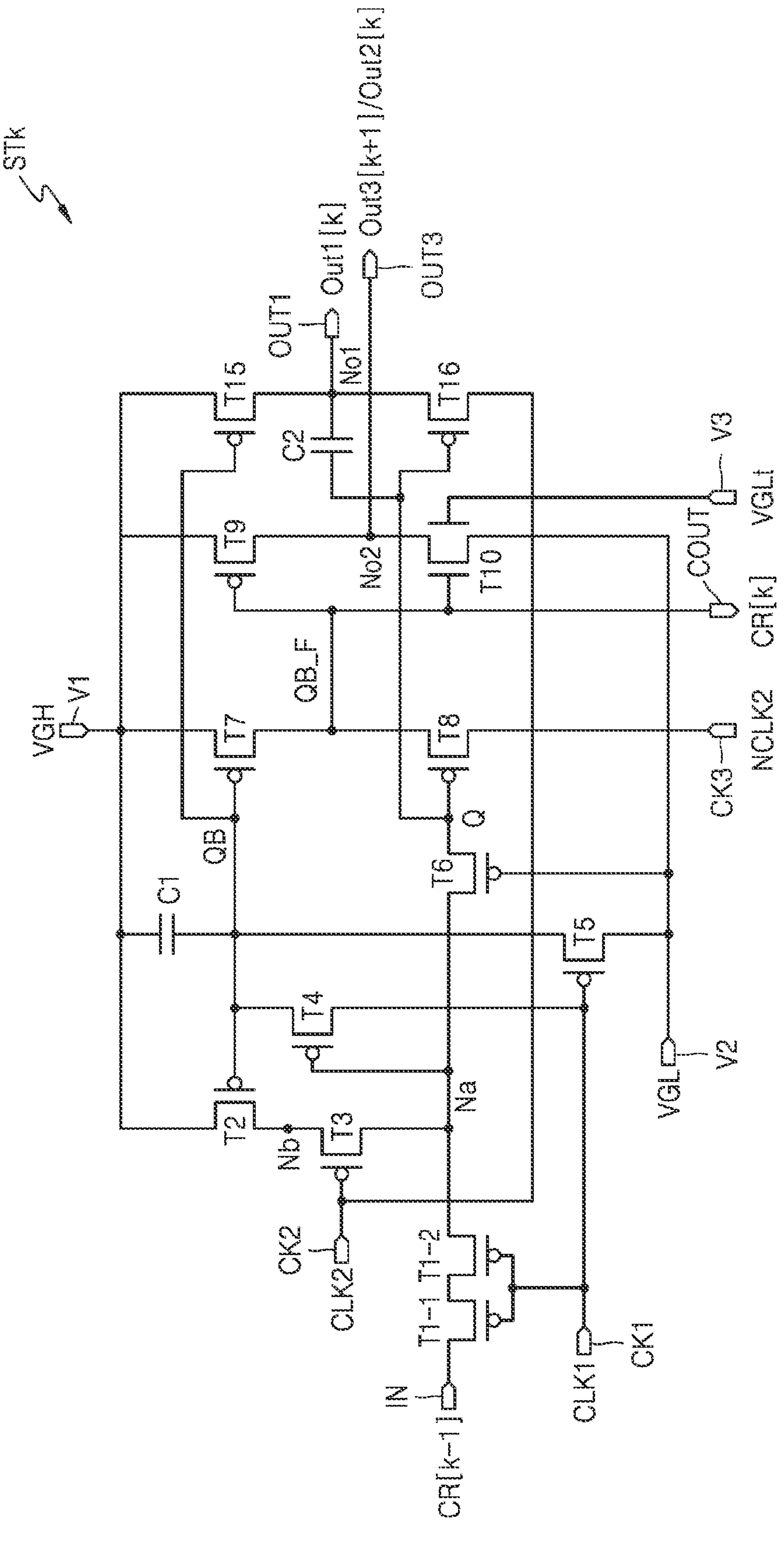
FIG. 30 is a circuit diagram illustrating an example of a stage included in the scan driver in FIG. 29.

FIG. 29 is a diagram schematically illustrating a scan driver 130 according to an embodiment. FIG. 30 is a circuit diagram illustrating an example of a stage included in the scan driver 130 in FIG. 29.

The scan driver shown in FIG. 29 differs from the scan driver shown in FIG. 25 in that each of the stages includes the carry output terminal COUT that outputs a carry signal separate from the first output signal Out1 [k] to the input terminal IN of a next stage.

In the stage STK shown in FIG. 30, the carry output terminal COUT may be connected to the third control node QB_F, the carry signal CR[k] having a voltage level of the third control node QB_F may be output from the carry output terminal COUT. Other configurations and operations of the stage shown in FIG. 30 are the same as those of the stage shown in FIG. 26.

Figure 31:
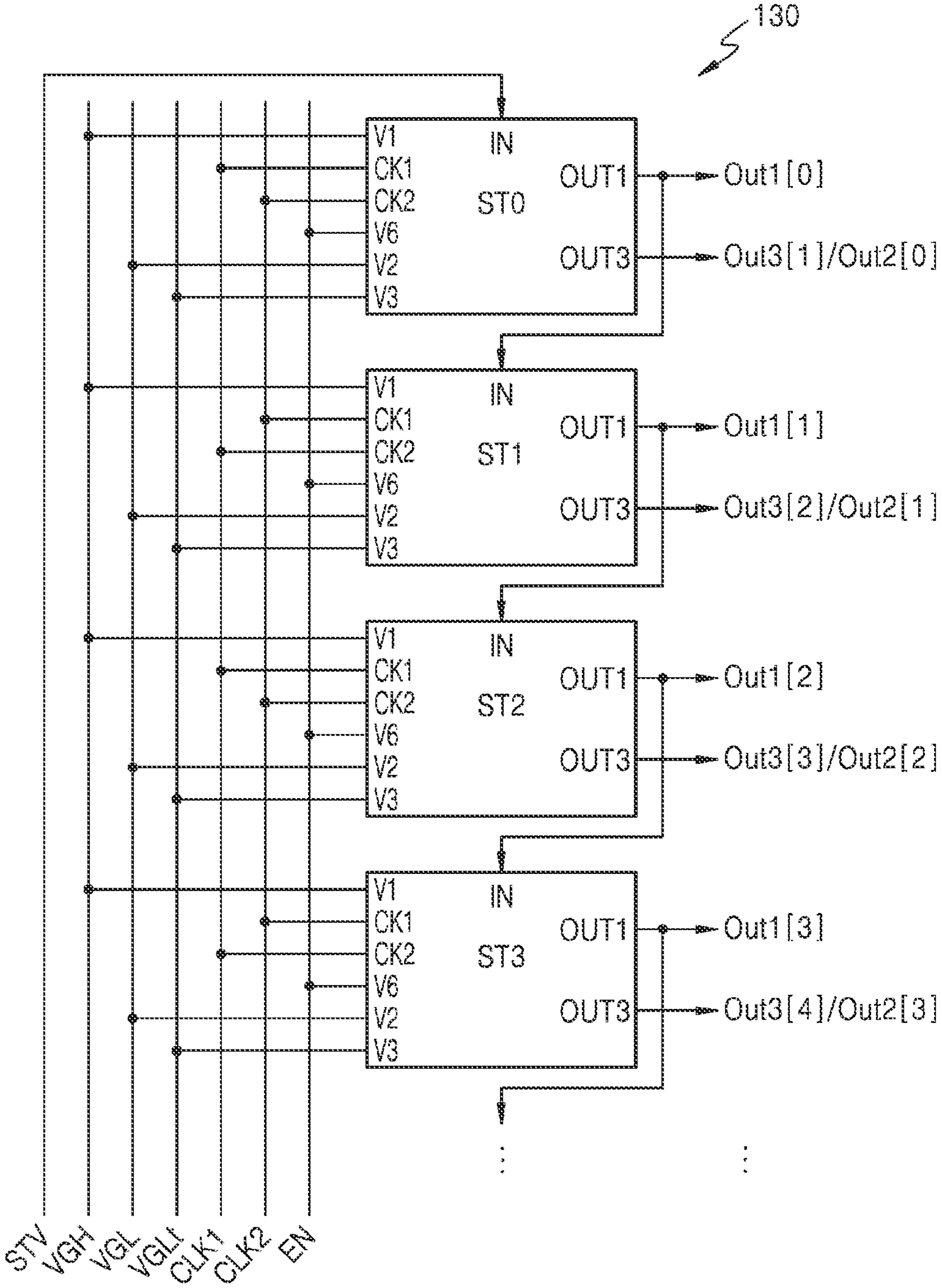
FIG. 31 is a diagram schematically illustrating a scan driver according to an embodiment.
Figure 32:
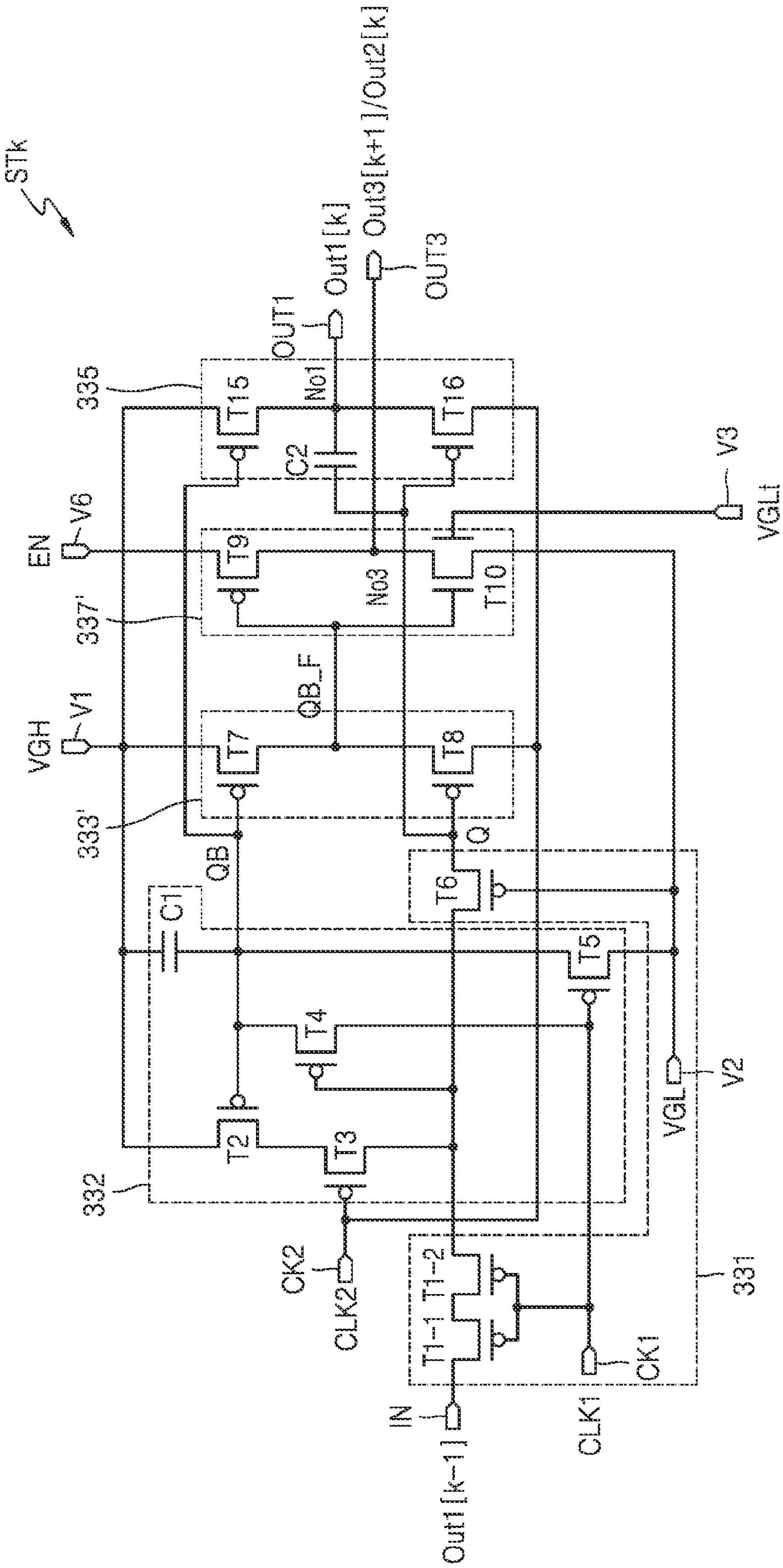
FIG. 32 is a circuit diagram illustrating an example of a stage included in the scan driver in FIG. 31.
Figure 33:
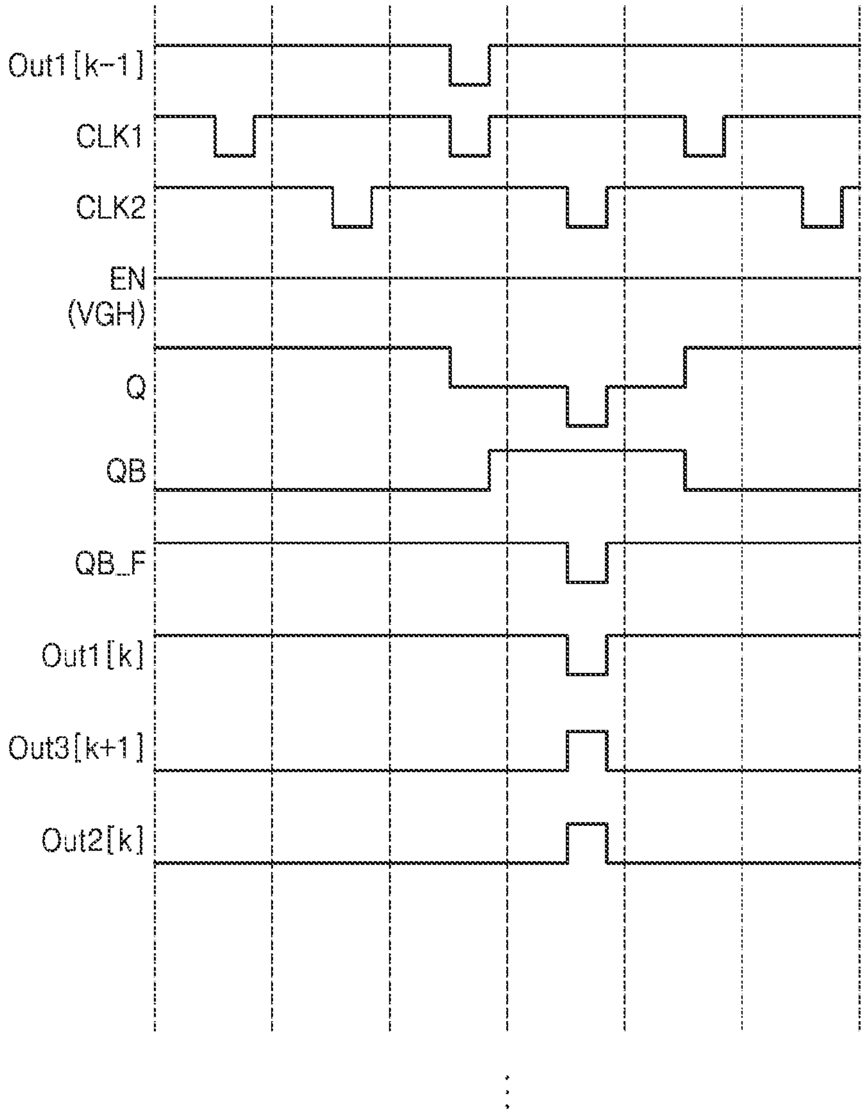
FIG. 33 is a waveform diagram illustrating an example of an operation of the stage in FIG. 31.
Figure 34:
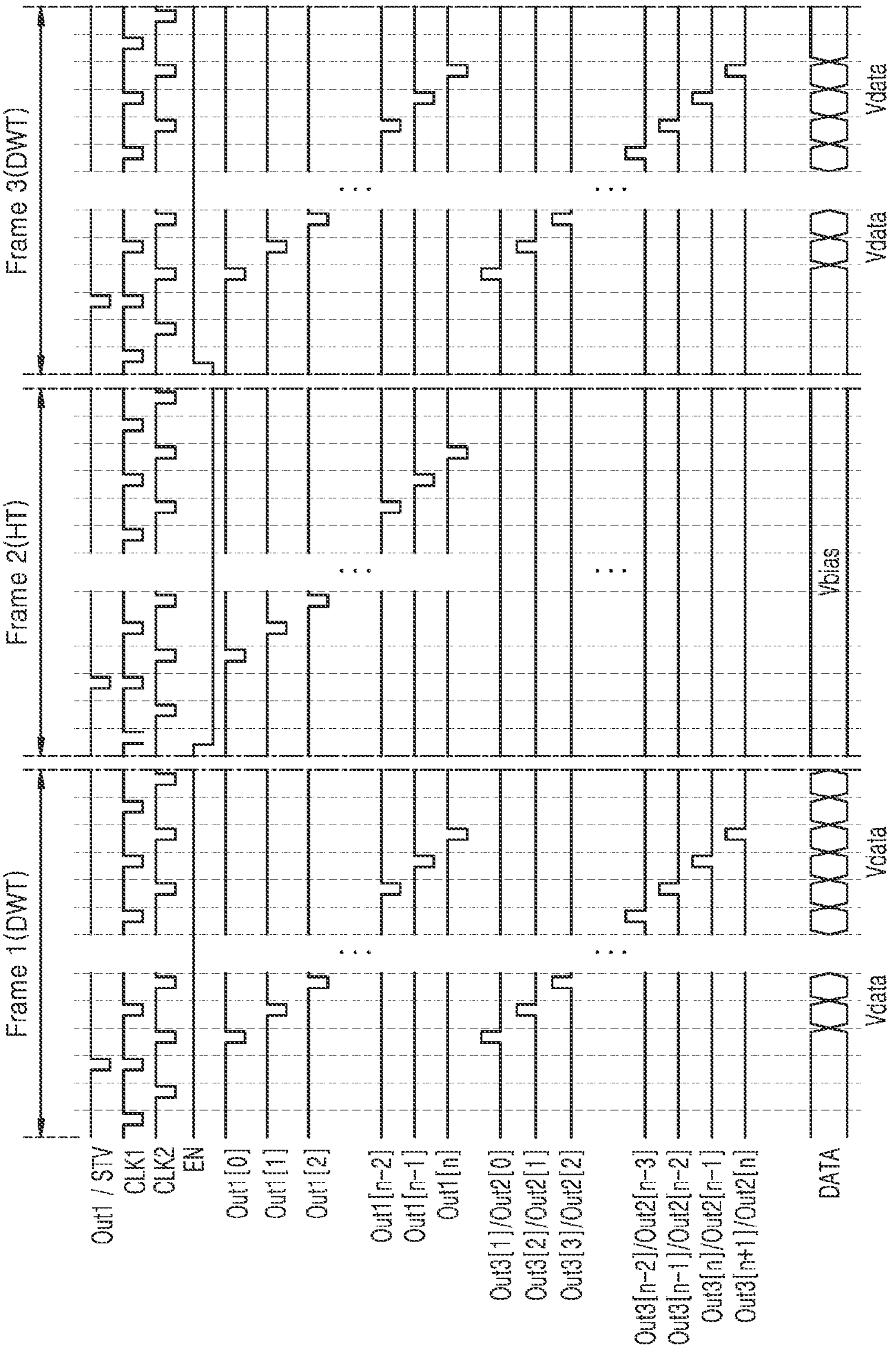
FIG. 34 is an operation timing diagram of the scan driver in FIG. 31.

FIG. 31 is a diagram schematically illustrating a scan driver 130 according to an embodiment. FIG. 32 is a circuit diagram illustrating an example of a stage included in the scan driver 130 in FIG. 31. FIG. 33 is a waveform diagram illustrating an example of an operation of the stage STK in FIG. 31. FIG. 34 is an operation timing diagram of the scan driver 130 in FIG. 31.

The scan driver shown in FIG. 31 differs from the scan driver shown in FIG. 25 in that, in each of the plurality of stages ST0, ST1, ST2, ST3, etc., a sixth voltage input terminal V6 to which a sixth voltage EN is applied is added, and the third clock terminal CK3 is removed.

The sixth voltage EN may include a constant voltage signal applied as the first voltage VGH or second voltage VGL according to an image displayed during a frame. For example, when a current frame is the data writing time DWT, the sixth voltage EN may be applied at a voltage level of the first voltage VGH, and when the current frame is a hold time HT, the sixth voltage EN may be applied at a voltage level of the second voltage VGL.

The stage STK shown in FIG. 32 may include the first node controller 331, the second node controller 332, a third node controller 333', the first output controller 335, and a third output controller 337'. Hereinafter, differences from FIGS. 26 to 28 are mainly described.

Referring to FIG. 32, the third node controller 333' may be connected between the first voltage input terminal V1 and the second clock terminal CK2. The third node controller 333' may control a voltage of the third control node QB_F according to voltages of the first control node Q and the second control node QB. When the second control node QB is a low level, the seventh transistor T7 of the third node controller 333' may be turned on and transfer a high voltage of the first voltage VGH to the third control node QB_F. When the first control node Q is a low level, the eighth transistor T8 may be turned on and transfer a high voltage or low voltage of the second clock signal CLK2 to the third control node QB_F.

The third output controller 337' may be connected between the sixth voltage input terminal V6 and the second voltage input terminal V2. The third output controller 337' may output the second output signal Out2[k] and third output signal Out3[k+1] of a high voltage or the second output signal Out2[k] and third output signal Out3[k+1] of a low voltage according to the voltage level of the third control node QB_F.

The ninth transistor T9 of the third output controller 337' may be connected between the sixth voltage input terminal V6 and the third output terminal OUT3 (the third output node No3). A gate of the ninth transistor T9 may be connected to the third control node QB_F. The tenth transistor T10 may be connected between the second voltage input terminal V2 and the third output terminal OUT3. The first gate of the tenth transistor T10 may be connected to the third control node QB_F, and the second gate of the tenth transistor T10 may be connected to the third voltage input terminal V3.

Referring to FIGS. 33 and 34, the sixth voltage EN may be applied at the first voltage VGH in the data writing time DWT. In this case, when the third control node QB_F is a low level, the ninth transistor T9 may be turned on and a high voltage of the sixth voltage EN applied to the sixth voltage input terminal V6 may be output from the third output terminal OUT3 as the second output signal Out2[k] and/or the third output signal Out3[k+1]. When the third control node QB_F is a high level, the tenth transistor T10 may be turned on and the second voltage VGL applied to the second voltage input terminal V2 may be output from the third output terminal OUT3 as the second output signal Out2[k] and/or the third output signal Out3[k+1]. In other words, in the data writing time DWT, the stages ST0, ST1, ST2, ST3, etc. may sequentially output the first output signals Out1 [0], Out1[1], Out1[2], Out1[3], etc. of a low voltage, sequentially output the second output signals Out2 [0], Out2[1], Out2[2], Out2[3], etc. of a high voltage, and sequentially output the third output signals Out3[1], Out3 [2], Out3[3], Out3[4], etc. of a high voltage.

In the hold time HT, the sixth voltage EN may be applied as the second voltage VGL. In this case, when the third control node QB_F is a low level, the ninth transistor T9 may be turned on and a low voltage of the sixth voltage EN applied to the sixth voltage input terminal V6 may be output from the third output terminal OUT3 as the second output signal Out2[k] and/or the third output signal Out3[k+1]. When the third control node QB_F is a high level, the tenth transistor T10 may be turned on and the second voltage VGL applied to the second voltage input terminal V2 may be output from the third output terminal OUT3 as the second output signal Out2[k] and/or the third output signal Out3 [k+1]. In other words, in the hold time HT, the second output signal Out2[k] and the third output signal Out3[k+1] may be output as a low voltage. In other words, in the hold time HT, the stages ST0, ST1, ST2, ST3, etc. may sequentially output the first output signals Out1[0], Out1[1], Out1[2], Out1[3], etc. of a low voltage, and may continuously output the second output signals Out2[0], Out2[1], Out2[2], Out2[3], etc. and the third output signals Out3[1], Out3[2], Out3[3], Out3[4], etc., of a low voltage.

In FIG. 34, the hold time HT is allocated during one frame between the first frame Frame1 and the third frame Frame3. However, in another embodiment, the hold time HT may be allocated during two or more frames between the first frame Frame1 and the third frame Frame3.

Figure 35:
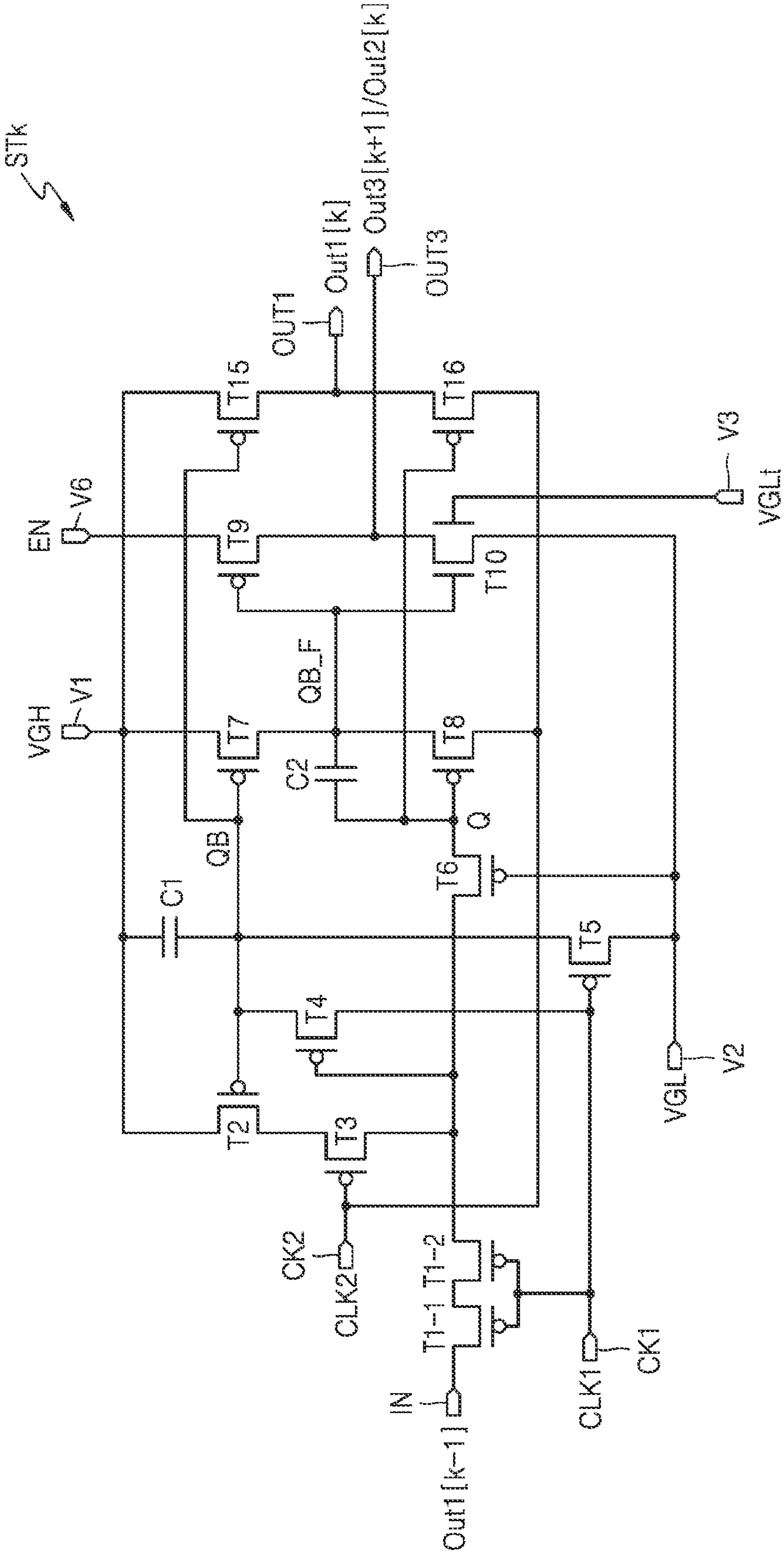
FIGS. 35 and 36 are diagrams illustrating various modifications of a circuit of a stage of a scan driver according to an embodiment.
Figure 36:
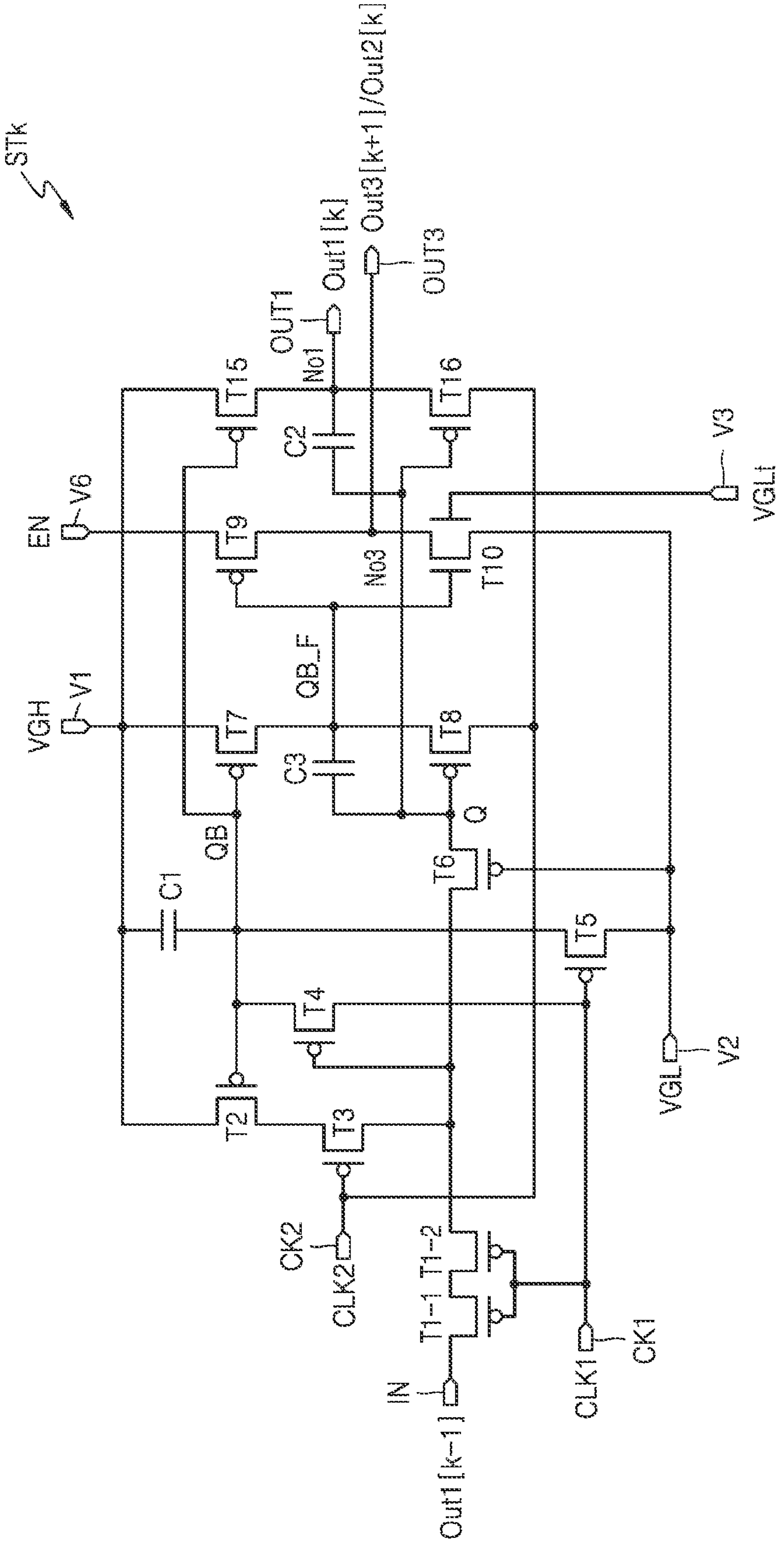

FIGS. 35 and 36 are diagrams illustrating various modifications of a circuit of a stage of a scan driver, according to an embodiment.

The stage shown in FIG. 35 differs from the stage shown in FIG. 32 in that the second capacitor C2 is connected between the first control node Q and the third control node QB_F. Other configurations and operations of the stage shown in FIG. 35 are the same as those of the stage shown in FIG. 32.

The stage shown in FIG. 36 differs from the stage shown in FIG. 32 in that the third capacitor C3 is added between the first control node Q and the third control node QB_F. Other configurations and operations of the stage shown in FIG. 36 are the same as those of the stage shown in FIG. 32.

Figure 37:
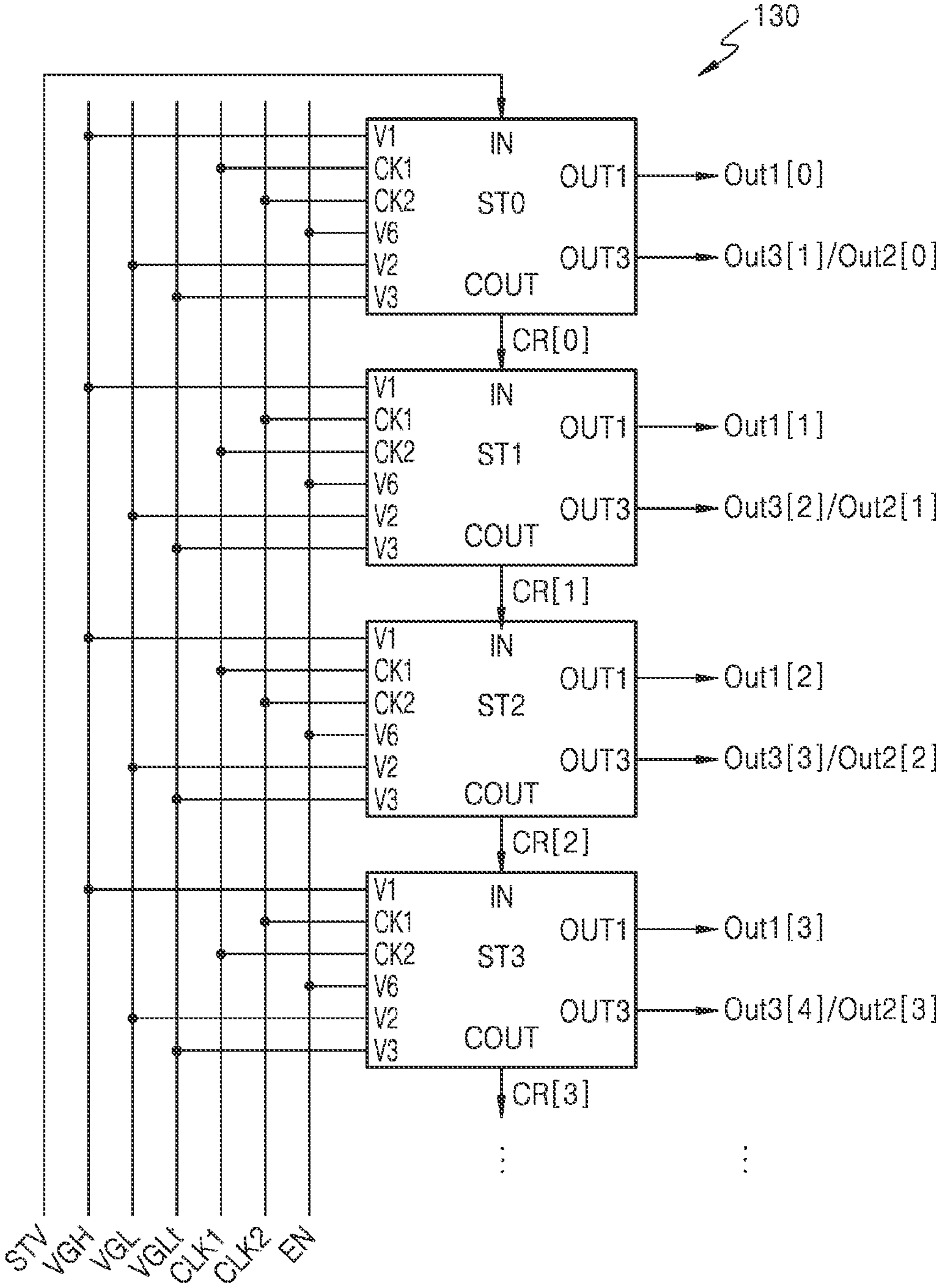
FIG. 37 is a diagram schematically illustrating a scan driver according to an embodiment.
Figure 38:
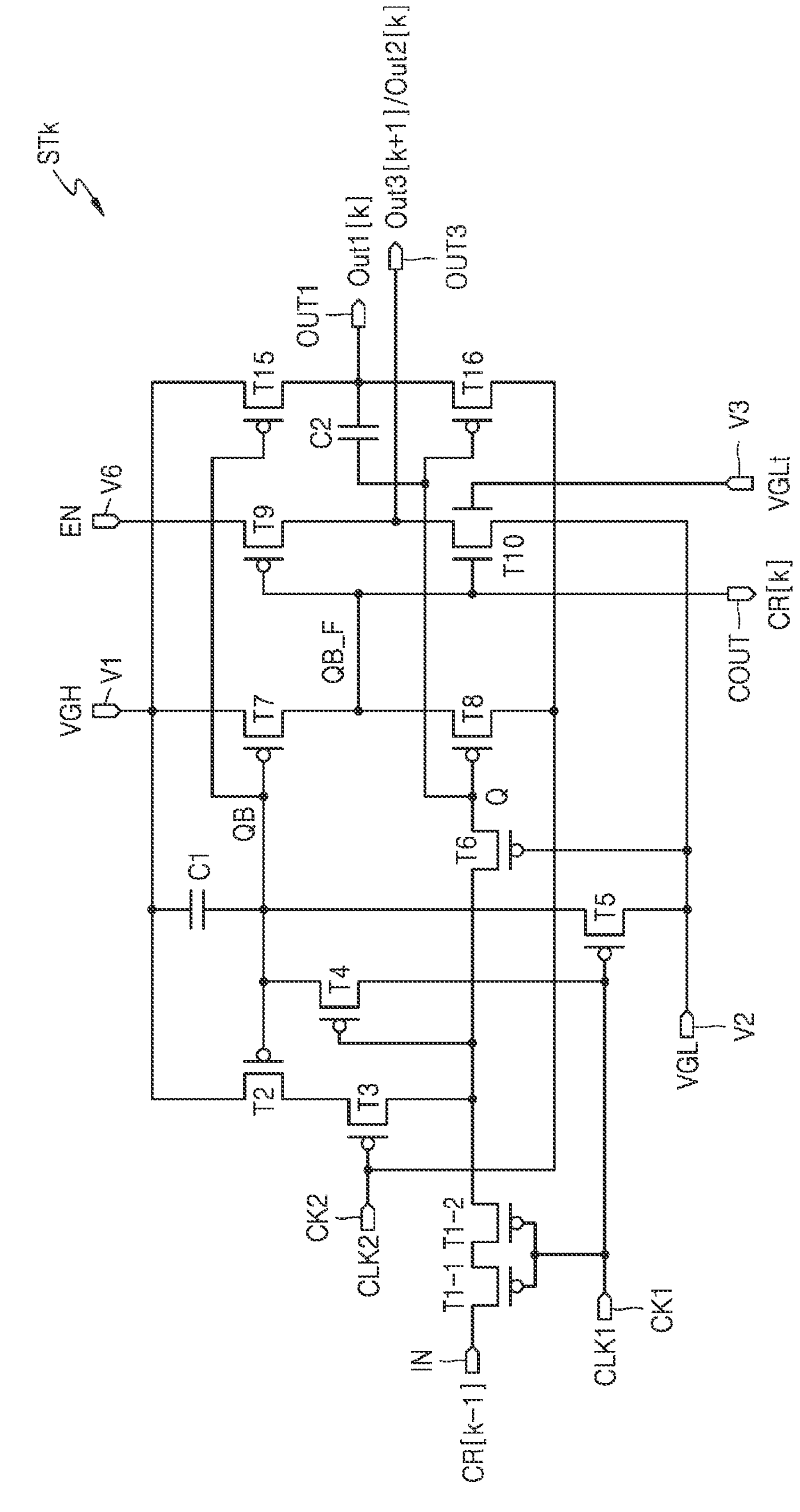
FIGS. 38 to 40 are circuit diagrams illustrating an example of a stage included in the scan driver in FIG. 37.
Figure 39:
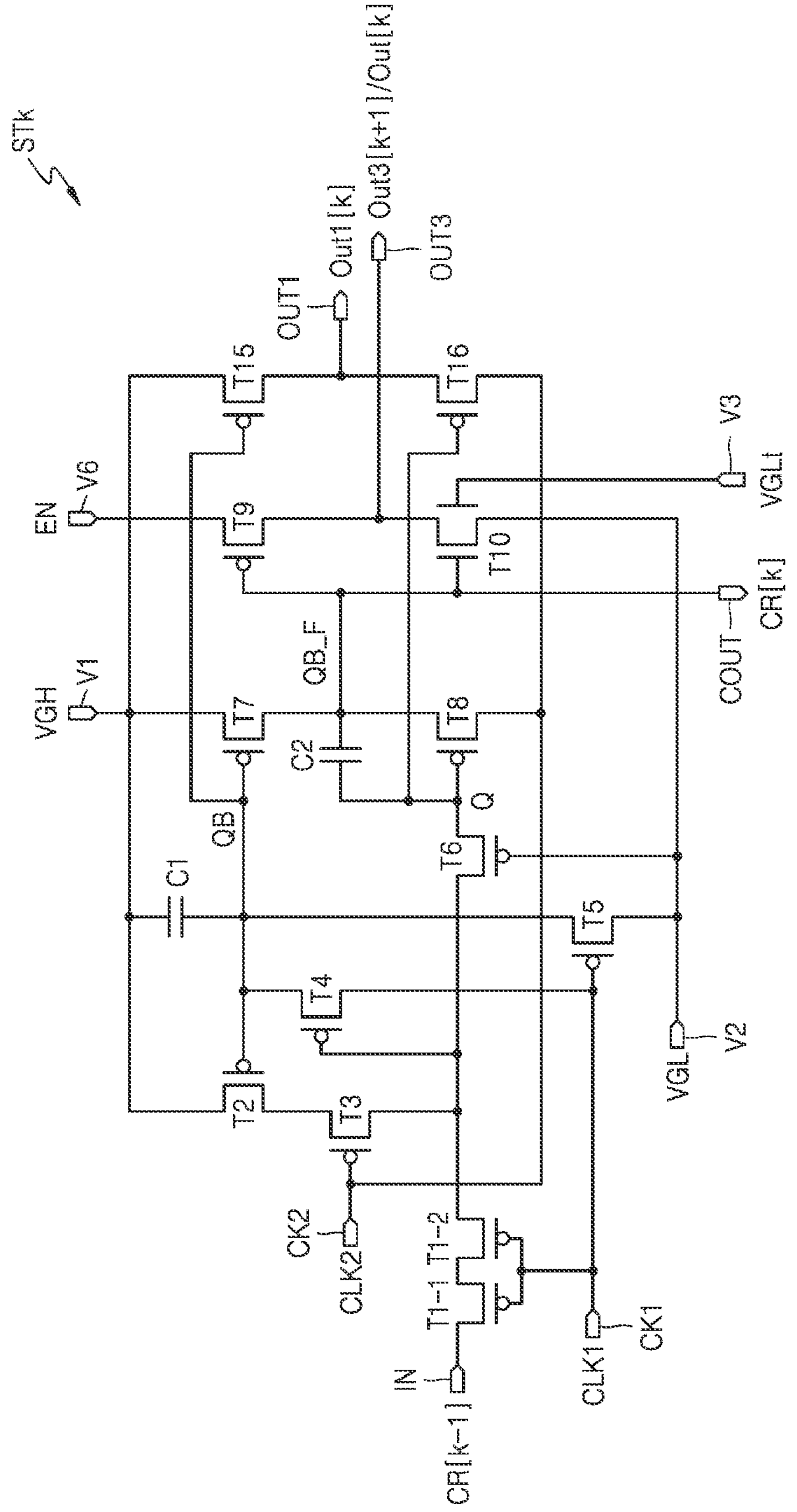
Figure 40:
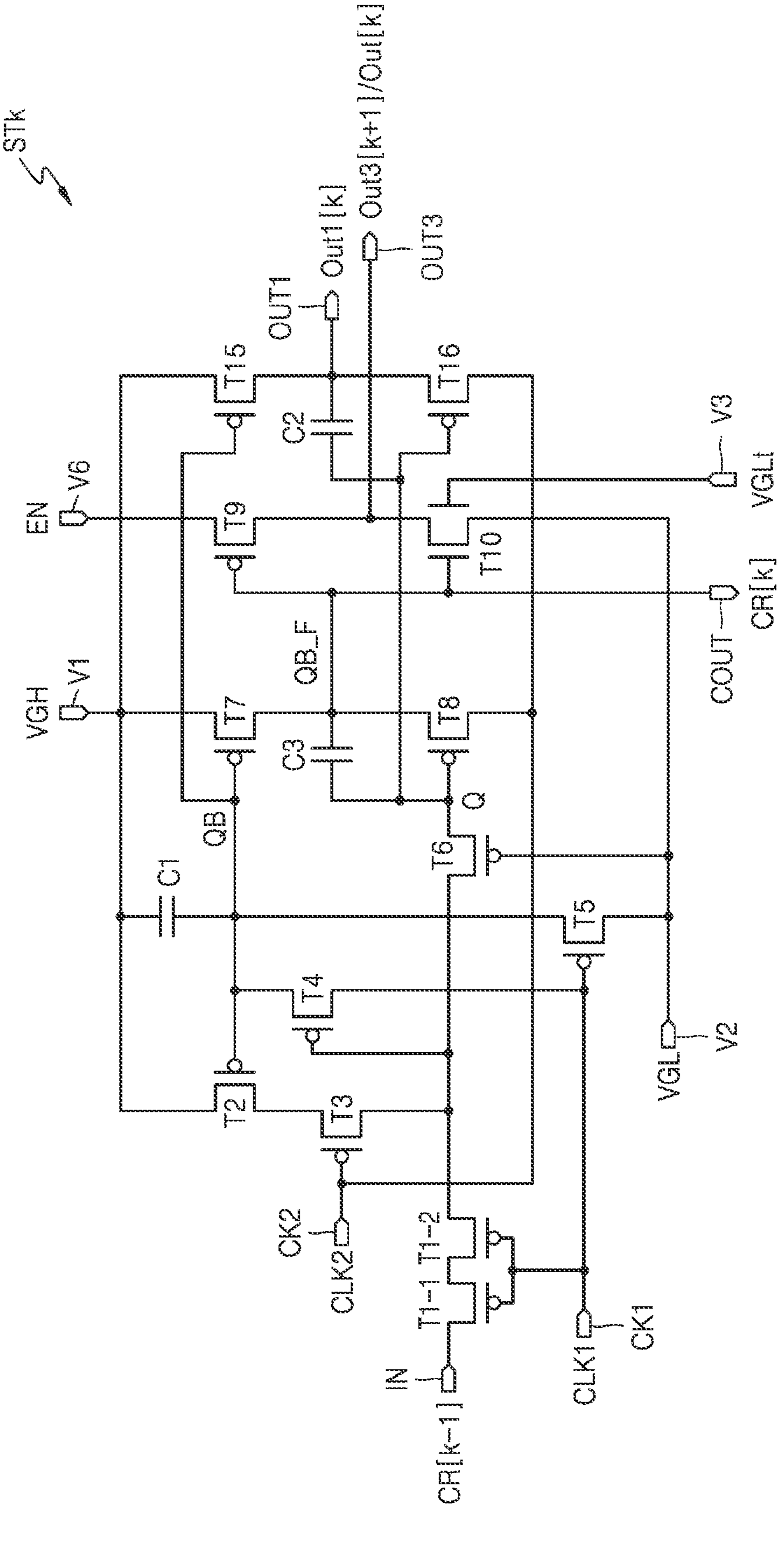

FIG. 37 is a diagram schematically illustrating a scan driver 130 according to an embodiment. FIGS. 38 to 40 are circuit diagrams illustrating an example of a stage included in the scan driver 130 in FIG. 37.

The scan driver 130 shown in FIG. 37 differs from the scan driver shown in FIG. 31 in that each of the stages includes the carry output terminal COUT that outputs a carry signal separate from the first output signal Out1 [k] to the input terminal IN of a next stage.

In the stage STk shown in FIG. 38, the carry output terminal COUT may be connected to the third control node QB_F, the carry signal CR[k] having a voltage level of the third control node QB_F may be output from the carry output terminal COUT, and the previous carry signal CR[k−1] output from the previous stage may be applied to the input terminal IN. Other circuit configurations and operations of the stage STK shown in FIG. 38 are the same as those of the stage shown in FIG. 32.

The stage STK shown in FIG. 39 differs from the stage shown in FIG. 38 in that the second capacitor C2 is connected between the first control node Q and the third control node QB_F. Other configurations and operations of the stage Stk shown in FIG. 39 are the same as those of the stage shown in FIG. 38.

The stage STK shown in FIG. 40 differs from the stage shown in FIG. 38 in that the third capacitor C3 is added between the first control node Q and the third control node QB_F. Other configurations and operations are the same.

Figure 41:
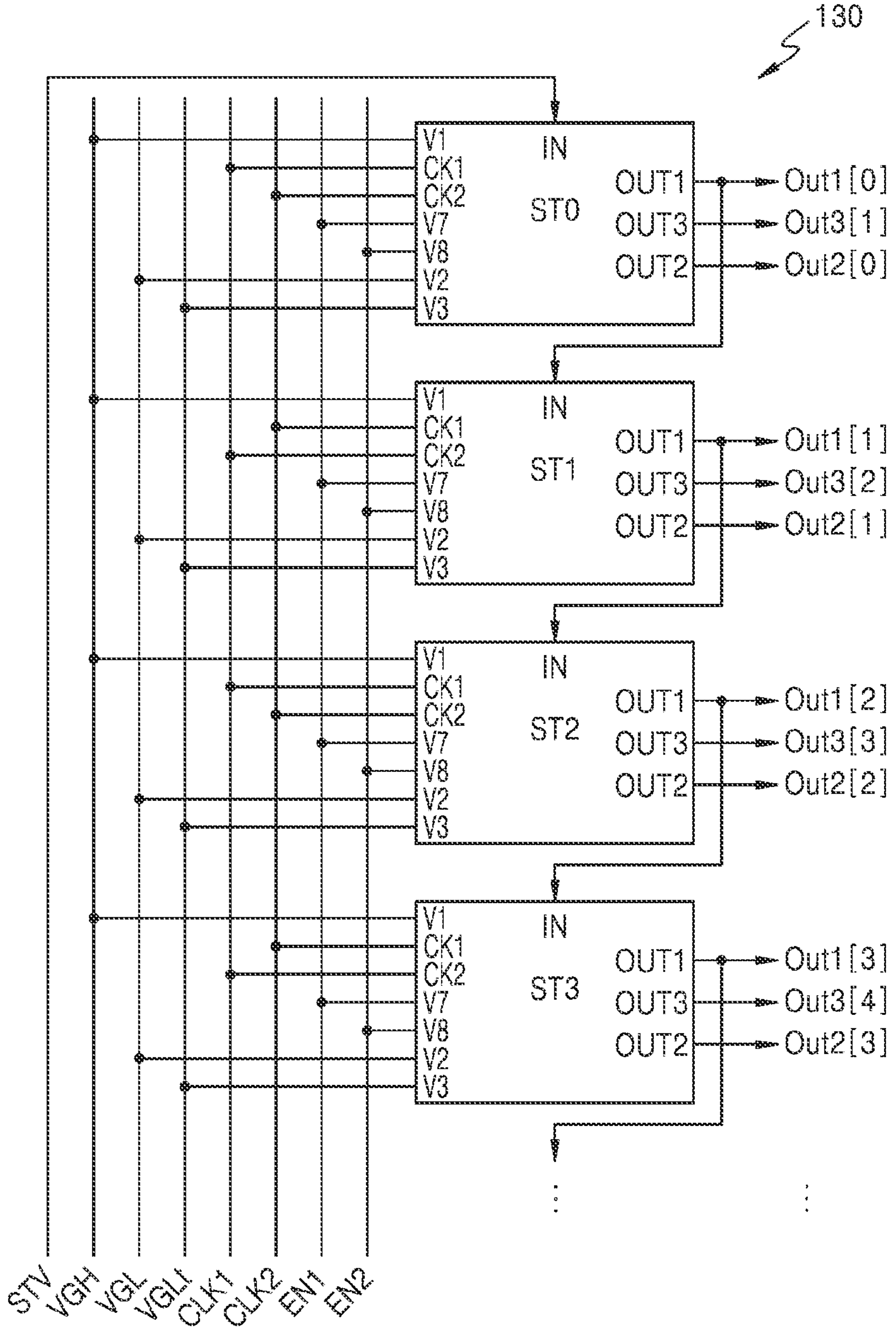
FIG. 41 is a diagram schematically illustrating a scan driver according to an embodiment.
Figure 42:
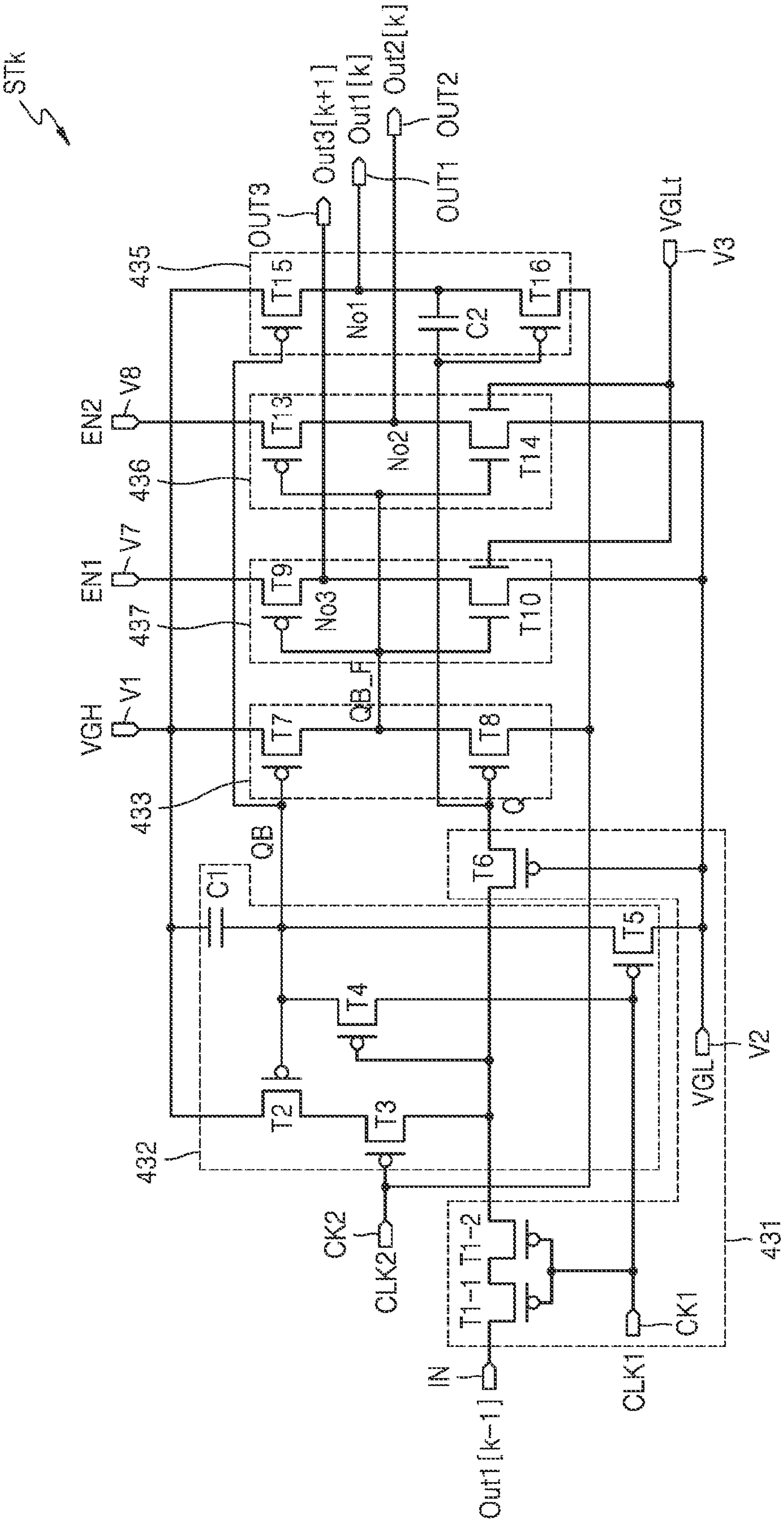
FIG. 42 is a circuit diagram illustrating an example of a stage included in the scan driver in FIG. 41.
Figure 43:
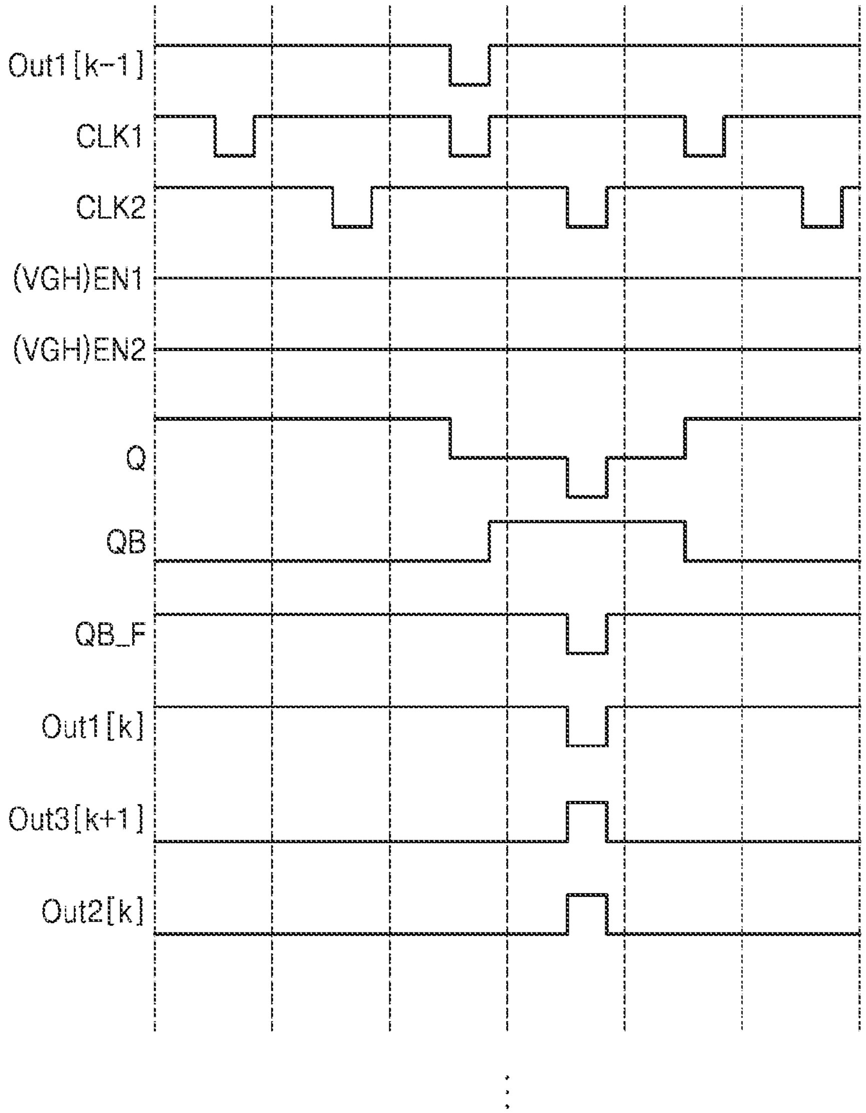
FIG. 43 is a waveform diagram illustrating an example of an operation of the stage in FIG. 42.
Figure 44:
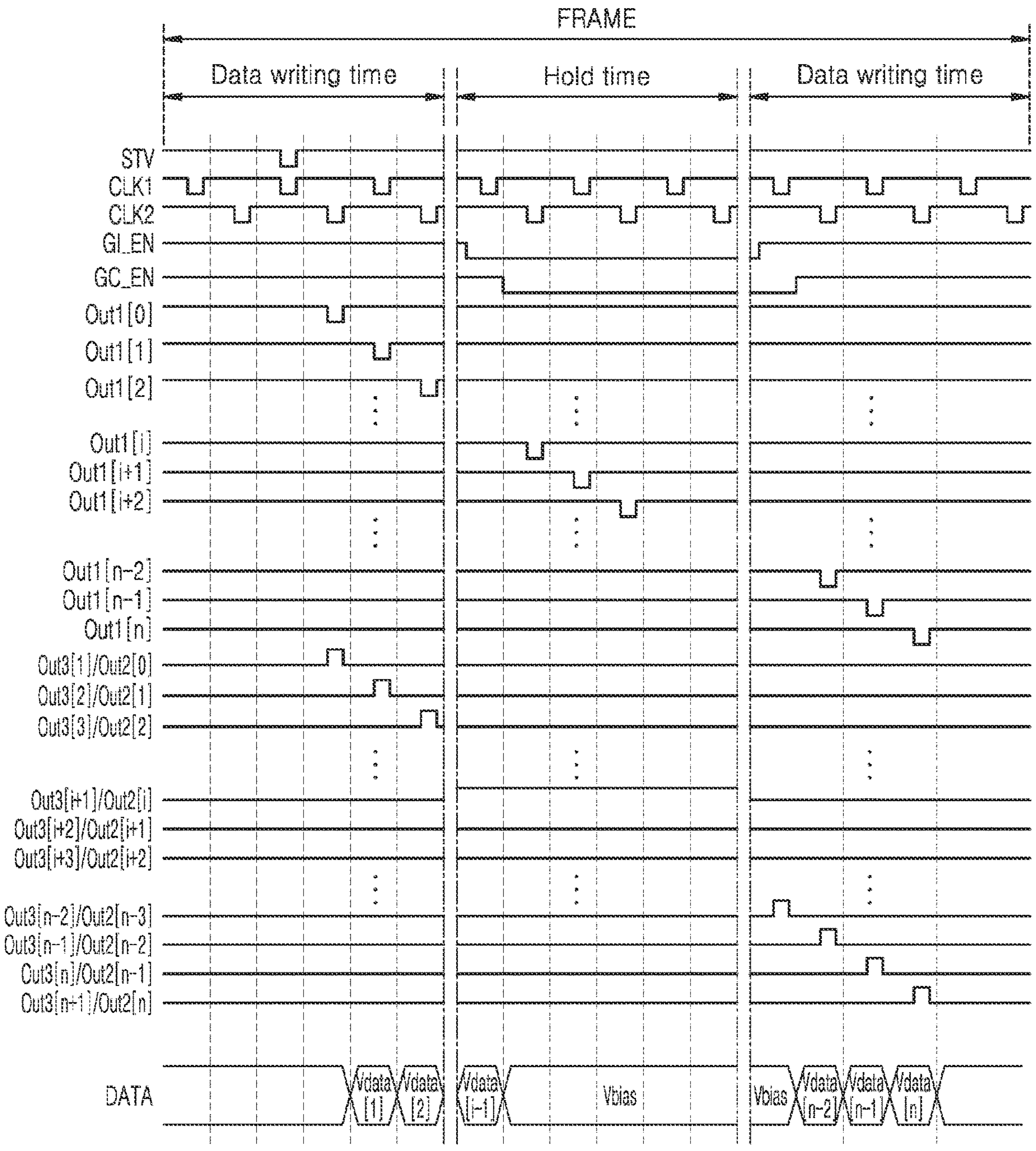
FIG. 44 is an operation timing diagram of the scan driver in FIG. 41.

FIG. 41 is a diagram schematically illustrating a scan driver 130 according to an embodiment. FIG. 42 is a circuit diagram illustrating an example of a stage included in the scan driver 130 in FIG. 41. FIG. 43 is a waveform diagram illustrating an example of an operation of the stage STK in FIG. 42. FIG. 44 is an operation timing diagram of the scan driver during one frame in FIG. 41.

The scan driver 130 shown in FIG. 41 differs from the scan driver shown in FIG. 31 in that each of the stages includes a seventh voltage input terminal V7 to which a seventh voltage EN1 is applied and an eighth voltage input terminal V8 to which an eighth voltage EN2 is applied, and the second output signal and the third output signal are separately output.

The seventh voltage EN1 and the eighth voltage EN2 may include a constant voltage signal which is applied as the first voltage VGH or second voltage VGL according to an image displayed during a frame. For example, when a current frame is the data writing time DWT, the seventh voltage EN1 and the eighth voltage EN2 may be applied at a voltage level of the first voltage VGH, and when the current frame is the hold time HT, the seventh voltage EN1 and the eighth voltage EN2 may be applied at a voltage level of the second voltage VGL. When the seventh voltage EN1 is a high voltage, the stages may perform a shift register operation and sequentially output the third output signals Out3 of a high voltage. When the eighth voltage EN is a high voltage, the stages may perform a shift register operation and sequentially output the second output signals Out2 of a high voltage.

The stage STK shown in FIG. 42 may include a first node controller 431, a second node controller 432, a third node controller 433, a first output controller 435, a second output controller 436, and a third output controller 437. Hereinafter, differences from FIGS. 32 to 34 are mainly described.

Configurations of the first node controller 431, the second node controller 432, and the third node controller 433 are the same as those of the first node controller 331, the second node controller 332, and the third node controller 333 shown in FIG. 32, respectively, and redundant descriptions thereof are omitted.

The first output controller 435 may be connected between the first voltage input terminal V1 and the second clock terminal CK2. The first output controller 435 may output the first voltage VGH or second clock signal CLK2 as the first output signal Out1 [k] from the first output terminal OUT1 connected to the first output node No1, according to the voltages of the first control node Q and second control node QB. The first output controller 435 may include the fifteenth transistor T15, the sixteenth transistor T16, and the second capacitor C2.

The fifteenth transistor T15 may be connected between the first voltage input terminal V1 and the first output terminal OUT1 (the first output node No1). A gate of the fifteenth transistor T15 may be connected to the second control node QB.

The sixteenth transistor T16 may be connected between the second clock terminal CK2 and the first output terminal OUT1. A gate of the sixteenth transistor T16 may be connected to the first control node Q.

The second capacitor C2 may be connected between the first control node Q and the first output terminal OUT1.

The second output controller 436 may be connected between the eighth voltage input terminal V8 and the second voltage input terminal V2. The second output controller 436 may output the eighth voltage EN2 of a high voltage or the second voltage VGL of a low voltage to the second output terminal OUT2 connected to the second output node No2, according to the voltage level of the third control node QB_F. The second output controller 436 may include the thirteenth transistor T13 and the fourteenth transistor T14.

The thirteenth transistor T13 may be connected between the eighth voltage input terminal V8 and the second output terminal OUT2 (the second output node No2). A gate of the thirteenth transistor T13 may be connected to the third control node QB_F.

The fourteenth transistor T14 may be connected between the second voltage input terminal V2 and the second output terminal OUT2. The fourteenth transistor T14 may include a first gate and a second gate. The first gate of the fourteenth transistor T14 may be connected to the third control node QB_F, and the second gate of the fourteenth transistor T14 may be connected to the third voltage input terminal V3.

The third output controller 437 may be connected between the seventh voltage input terminal V7 and the second voltage input terminal V2. The third output controller 437 may output the seventh voltage EN1 of a high voltage or the second voltage VGL of a low voltage as the third output signal Out3[k+1] to the third output terminal OUT3 connected to the third output node No3, according to the voltage of the third control node QB_F. The third output controller 437 may include the ninth transistor T9 and the tenth transistor T10.

The ninth transistor T9 may be connected between the seventh voltage input terminal V7 and the third output terminal OUT3. A gate of the ninth transistor T9 may be connected to the third control node QB_F.

The tenth transistor T10 may be connected between the second voltage input terminal V2 and the third output terminal OUT3. The tenth transistor T10 may include a first gate and a second gate. The first gate of the tenth transistor T10 may be connected to the third control node QB_F, and the second gate of the tenth transistor T10 may be connected to the third voltage input terminal V3.

Referring to FIGS. 43 and 44, in the data writing time DWT, the seventh voltage EN1 and the eighth voltage EN2 may be applied as the first voltage VGH. When the third control node QB_F is a high level, the tenth transistor T10 may be turned on so that the second voltage VGL applied to the second voltage input terminal V2 may be output as the third output signal Out3[k+1] from the third output terminal OUT3. When the third control node QB_F is a low level, the ninth transistor T9 may be turned on so that a high voltage of the seventh voltage EN1 applied to the seventh voltage input terminal V7 may be output as the third output signal Out3[k+1] from the third output terminal OUT3.

When the third control node QB_F is a high level, the fourteenth transistor T14 may be turned on so that the second voltage VGL applied to the second voltage input terminal V2 may be output as the second output signal Out2[k] from the second output terminal OUT2. When the third control node QB_F is a low level, the thirteenth transistor T13 may be turned on so that a high voltage of the eighth voltage EN2 applied to the eighth voltage input terminal V8 may be output as the second output signal Out2[k] from the second output terminal OUT2.

In the hold time HT, the seventh voltage EN1 and the eighth voltage EN2 may be applied as the second voltage VGL.

When the third control node QB_F is a high level, the tenth transistor T10 may be turned on so that the second voltage VGL applied to the second voltage input terminal V2 may be output as the third output signal Out3[k+1] from the third output terminal OUT3. When the third control node QB_F is a low level, the ninth transistor T9 may be turned on so that a low voltage of the seventh voltage EN1 applied to the seventh voltage input terminal V7 may be output as the third output signal Out3[k+1] from the third output terminal OUT3.

When the third control node QB_F is a high level, the fourteenth transistor T14 may be turned on so that the second voltage VGL applied to the second voltage input terminal V2 may be output as the second output signal Out2[k] from the second output terminal OUT2. When the third control node QB_F is a low level, the thirteenth transistor T13 may be turned on so that a low voltage of the eighth voltage EN2 applied to the eighth voltage input terminal V8 may be output as the second output signal Out2[k] from the second output terminal OUT2.

In each of the data writing time DWT and the hold time HT, when the first control node Q is a low level, the sixteenth transistor T16 of the first output controller 435 may be turned on so that a high voltage or low voltage of the second clock signal CLK2 may be output as the first output signal Out1 [k] from the first output terminal OUT1. When the second control node QB is a low level, the fifteenth transistor T15 of the first output controller 435 may be turned on so that the first voltage VGH applied to the first voltage input terminal V1 may be output as the first output signal Out1 [k] from the first output terminal OUT1.

In FIG. 44, a selective driving in which the data writing time DWT and the hold time HT are allocated during one frame is shown as an example. In another embodiment, a selective driving in which the data writing time DWT and the hold time HT are allocated in units of frames may be performed. For example, the hold time HT may be allocated during at least one frame between the first frame Frame1 and the third frame Frame3.

Figure 45:
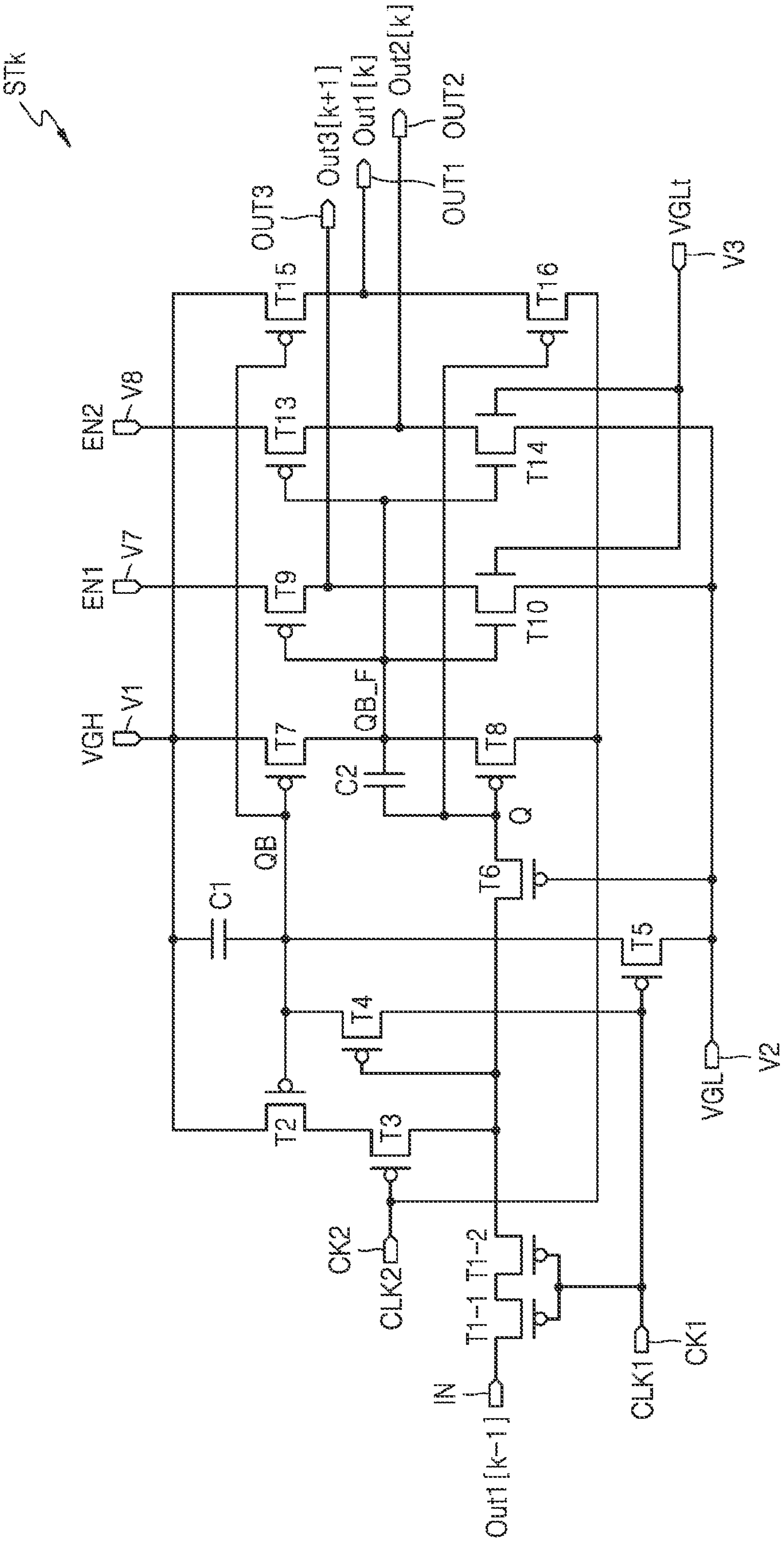
FIGS. 45 and 46 are diagrams illustrating various modifications of a circuit of a stage included in the scan driver in FIG. 41.
Figure 46:
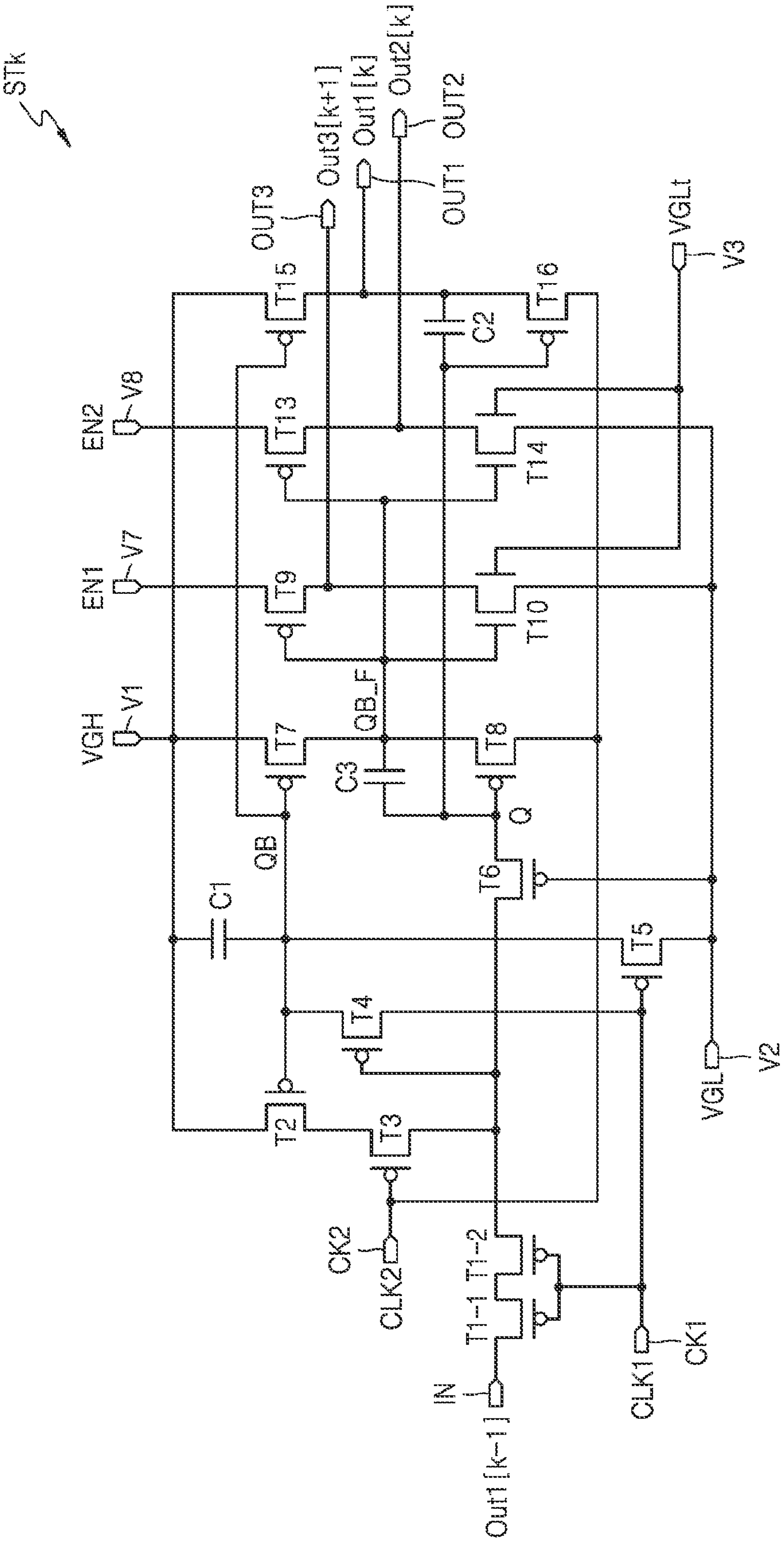

FIGS. 45 and 46 are diagrams illustrating various modifications of a circuit of a stage included in the scan driver 130 in FIG. 41.

The stage STK shown in FIG. 45 differs from the stage shown in FIG. 42 in that the second capacitor C2 is connected between the first control node Q and the third control node QB_F, and other configurations and operations are the same.

The stage STK shown in FIG. 46 differs from the stage shown in FIG. 42 in that the third capacitor C3 is added between the first control node Q and the third control node QB_F, and other configurations and operations are the same.

Figure 47:
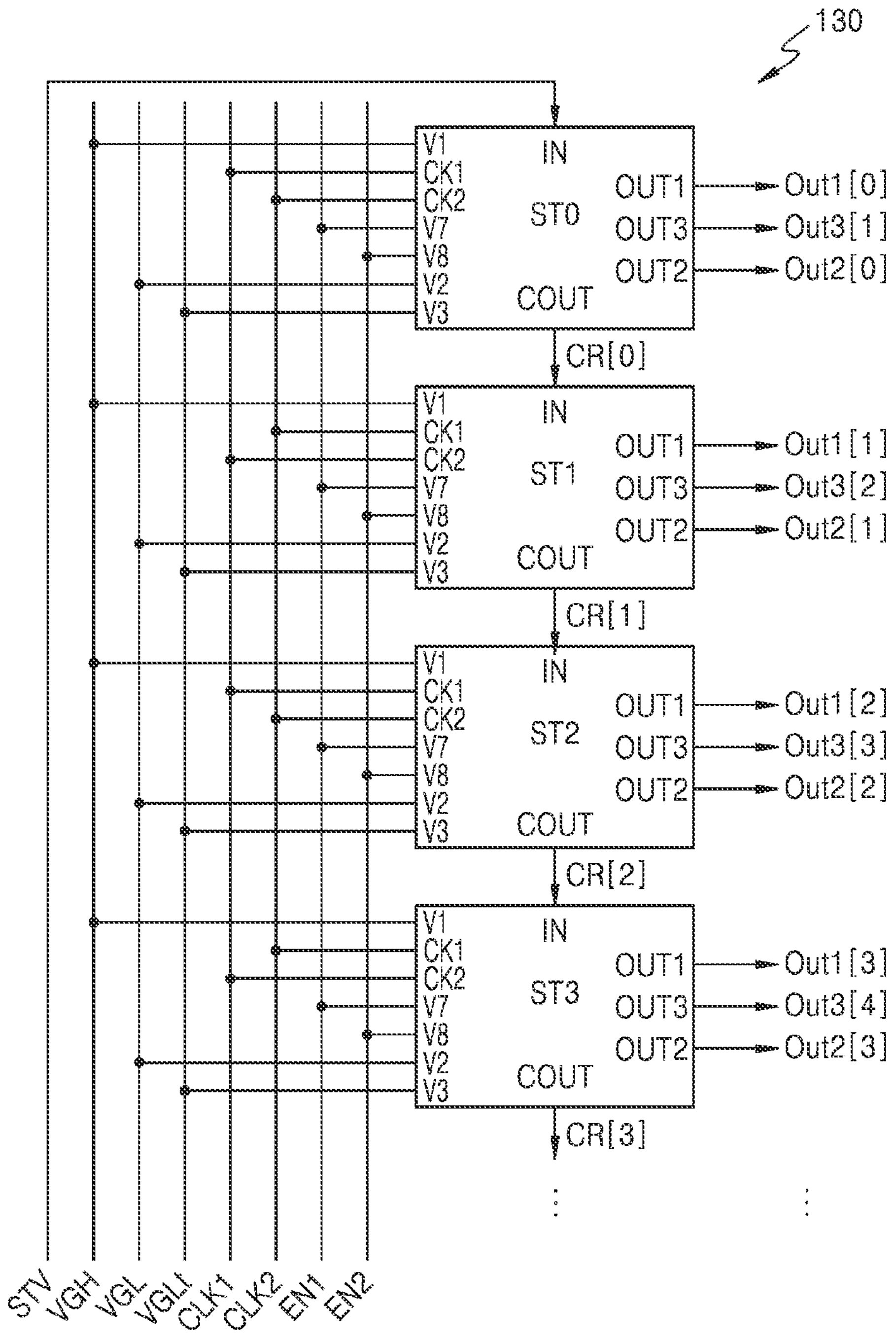
FIG. 47 is a diagram schematically illustrating a scan driver according to an embodiment.
Figure 48:
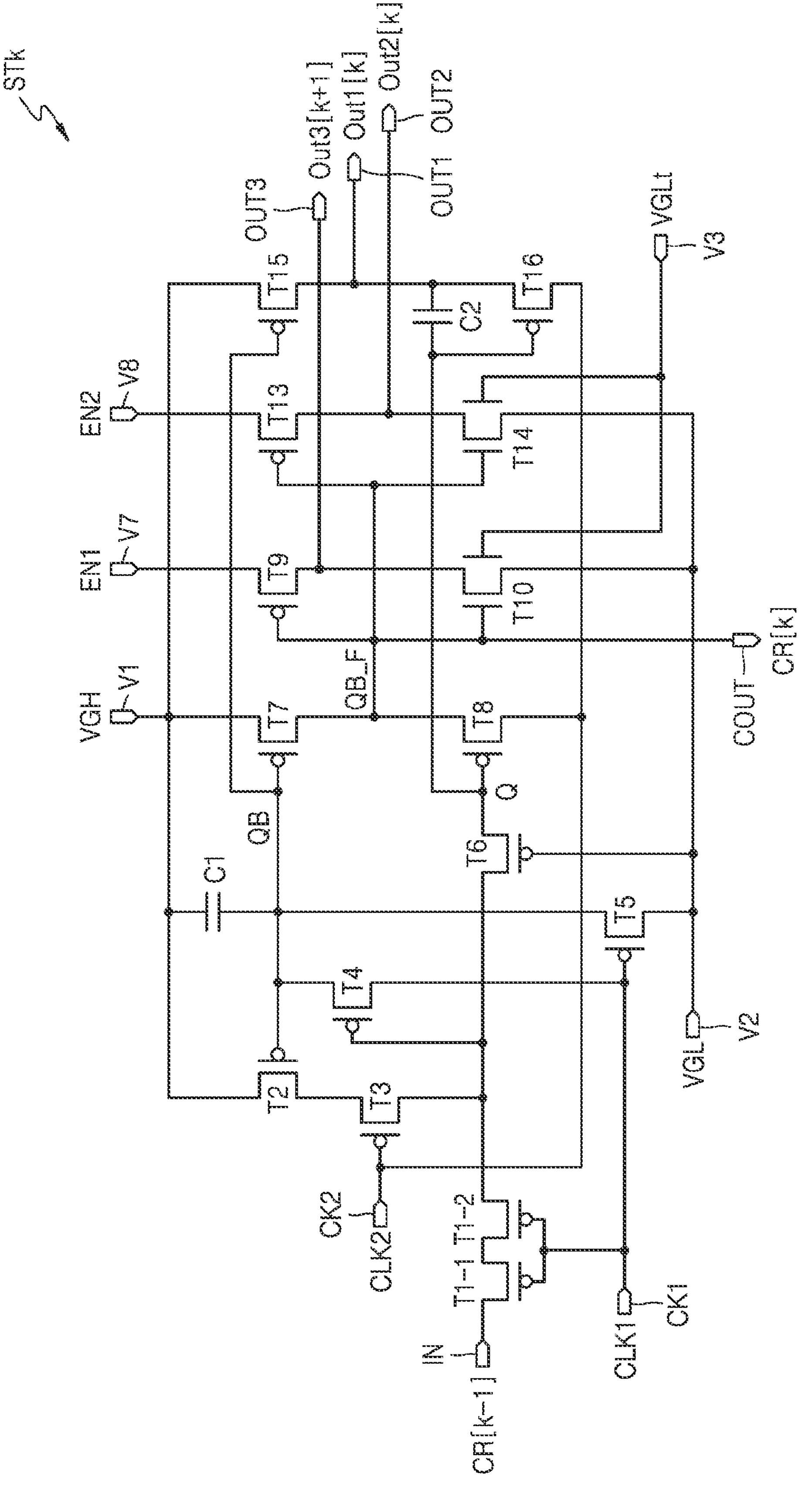
FIGS. 48 to 50 are diagrams illustrating various modifications of a circuit of a stage included in the scan driver in FIG. 47.
Figure 49:
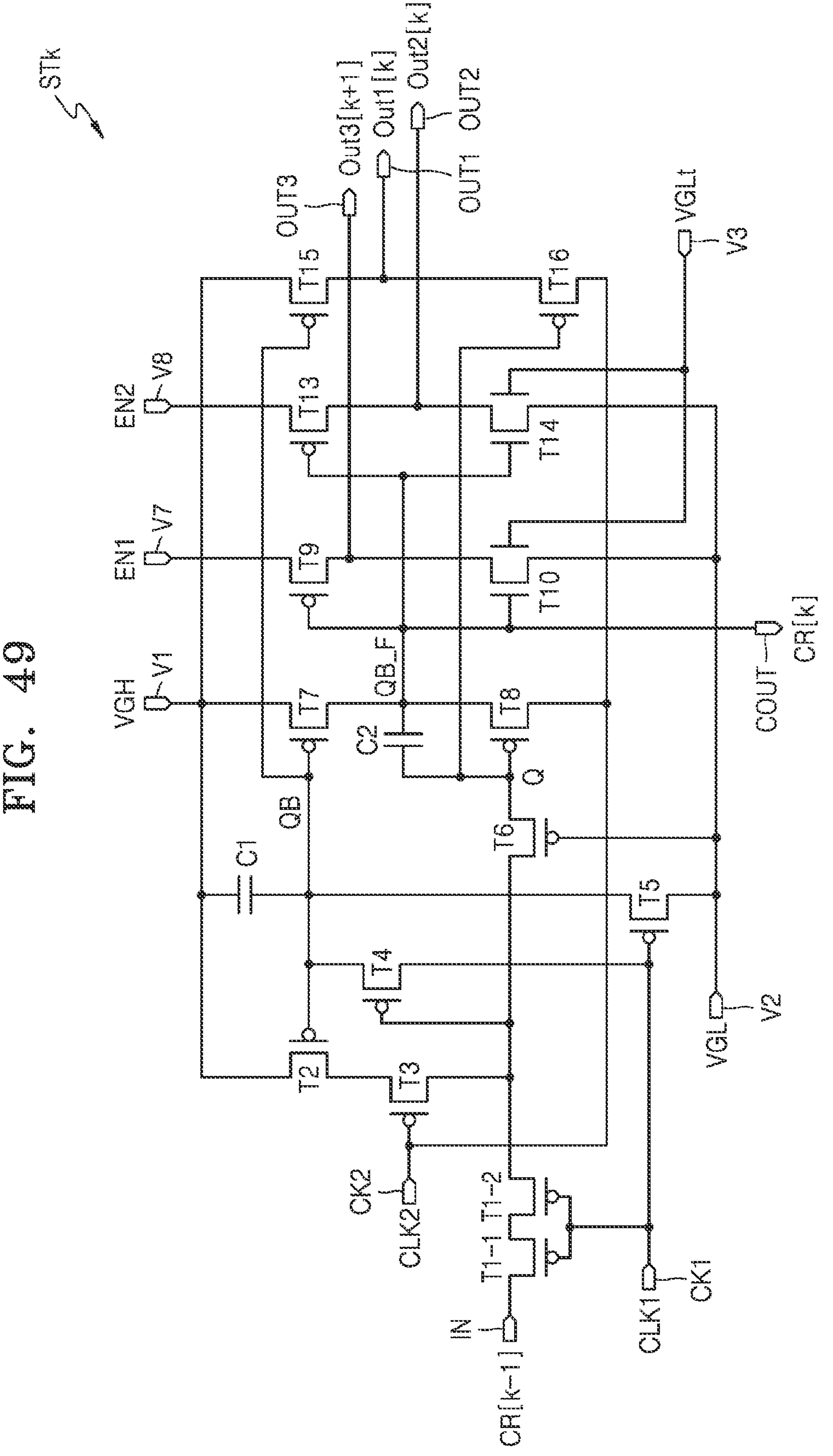
Figure 50:
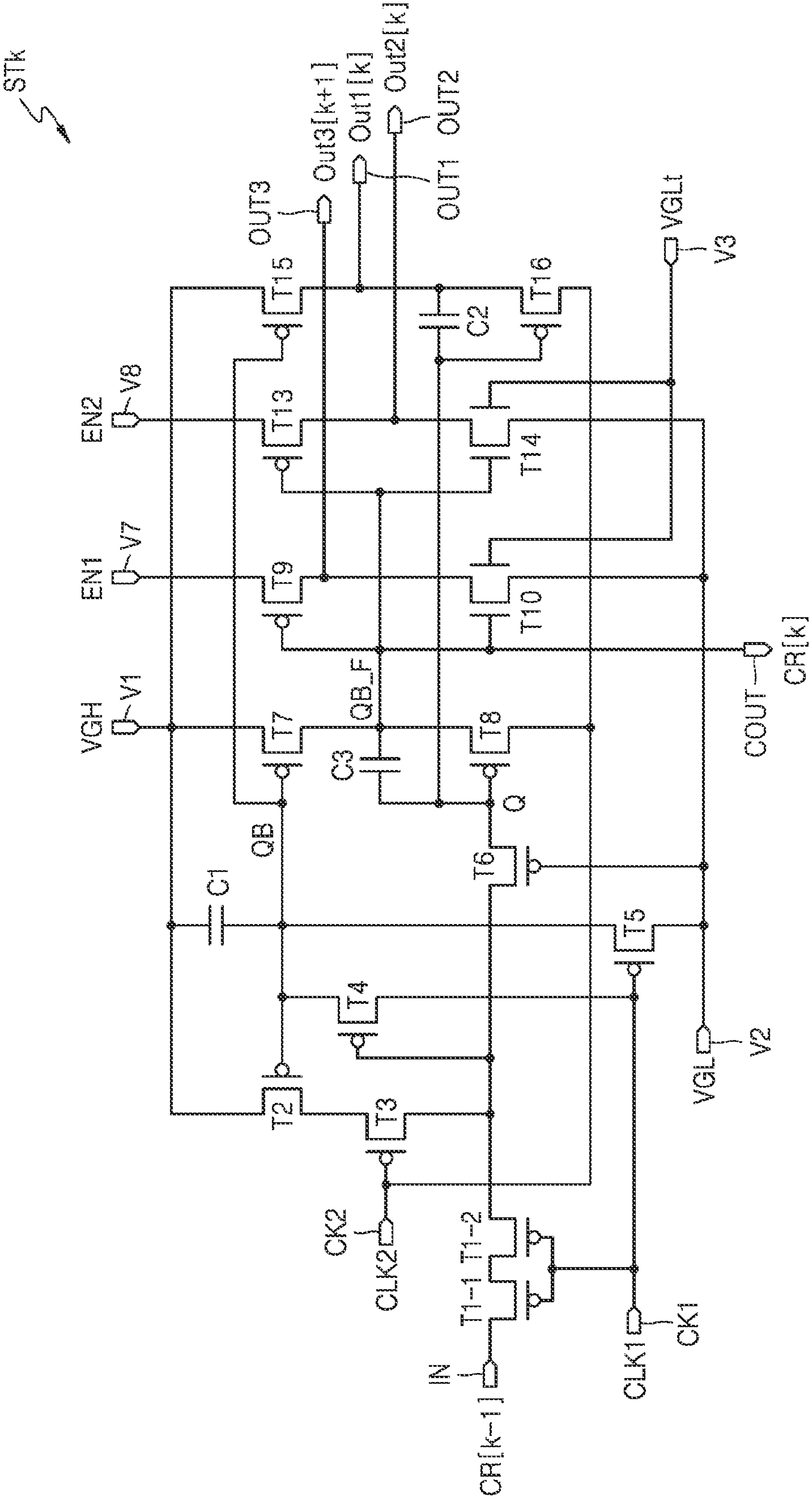

FIG. 47 is a diagram schematically illustrating a scan driver 130 according to an embodiment. FIGS. 48 to 50 are diagrams illustrating various modifications of a circuit of a stage included in the scan driver 130 in FIG. 47.

The scan driver 130 shown in FIG. 47 differs from the embodiment shown in FIG. 41 in that each of the stages includes the carry output terminal COUT that outputs carry signal separate from the first output signal Out1 [k] to the input terminal IN of a next stage.

The stage shown in FIG. 48 differs from the stage shown in FIG. 42 in that the carry output terminal COUT is connected to the third control node QB_F, the carry signal CR[k] having a voltage level of the third control node QB_F is output from the carry output terminal COUT, and the previous carry signal CR[k−1] output from the previous stage is applied to the input terminal IN. Other circuit configurations and operations are the same as those of the stage shown in FIG. 42.

The stage shown in FIG. 49 differs from the stage shown in FIG. 48 in that the second capacitor C2 is connected between the first control node Q and the third control node QB_F, and other configurations and operations are the same.

The stage shown in FIG. 50 differs from the stage shown in FIG. 48 in that the third capacitor C3 is added between the first control node Q and the third control node QB_F, and other configurations and operations are the same.

In the embodiments of FIGS. 20 to 50, one scan driver may output a plurality of output signals (e.g., scan signals) of different voltage levels from each other, and may output a plurality of output signals of the same voltage level as each other. For example, the scan driver may simultaneously output a first output signal having a low voltage as an on-voltage and a second output signal and/or third output signal having a high voltage as an on-voltage. Accordingly, a size of the driver may be reduced as compared to a display apparatus individually including a scan driver outputting a scan signal of a low voltage and a scan signal of a high voltage, and thus, a non-display area may be minimized.

In addition, in the embodiments of FIGS. 20 to 50, by a scan driver, output signals for controlling turn-on and turn-off of a transistor that does not operate during data writing to a pixel may be selectively output to the pixel unit according to a type of a displayed image. For example, in a mode in which an image is displayed according to a data signal different from a data signal of a previous frame (a data writing time during which a moving image is displayed), the second scan control signal GC and the third scan control signal GI may be sequentially output to the pixel unit. In a mode in which the data signal of the previous frame is maintained (a hold time during which a still image is displayed), the second scan control signal GC and the third scan control signal GI may not be output to the pixel unit. In other words, by selectively outputting an output signal to the pixel unit according to a type of a displayed image, the scan driver may be driven at low power. In this case, when a signal is output, an on-voltage (e.g., high voltage or low voltage) may be output, and when a signal is not output, an off-voltage (e.g., low voltage or high voltage) may be output.

In the output controller of the embodiments described above, a transistor configured to output a high voltage may be referred to as a pull-up transistor, and a transistor configured to output a low voltage may be referred to as a pull-down transistor. For example, the ninth transistor T9, the eleventh transistor T11, the thirteenth transistor T13, and the fifteenth transistor T15 may be the pull-up transistor, and the tenth transistor T10, the twelfth transistor T12, the fourteenth transistor T14, and the sixteenth transistor T16 may be the pull-down transistor. Each of transistors included in the node controller of the embodiments described above may be referred to as a control transistor configured to control a voltage level state of a node.

The display apparatus according to embodiments may be implemented as an electronic apparatus, such as a smartphone, a mobile phone, a smartwatch, a navigation device, a game console, a television ("TV"), a head unit for an automobile, a notebook computer, a laptop computer, a tablet computer, a personal media player ("PMP"), and a personal digital assistant ("PDA"). In addition, the electronic apparatus may include a flexible apparatus.

According to an embodiment, a scan driver capable of stably outputting a scan signal and a display apparatus including the scan driver may be provided. The effects of the disclosure are not limited to the above-described effects, and may be variously extended without departing from the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A driver comprising a plurality of stages, wherein each of the plurality of stages comprises:

a first circuit comprising a first transistor, the first transistor being connected between an input terminal to which a start signal is applied and a first node, wherein the first transistor transfers the start signal to the first node in response to a first clock signal;

a second circuit connected to the first node and a second node, wherein the second circuit controls voltages of the first node and the second node in response to the first clock signal and a second clock signal;

a third circuit connected to the first node and the second node, wherein the third circuit transfers the second clock signal to a third node in response to the start signal at the first node; and a first output circuit connected to the third node, wherein the first output circuit outputs a first gate control signal having a voltage level that is an inversion of a voltage level of the second clock signal at the third node, wherein the first output circuit comprises a first pull-up transistor and a first pull-down transistor, and a type of the first pull-up transistor and a type of the first pull-down transistor are different each other.

2. The driver of claim 1, wherein the first pull-up transistor is a P-channel transistor and the first pull-down transistor is an N-channel transistor.

3. The driver of claim 1, wherein a gate of the first pull-up transistor and a gate of the first pull-down transistor are connected to the third node.

4. The driver of claim 3, wherein the first output circuit is connected to a first voltage input terminal to which a first voltage is applied and a second voltage input terminal to which a second voltage less than the first voltage is applied, wherein the first pull-up transistor transfers the first voltage to an output terminal and the first pull-down transistor transfers the second voltage to the output terminal according to a voltage of the third node.

5. The driver of claim 4, wherein the first pull-down transistor further comprises a second gate connected to a third voltage input terminal to which a third voltage is applied.

6. The driver of claim 5, wherein the third voltage varies over time.

7. The driver of claim 3, wherein the third circuit comprises a second transistor and a third transistor, wherein the second transistor transfers the second clock signal to the third node in response to the start signal at the first node, and wherein the third transistor transfers the first voltage to the third node in response to a voltage of the second node, the voltage of the second node being the second voltage transferred in response to the first clock signal.

8. The driver of claim 7, wherein the second clock signal is phase-shifted by a half period from the first clock signal.

9. The driver of claim 7, further comprising a capacitor connected between the first node and the third node.

10. The driver of claim 4, further comprising a second output circuit connected to the first node and the second node, wherein the second output circuit outputs a second gate control signal having a voltage level that is an inversion of a voltage level of the first gate control signal.

11. The driver of claim 10, wherein the second output circuit comprises a second pull-up transistor and a second pull-down transistor, and a type of the second pull-up transistor and a type of the second pull-down transistor are the same each other.

12. The driver of claim 11, wherein the second output circuit is connected to the first voltage input terminal to which a first voltage is applied and a terminal to which the second clock signal is applied, and wherein a gate of the second pull-up transistor is connected to the second node and a gate of the second pull-down transistor is connected to the first node.

13. The driver of claim 4, wherein the second circuit comprising:

a fourth transistor connected between the first voltage input terminal and the first node, a gate of the fourth transistor being connected to the second node;

a fifth transistor connected between the fourth transistor and the first node, a gate of the fifth transistor being connected to a terminal to which the second clock signal is applied;

a sixth transistor connected between the second node and a terminal to which the first clock signal is applied, a gate of the sixth transistor being connected to the first node; and a seventh transistor connected between the second node and second voltage input terminal, a gate of the seventh transistor being connected to a terminal to which the first clock signal is applied.

14. The driver of claim 13, wherein the second circuit further comprising a capacitor connected between the first voltage input terminal and the second node.

15. The driver of claim 13, wherein the first circuit further comprising an eighth transistor connected between the first transistor and the first node, a gate of the eighth transistor being connected to the second voltage input terminal.

16. The driver of claim 1, wherein a carry signal is output from a carry output terminal connected to the third node.

17. The driver of claim 16, wherein a voltage level of the carry signal is an inversion of a voltage level of the first gate control signal.

18. The driver of claim 1, wherein the first transistor comprises a first sub-transistor and a second sub-transistor connected in series each other.

* * * * *